(12) United States Patent
Geens et al.

(10) Patent No.: US 12,210,204 B2
(45) Date of Patent: Jan. 28, 2025

(54) CABLE FIXATION ASSEMBLIES FOR TELECOMMUNICATIONS ENCLOSURES

(71) Applicant: COMMSCOPE TECHNOLOGIES LLC, Hickory, NC (US)

(72) Inventors: Johan Geens, Bunsbeek (BE); Eddy Luc Cams, Bilzen (BE); Chien-An Chen, Fuquay-Varina, NC (US); Olivier C. Roche, Schaerbeek (BE); Barry Wayne Allen, Siler City, NC (US); Ward Declercq, Antwerp (BE); Matthew Campsteyn, Limburg (BE); Roel Modest Willy Bryon, Aarschot (BE); Philippe Coenegracht, Hasselt (BE); Thomas Ross Marmon, Angier, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 275 days.

(21) Appl. No.: 17/425,263

(22) PCT Filed: Jan. 22, 2020

(86) PCT No.: PCT/US2020/014634
§ 371 (c)(1),
(2) Date: Jul. 22, 2021

(87) PCT Pub. No.: WO2020/154418
PCT Pub. Date: Jul. 30, 2020

(65) Prior Publication Data
US 2022/0120975 A1 Apr. 21, 2022

Related U.S. Application Data

(60) Provisional application No. 62/795,316, filed on Jan. 22, 2019, provisional application No. 62/833,955, (Continued)

(51) Int. Cl.
*G02B 6/44* (2006.01)
*G02B 6/36* (2006.01)

(52) U.S. Cl.
CPC ..... *G02B 6/44785* (2023.05); *G02B 6/44765* (2023.05); *G02B 6/3616* (2013.01); *G02B 6/4446* (2013.01)

(58) Field of Classification Search
CPC ............. G02B 6/4471; G02B 6/44765; G02B 6/44785
See application file for complete search history.

(56) References Cited

U.S. PATENT DOCUMENTS 4,991,928 A 2/1991 Zimmer
5,048,920 A 9/1991 Newell
(Continued)

FOREIGN PATENT DOCUMENTS

CN 1169543 A 1/1998
CN 107111092 A 8/2017
(Continued)

OTHER PUBLICATIONS

Extended European Search Report for European Patent Application No. 20745864.7 mailed Sep. 22, 2022, 9 pages.
(Continued)

*Primary Examiner* — Michael Stahl
(74) *Attorney, Agent, or Firm* — Merchant & Gould P.C.

(57) ABSTRACT

Devices, assemblies and methods for fixing a telecommunications cable. In certain embodiments, a cable fixation unit that can clamp a cable jacket also includes legs having feet that are mountable to a slotted support structure by inserting the feet into the support structure's slots in a sequence of motions.

21 Claims, 91 Drawing Sheets

Related U.S. Application Data filed on Apr. 15, 2019, provisional application No. 62/901,035, filed on Sep. 16, 2019, provisional application No. 62/951,253, filed on Dec. 20, 2019.

(56) References Cited

U.S. PATENT DOCUMENTS

| | | | |
|---|---|---|---|
| 5,820,082 A * | 10/1998 | Wright | B60R 16/0215 |
| | | | 248/65 |
| 5,835,660 A | 11/1998 | Jung et al. | |
| 6,504,986 B1 | 1/2003 | Wambeke et al. | |
| 7,254,307 B2 | 8/2007 | Xin | |
| 7,783,152 B2 | 8/2010 | Knorr et al. | |
| 8,538,227 B2 | 9/2013 | Cowen et al. | |
| 8,903,216 B2 | 12/2014 | Thompson et al. | |
| 10,379,310 B2 | 8/2019 | Aznag et al. | |
| 11,422,327 B2 | 8/2022 | Geens et al. | |
| 2006/0228087 A1 | 10/2006 | Bayazit et al. | |
| 2007/0047897 A1 | 3/2007 | Cooke et al. | |
| 2008/0170832 A1 | 7/2008 | Mullaney et al. | |
| 2008/0236861 A1 | 10/2008 | Bartholoma et al. | |
| 2009/0211219 A1 | 8/2009 | Buchmiller | |
| 2010/0054689 A1 | 3/2010 | Mullaney et al. | |
| 2010/0092147 A1 | 4/2010 | Desard et al. | |
| 2010/0183270 A1 | 7/2010 | Davis et al. | |
| 2012/0230646 A1 | 9/2012 | Thompson et al. | |
| 2012/0288248 A1 | 11/2012 | Chapa Ramirez et al. | |
| 2013/0209052 A1 | 8/2013 | Subash et al. | |
| 2014/0079366 A1 | 3/2014 | Rodriguez et al. | |
| 2014/0112628 A1 * | 4/2014 | Keenum | G02B 6/428 |
| | | | 29/829 |
| 2015/0378106 A1 | 12/2015 | Allen et al. | |
| 2016/0134092 A1 | 5/2016 | Bonvallat | |
| 2018/0157002 A1 * | 6/2018 | Bishop | H02G 15/013 |
| 2020/0233152 A1 * | 7/2020 | Prevratil | G02B 6/4452 |
| 2021/0208356 A1 | 7/2021 | Collart et al. | |
| 2022/0196959 A1 | 6/2022 | Cams et al. | |
| 2023/0129717 A1 | 4/2023 | Coenegracht et al. | |

FOREIGN PATENT DOCUMENTS

| | | |
|---|---|---|
| DE | 3726719 A1 | 2/1989 |
| DE | 200 12 572 U1 | 2/2001 |
| EP | 1 020 750 A2 | 7/2000 |
| EP | 1 139 127 A2 | 10/2001 |
| EP | 2 148 231 A1 | 1/2010 |
| EP | 2 647 095 B1 | 8/2014 |
| EP | 3 032 304 B1 | 11/2018 |
| JP | H09-304631 A | 11/1997 |
| JP | 2004212840 A | 7/2004 |
| KR | 10-0952825 B1 | 4/2010 |
| KR | 10-2017-0009550 A | 1/2017 |
| WO | 00/75704 A1 | 12/2000 |
| WO | 02/073281 A1 | 9/2002 |
| WO | 02/097505 A1 | 12/2002 |
| WO | 2008/118927 A1 | 10/2008 |
| WO | 2009/040566 A1 | 4/2009 |
| WO | 2009/106874 A1 | 9/2009 |
| WO | 2012/121955 A1 | 9/2012 |
| WO | 2013/037746 A1 | 3/2013 |
| WO | 2013/149857 A1 | 10/2013 |
| WO | 2013/149922 A1 | 10/2013 |
| WO | 2013/174992 A1 | 11/2013 |
| WO | 2014/173439 A1 | 10/2014 |
| WO | 2015/028619 A2 | 3/2015 |
| WO | 2016/000901 A1 | 1/2016 |
| WO | 2017/114936 A1 | 7/2017 |
| WO | 2018/154125 A1 | 8/2018 |
| WO | 2018/192917 A1 | 10/2018 |
| WO | 2019/034613 A1 | 2/2019 |
| WO | 2019/072782 A1 | 4/2019 |
| WO | 2019/072852 A1 | 4/2019 |
| WO | 2019/160995 A1 | 8/2019 |
| WO | 2019/241502 A1 | 12/2019 |
| WO | 2020/104395 A1 | 5/2020 |
| WO | 2020/154418 A1 | 7/2020 |
| WO | 2020/212365 A1 | 10/2020 |
| WO | 2020/219571 A1 | 10/2020 |
| WO | 2021/011386 A1 | 1/2021 |
| WO | 2021/055282 A1 | 3/2021 |
| WO | 2021/055285 A1 | 3/2021 |
| WO | 2021/055356 A1 | 3/2021 |
| WO | 2021/163340 A1 | 8/2021 |

OTHER PUBLICATIONS

FIST-GB2 Installation Instruction, FIST-Generic Box, Tyco Electronics Raychem NV, Jan. 28, 2001.

International Search Report and Written Opinion of the International Searching Authority for International Patent Application No. PCT/US2020/014634 mailed May 27, 2020, 15 pages.

ARS Cable Anchor Bracket, Prysmian Group, AC001(8): Apr. 1-2, 2012.

Chinese Notice of Allowance for Application No. 202080010172.0 mailed Sep. 5, 2022.

* cited by examiner

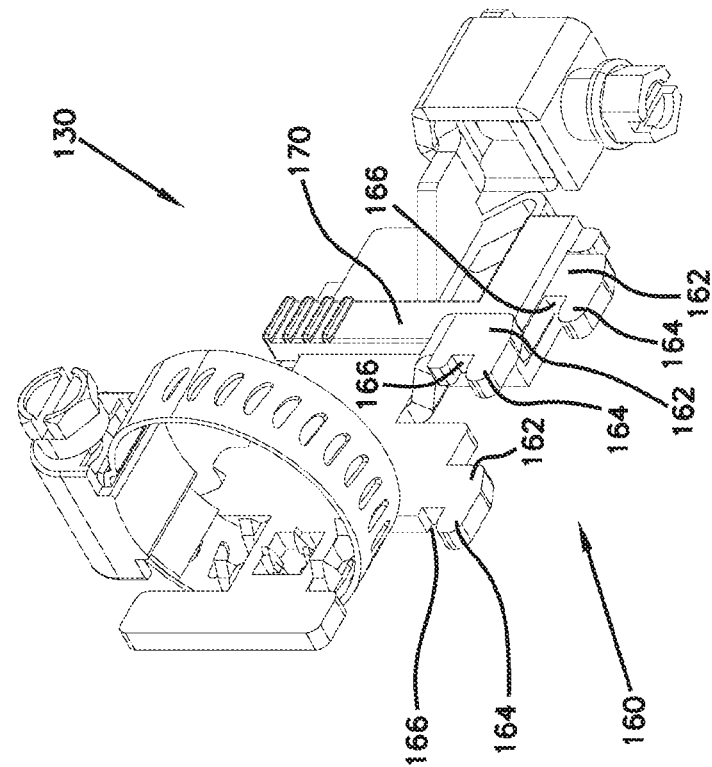
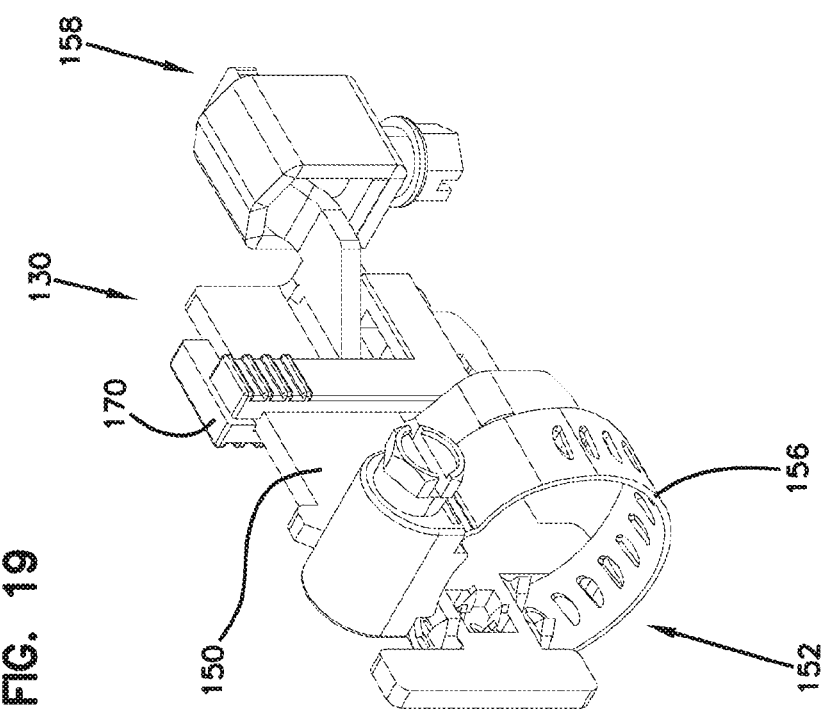

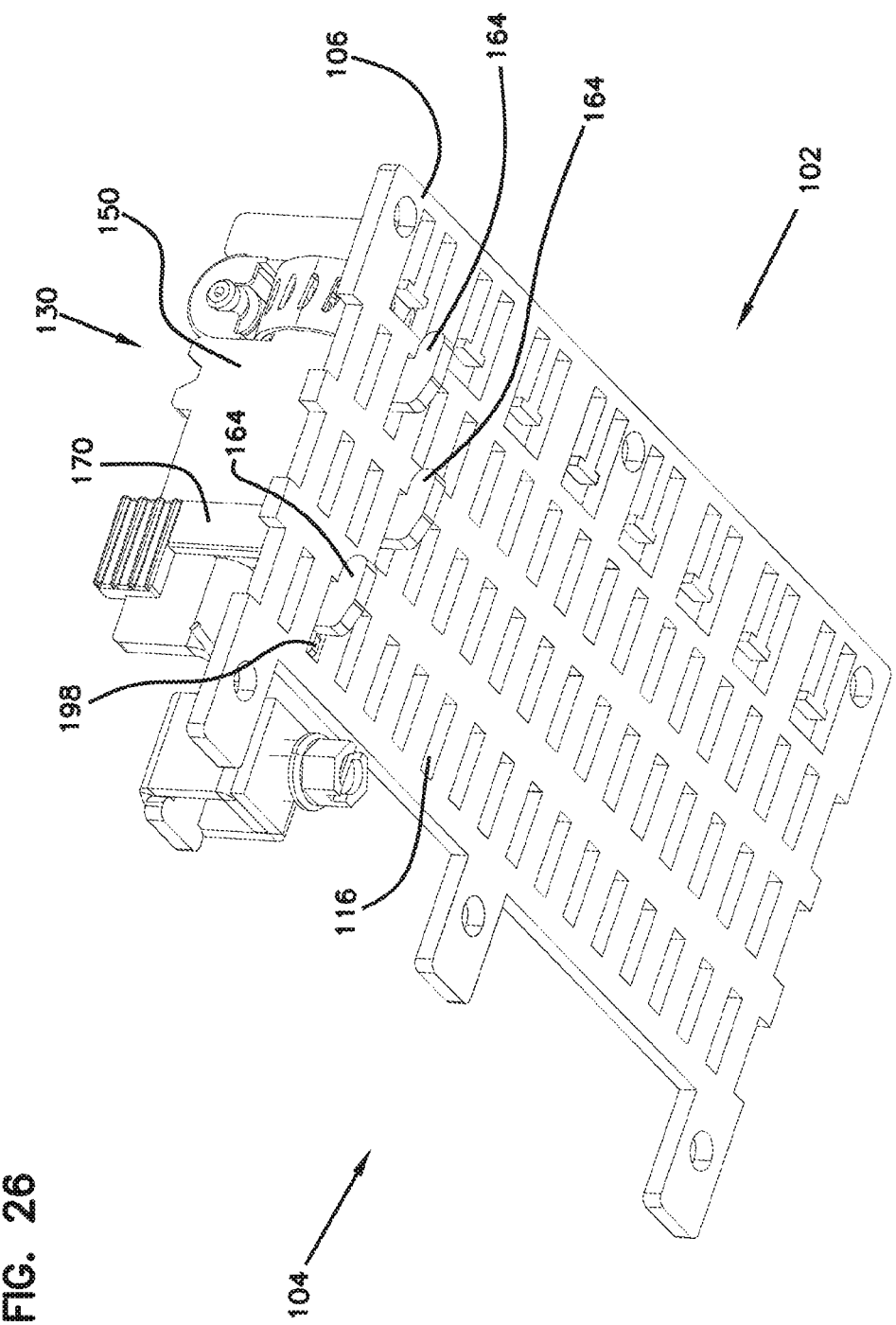

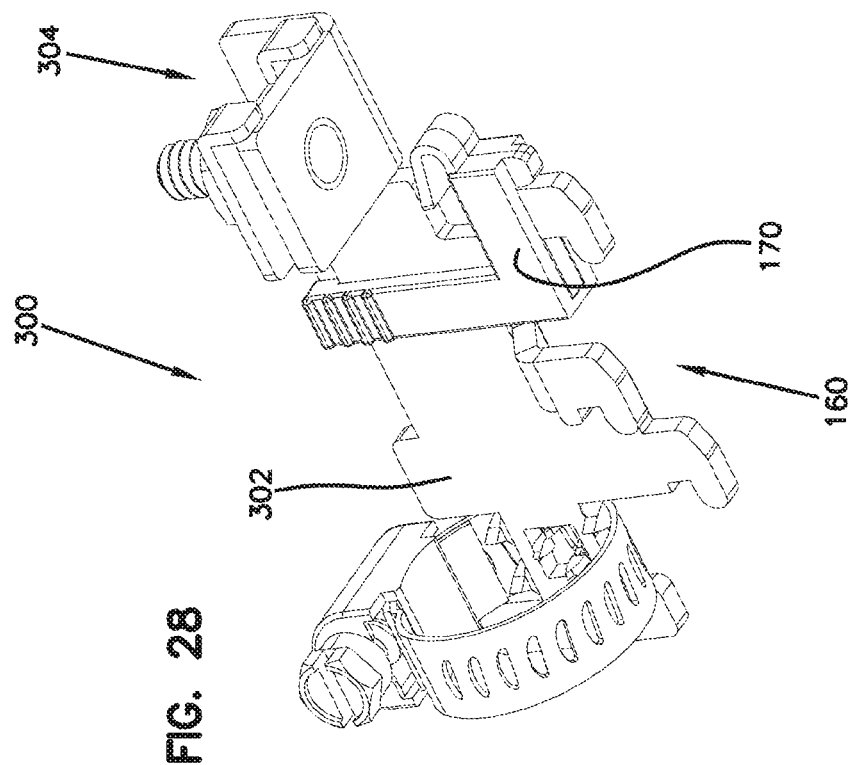
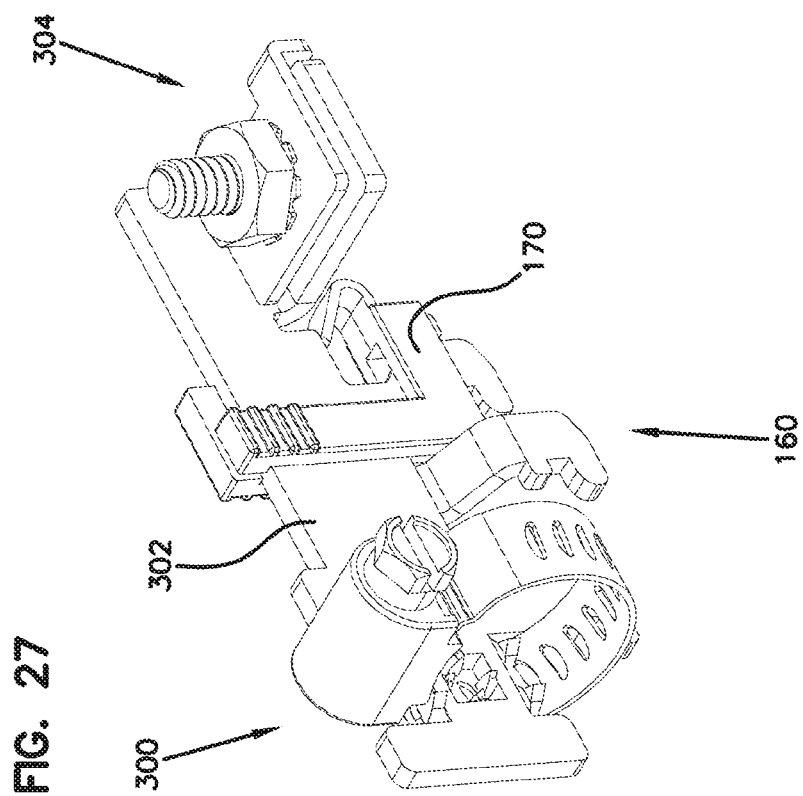

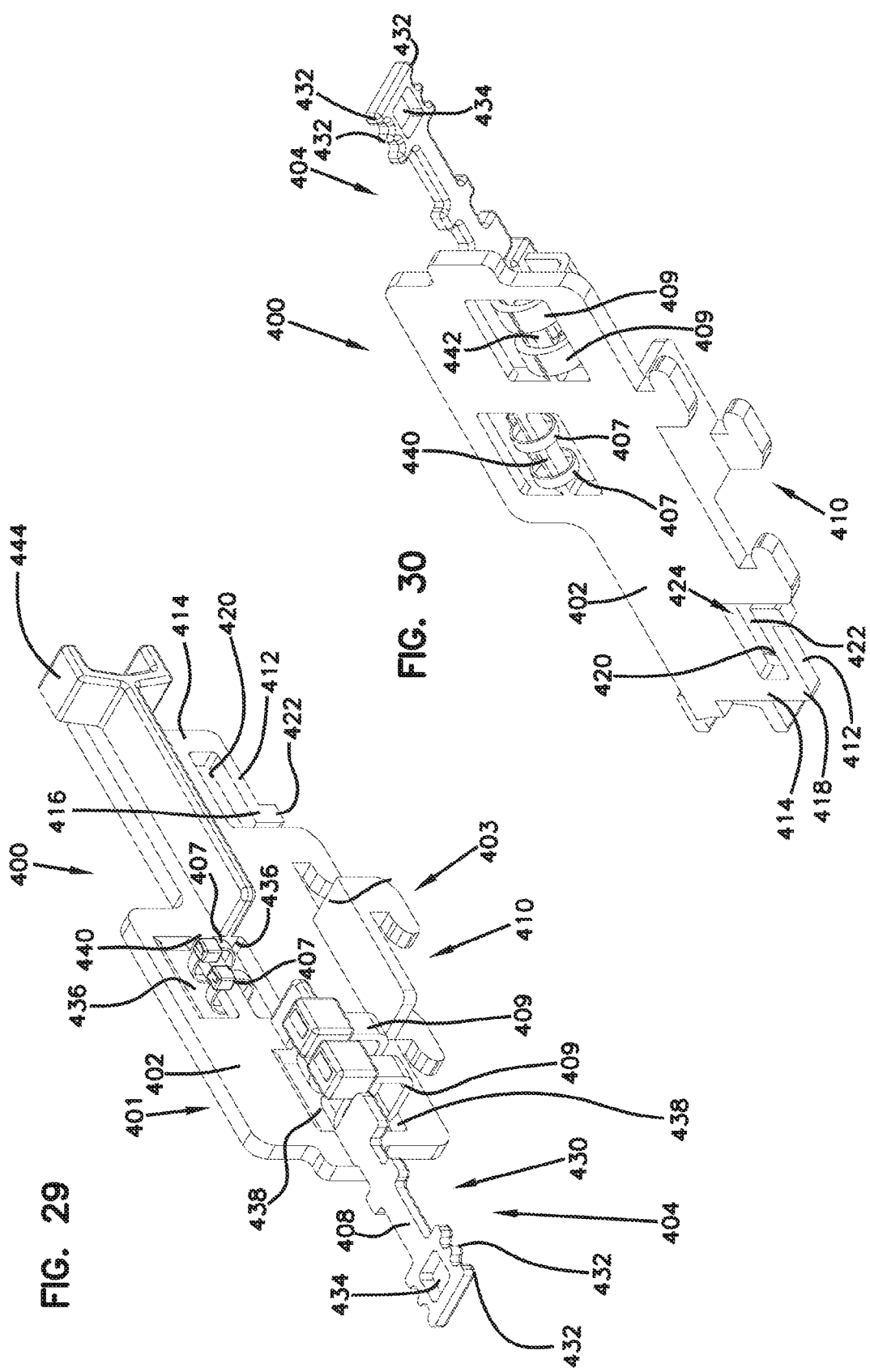

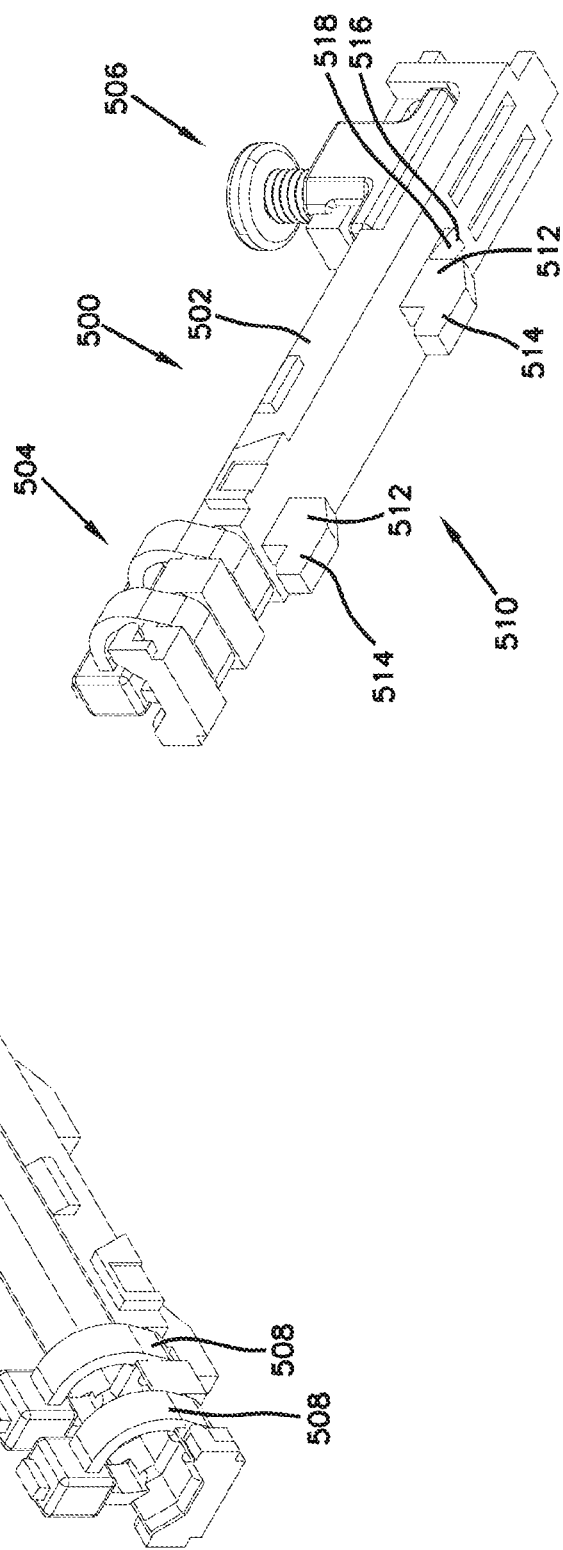

1913

CABLE FIXATION ASSEMBLIES FOR TELECOMMUNICATIONS ENCLOSURES

CROSS-REFERENCE TO RELATED APPLICATIONS

This application is a National Stage Application of PCT/US2020/014634, filed on Jan. 22, 2020, which claims the benefit of U.S. Patent Application Ser. No. 62/795,316, filed on Jan. 22, 2019, and claims the benefit of U.S. Patent Application Ser. No. 62/833,955, filed on Apr. 15, 2019, and claims the benefit of U.S. Patent Application Ser. No. 62/901,035, filed on Sep. 16, 2019, and claims the benefit of U.S. Patent Application Ser. No. 62/951,253, filed on Dec. 20, 2019, the disclosures of which are incorporated herein by reference in their entireties. To the extent appropriate, a claim is made to each of the above disclosed application.

TECHNICAL FIELD

The present disclosure relates to telecommunications enclosures, and more particularly to devices for fixing portions of telecommunications cables to telecommunications enclosures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or entering the enclosure through ports in the enclosure wall, corresponding sealing blocks positioned at the port locations of the enclosure can include sealing blocks that define cable passages such that the sealing blocks can be compressed around the cable forming a seal.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure.

Typically, fixing and un-fixing cables to/from the interior of a closure is a cumbersome and time-consuming process. In addition, portions of cable fixation assemblies are often not interchangeable, with the assemblies being designed exclusively for a particular cable type, a particular closure type, or the like.

The following patent documents are hereby incorporated by reference in their entireties: PCT Pat. Pub. No. WO 2013/149857; PCT Pat. Pub. No. WO 2017/114936; U.S. Pat. No. 8,903,216; PCT Pat. Pub. No. WO 2018/192917; and PCT Pat. Pub. No. WO 2009/040566.

SUMMARY

In general terms, the present disclosure is directed to improvements in the fixation of cables inside telecommunications closures. Various cable fixation assemblies will be described. The various assemblies provide a degree of interchangeability as well as customizability. For example, multiple fixation unit configurations can be mounted and secured to the same base plate, which is itself secured to the closure. In addition, the positions of the fixation assemblies can depend on a particular closure, and more particularly, on the location of the cable ports in the closure housing and the thickness of the cables being used. Base plates of the fixation assemblies of the present disclosure allow for customizable positioning of a cable fixation unit when securing the cable fixation unit to the base plate, allowing the same fixation assembly to be used for multiple different closures, as well as multiple different cable configurations for the same closure.

In accordance with certain further general aspects of the present disclosure, assembly features that provide for the locking of cable fixation units to a base that is fixed with respect to a housing piece of the closure are disclosed.

In accordance with certain further general aspects of the present disclosure, cable fixation assemblies can provide for electrical isolation between fixation units.

In accordance with certain further general aspects of the present disclosure, cable fixation assemblies can maximize the number of cables fixated. For example, single fixation devices can support and fixate multiple cables.

In accordance with certain further general aspects of the present disclosure, cable fixation assemblies can maximize customizability of placement of cable fixation units within a telecommunications closure.

In accordance with certain particular aspects of the present disclosure, a cable fixation assembly for fixing a portion of a telecommunications cable to a telecommunications closure, comprises: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

In accordance with further particular aspects of the present disclosure, a cable fixation assembly for fixing a portion of a telecommunications cable to a telecommunications closure, comprises: a base plate configured to be secured to a housing of the closure, the base plate including first and second opposite surfaces, and a plurality of slots open at the first surface and open at the second surface, the slots extending through the base plate and between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

In accordance with further particular aspects of the present disclosure, a cable fixation assembly for fixing a portion of a telecommunications cable to a telecommunications closure, comprises: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including a mounting portion, the mounting portion being configured to mount the body to the base plate and including at least two plate engageable members, each of the plate engageable members including a leg and a foot extending from the leg; and a locking member detached from the body and configured to slidably cooperate with the body, the locking member including a slot-insertable portion, and a flexibly resilient tail; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient tail presses against the body and urges the slot-insertable portion into a corresponding slot of the base plate.

In accordance with further particular aspects of the present disclosure, a cable fixation assembly for fixing a portion of a telecommunications cable to a telecommunications closure, comprises: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including a mounting portion, the mounting portion being configured to mount the body to the base plate and including at least two plate engageable members, each of the plate engageable members including a leg and a foot extending from the leg; and a locking member including a flexibly resilient cantilever member attached at fixed end thereof to the body, the resilient cantilever member further including a free end having a projection; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient cantilever is positioned such that the projection is inserted into a corresponding slot of the base plate.

In accordance with further particular aspects of the present disclosure, a telecommunications closure for managing one or more telecommunications cables, comprises: first and second housing pieces that are mateable and de-mateable to provide a re-enterable closure volume, the housing pieces defining a plurality of cable ports through which the one or more telecommunications cables enter the closure volume; a base plate secured to one of the housing pieces in a position such that the base plate is positioned within the closure volume when the houses pieces are mated, the base plate including first and second opposite surfaces, and a plurality of slots open at the first surface and open at the second surface, the slots extending through the base plate and between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

In accordance with further particular aspects of the present disclosure, a method of fixing a telecommunications cable to a telecommunications closure comprises: providing a base plate secured to a housing of the closure, the base plate including first and second opposite surfaces, and a plurality of slots open at the first surface and open at the second surface, the slots extending through the base plate and between proximal and distal ends of the slots defined by the base plate; providing a cable fixation unit including a body, the body including a mounting portion having at least two plate engageable members, each of the plate engageable members including a leg and a foot extending from the leg, the cable fixation unit further including a locking member detached from the body and including a slot-insertable portion and a flexibly resilient tail; inserting the plate engageable members in a first mounting direction through two of the slots such that the flexibly resilient tail flexes against the body; and subsequent to the inserting, sliding the fixation unit proximally in a second mounting direction perpendicular to the first mounting direction such that the foot of each of the plate engageable members proximally extends beyond proximal ends of the corresponding slots and such that the flexibly resilient tail urges the slot-insertable portion into one of the slots.

In accordance with still further particular aspects of the present disclosure, a method of fixing a telecommunications cable to a telecommunications closure comprises: providing a base plate secured to a housing of the closure, the base plate including first and second opposite surfaces, and a plurality of slots open at the first surface and open at the second surface, the slots extending through the base plate and between proximal and distal ends of the slots defined by the base plate; providing a cable fixation unit including a body, the body including a mounting portion having at least two plate engageable members, each of the plate engageable members including a leg and a foot extending from the leg, the cable fixation unit further including a cantilever member having a fixed end fixed to the body and a free end opposite the fixed end, the free end including a projection; inserting the plate engageable members in a first mounting direction through two of the slots such that the cantilever member is urged in a direction away from the base plate; and subsequent to the inserting, sliding the fixation unit proximally in a second mounting direction perpendicular to the first mounting direction such that the foot of each of the plate engageable members proximally extends beyond proximal ends of the corresponding slots and such that the cantilever member resiliently unflexes causing the projection to enter one of the slots.

In accordance with further aspects of the present disclosure, a cable fixation assembly for fixing a portion of a telecommunications cable comprises: a base plate including a plurality of slots extending along an elongate dimension of the slots between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

In accordance with further aspects of the present disclosure, a cable fixation assembly for fixing a portion of a telecommunications cable, comprises: a base plate including a plurality of slots extending along an elongate dimension of the slots between proximal and distal ends of the slots defined by the base plate; and a fixation unit comprising: a body, the body including a mounting portion, the mounting portion being configured to mount the body to the base plate and including at least two plate engageable members, each of the plate engageable members including a leg and a foot extending from the leg; and a locking member including a flexibly resilient cantilever member attached at a fixed end thereof to the body, the flexibly resilient cantilever member further including a free end having a projection; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient cantilever member is positioned such that the projection is inserted into a corresponding slot of the base plate.

In accordance with further aspects of the present disclosure, a cable fixation assembly comprises: a base plate defining a first plurality of slots; an adapter including a first body, a plurality of first slot engageable members extending from the first body, the first body defining a second plurality of slots; and a cable fixation unit including a second body and a second plurality of slot engageable members extending from the second body, wherein the base plate, the adapter, and the cable fixation unit are configured to cooperate such that the first slot engageable members of the adapter are lockingly received in the first slots, and such that the second slot engageable members of the cable fixation unit are lockingly received in the second slots.

In accordance with further aspects of the present disclosure, a cable fixation unit comprises: a body; a mounting portion extending from the body, the mounting portion being configured to mount to a base plate; and a seal member support extending from the body and configured to support a seal member, wherein the body defines a first cable jacket clamping portion on a first side of the seal member support for clamping a first cable jacket of a first cable, and a second cable jacket clamping portion on an opposite second side of the seal member support for clamping a second cable jacket of a second cable.

In accordance with further aspects of the present disclosure, a method of fixing a cable comprises: a) providing a base plate defining a first plurality of slots; an adapter including a first body, a plurality of first slot engageable members extending from the first body, the first body defining a second plurality of slots; and a cable fixation unit including a second body and a second plurality of slot engageable members extending from the second body; b) inserting the first slot engageable members in the first slots; c) sliding the first slot engageable members relative to the first slots such that the adapter locks to the base plate; d) inserting the second slot engageable members in the second slots; and e) sliding the second slot engageable members relative to the second slots such that the cable fixation unit locks to the adapter.

In accordance with further aspects of the present disclosure, a cable fixation assembly adapted to be lockingly mounted to a base plate having a plurality of slots extending along an elongate dimension of the slots between proximal and distal ends of the slots defined by the base plate, comprises: a body having a top and a bottom and including an upper cable support platform, the body being adapted to secure a first cable and a second cable in parallel such that the first cable is above the upper cable support platform and the second cable is below the upper cable support platform, the body defining at least one tie passage above the upper cable support platform and at least one tie passage below the upper cable support platform, each of the tie passages extending between a first opening and a second opening, the first and second openings being positioned at different heights on the body, each of the tie passages further including a guide surface that resists cable tie advancement from the first opening to the second opening less than from the second opening to the first opening.

In accordance with further aspects of the present disclosure, there is provided a base plate assembly adapted to mount a cable fixation assembly having a body defining a jacket clamping portion and a mounting portion, the mounting portion being configured to mount the body to the base plate assembly and including at least two plate engageable members, each of the plate engageable members including a leg and a foot extending from the leg, the base plate assembly comprising: a first base plate extending along a longitudinal axis between a proximal end and a distal end of the first base plate and extending along a transverse axis perpendicular to the longitudinal axis between first and second opposite sides, and extending vertically between a top and bottom parallel to a vertical axis that is perpendicular to the longitudinal and transverse axes, the first base plate including an upper surface and a lower surface and defining a plurality of slots, each of the slots being defined by a longitudinal dimension parallel to the longitudinal axis, a transverse dimension parallel to the transverse axis, and a vertical dimension parallel to the vertical axis, the plurality of slots defining a plurality of side by side mounting positions for mounting cable fixation assemblies arranged side by side along the transverse axis; wherein a slot of each of the mounting positions is a locking slot; wherein a resilient member is positioned at least partially within each of the locking slots, each of the resilient members extending between a fixed end and an opposite free end, each of the resilient members having a relaxed configuration and a flexed configuration; wherein in the relaxed configuration the free end of the resilient member is positioned to block a first of the plate engagable members from contacting the distal end of the corresponding locking slot when the cable fixation assembly is mounted to the first base plate; wherein in the flexed configuration, the free end of the resilient member is positioned to permit a proximally extending first foot of the first plate engageable member to slide proximally below the bottom surface of the first base plate when the cable fixation assembly is being installed on the first base plate; and wherein in the flexed configuration, the free end of the resilient member is positioned above a bottom of the first foot.

In accordance with further aspects of the present disclosure, a method of fixing a telecommunications cable, comprises: providing a cable fixation assembly, the cable fixation assembly including: a body defining a jacket clamping portion and a mounting portion, the mounting portion including at least two plate engageable members, each of the plate engageable members including a leg and a foot extending from the leg, and one of the plate engageable members including a heel portion; providing a base plate assembly, the base plate assembly including: a first base plate extending along a longitudinal axis between a proximal end and a distal end of the first base plate and extending along a transverse axis perpendicular to the longitudinal axis between first and second opposite sides, and extending vertically between a top and a bottom parallel to a vertical axis that is perpendicular to the longitudinal and transverse axes, the first base plate including an upper surface and a lower surface and defining a plurality of slots, each of the slots being defined by a longitudinal dimension parallel to the longitudinal axis, a transverse dimension parallel to the transverse axis, and a vertical dimension parallel to the vertical axis, the plurality of slots defining a plurality of side by side mounting positions for mounting cable fixation assemblies arranged side by side along the transverse axis, a slot of each of the mounting positions being a locking slot, the base plate assembly further including a resilient member positioned at least partially within each of the locking slots, each of the resilient members extending between a fixed end and an opposite free end, each of the resilient members having a relaxed configuration and a flexed configuration; pressing downward on a first of the resilient members with the heel portion to move the first resilient member from the relaxed configuration to the flexed configuration, such that the free end of the first resilient member remains above a bottom of a corresponding foot, and such that the corresponding foot is below the bottom surface of the first base plate; and sliding, subsequent to the pressing downward, the cable fixation assembly proximally such that the feet extend proximally beyond proximal ends of the corresponding slots, and such that the first resilient member returns to the relaxed configuration and limits distal movement of the corresponding plate engageable member relative to the first plate.

In accordance with further aspects of the present disclosure, a cable fixation assembly adapted to be lockingly mounted to a base plate having a plurality of slots extending along an elongate dimension of the slots between proximal and distal ends of the slots defined by the base plate, comprises: a body having a top and a bottom and including a cable jacket clamping portion, the body defining at least one tie passage, the at least one tie passage extending between a first opening and a second opening, the first and second openings being positioned at different heights on the body, each of the at least one tie passage further including a guide surface that resists cable tie advancement from the first opening to the second opening less than from the second opening to the first opening.

In accordance with further aspects of the present disclosure, a cable fixation unit comprises: a body including a cable support platform, a first pair of openings positioned above the cable support platform and a second pair of openings positioned below the cable support platform; a mounting portion extending from the body, the mounting portion being configured to mount to a base plate, wherein the body defines a first cable jacket clamping portion above the cable support platform and for clamping a first cable jacket of a first cable, and a second cable jacket clamping portion below the cable support platform for clamping a second cable jacket of a second cable; and wherein the pairs of openings are aligned one atop the other relative to a longitudinal axis of the cable fixation assembly such that the first and second cable jackets can be secured to the body by a single pair of tie wraps fed through both of the pairs of openings.

In accordance with further aspects of the present disclosure, a cable fixation unit adapted to be mounted to a slotted base plate assembly comprises: a body defining a jacket clamping portion, a mounting portion, and a strength member anchoring platform, the mounting portion being configured to mount the body to the base plate assembly and including no more than two plate engageable members transversely offset from each other relative to a longitudinal axis of the cable fixation unit, each of the plate engageable members including a leg and a foot extending from the leg, wherein one of the two plate engageable members is integral with and extends directly from the strength member anchoring platform.

In accordance with further aspects of the present disclosure, a cable fixation unit extending vertically from a bottom to a top and adapted to be mounted to a slotted base plate assembly, comprises: a body defining a jacket clamping portion, a first mounting portion, a second mounting portion, and a strength member anchor, wherein the first and second mounting portions are configured such that the body can be mounted to the slotted base plate assembly in both a bottom down position and a bottom up position, the bottom up position being inverted about a horizontal plane relative to the bottom down position.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 19 is a perspective view of a further embodiment of a fixation unit in accordance with the present disclosure.

FIG. 20 is a further perspective view of the fixation unit of FIG. 19.

FIG. 26 is a further perspective view of the assembly of FIG. 25.

FIG. 27 is a perspective view of the cable fixation unit of the assembly of FIG. 4.

FIG. 28 is a further perspective view of the fixation unit of FIG. 27.

FIG. 29 is a perspective view of a further embodiment of a cable fixation unit that can be used as part of a cable fixation assembly in accordance with the present disclosure.

FIG. 30 is a further perspective view of the cable fixation unit of FIG. 29.

FIG. 32 is a perspective view of a further embodiment of a cable fixation unit that can be used as part of a cable fixation assembly in accordance with the present disclosure.

FIG. 33 is a further perspective view of the cable fixation unit of FIG. 32.

DETAILED DESCRIPTION

Figure 1:
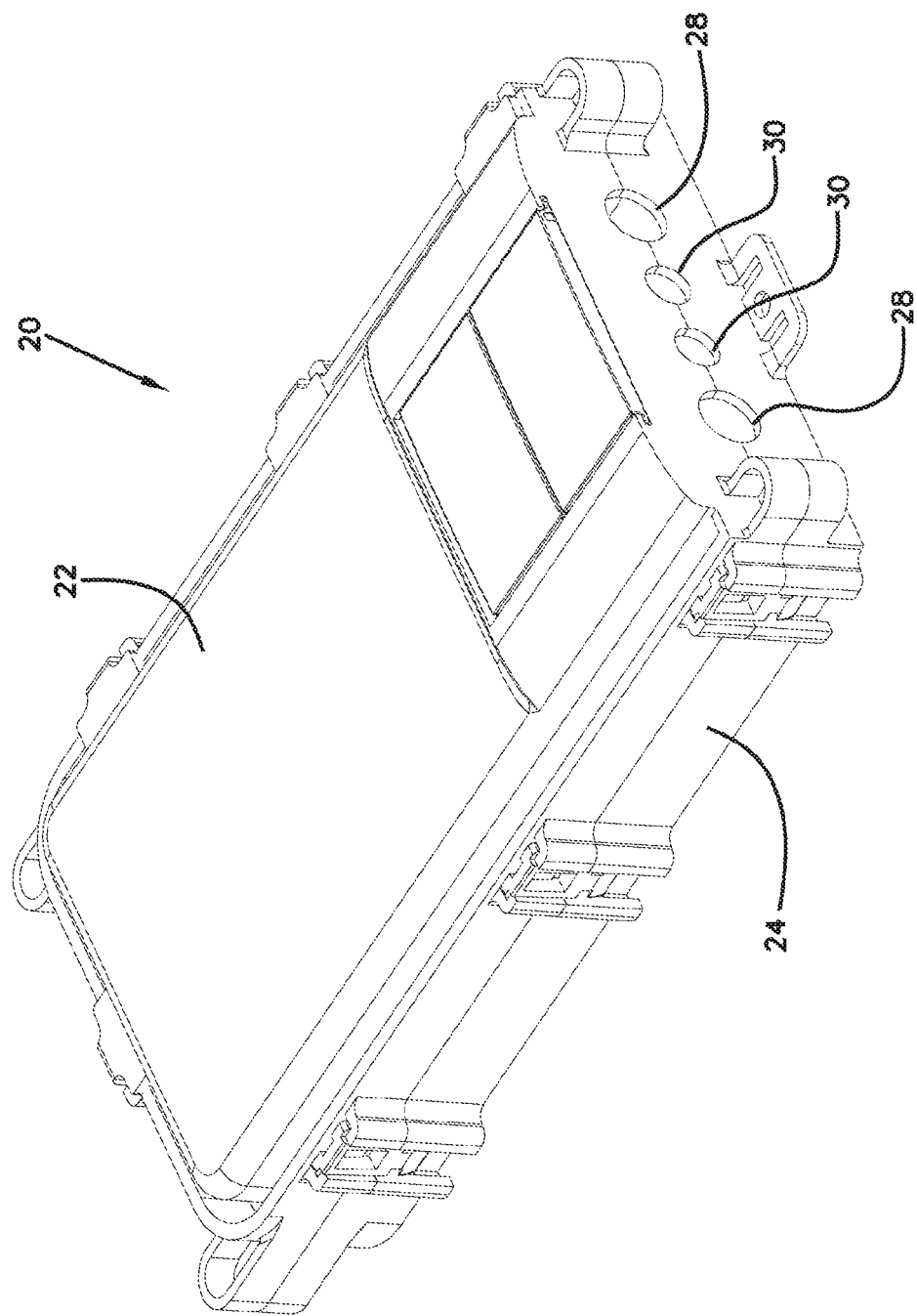
FIG. 1 is a perspective view of an example telecommunications closure that utilizes features of the cable fixation assemblies of the present disclosure, the closure being in a mated, closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
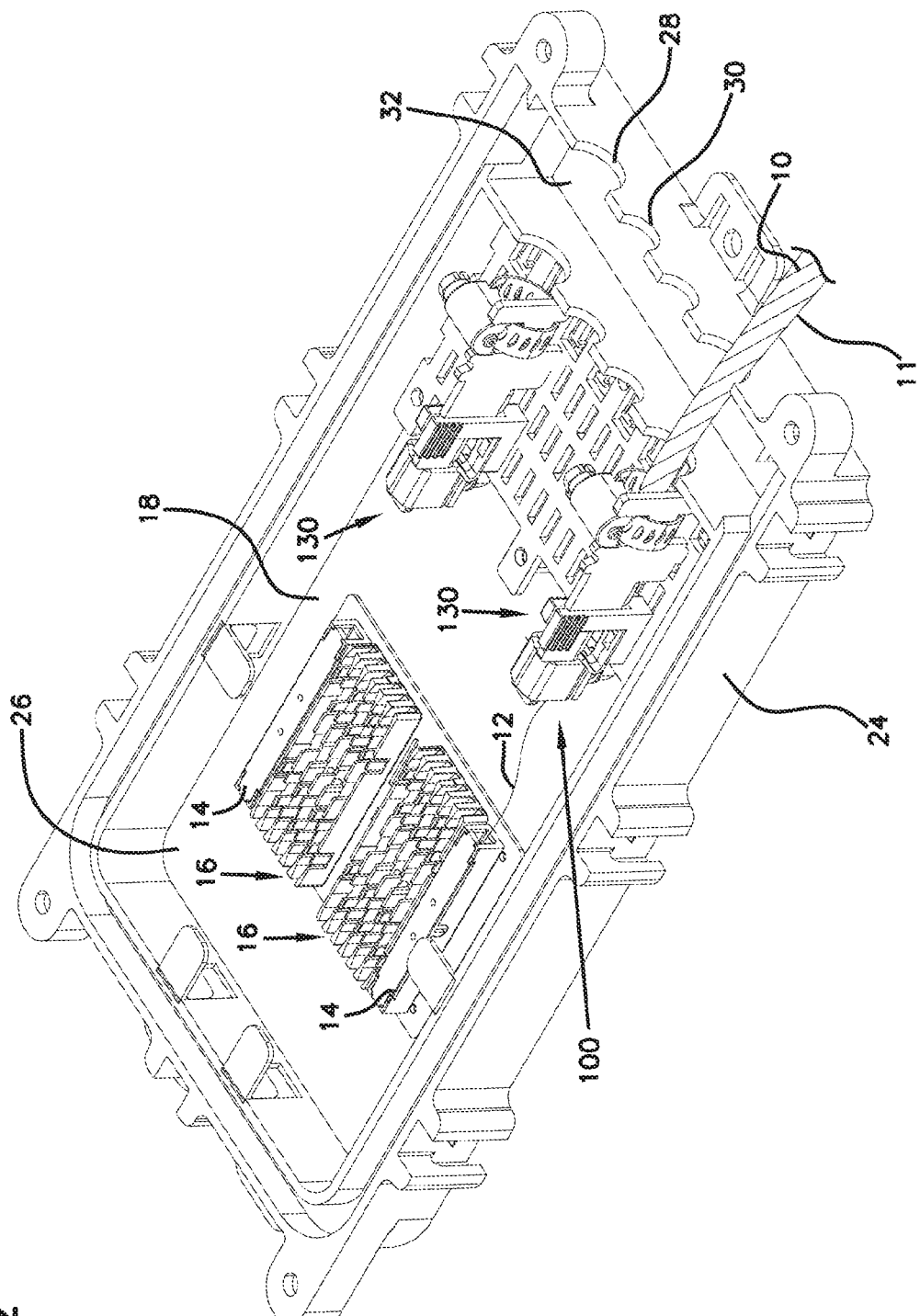
FIG. 2 is a perspective view of a portion of the closure of FIG. 1 in an opened, un-mated configuration, and depicting certain exemplary components that can be positioned within a closure volume defined by the closure of FIG. 1.

Referring to FIGS. 1-2, an example telecommunications closure 20 is depicted. The closure includes housing pieces 22 and 24 that cooperate to create a sealed and re-enterable closure volume 26 where optical and/or electrical fibers carried into the closure volume by one or more cables can be managed. An example cable 10 is schematically shown. The cable 10 is a feeder cable that passes through a feeder cable port 28 defined by the housing pieces 22 and 24. The cable 10 includes a jacket 11 that is secured to the cable fixation assembly 100 within the closure volume 26. The feeder cable ports 28 and other ports 30 (e.g., drop cable ports) are sealable, e.g., with one or more seal blocks (not shown) adapted to sealingly receive the cables and placed in a seal block holder 32 defined by the closure housing.

In one non-limiting example, the optical fibers 12 from the feeder cable 10 are split at a splitter 14, spliced at splices (not shown) held by a splice holder 16, and routed within the closure volume to optical fibers of drop cables (not shown). The splice holders 16 and splitters 14 can be secured to the housing of the closure in a fiber management region 18 of the closure volume 26. In this way the closure 20 serves as a distribution node of a telecommunications network, e.g., with optical and/or electrical signals being transmitted between a provider side (feeder cable 10) and a subscribers side (drop cables).

In some examples, in order to protect the optical fibers and other sensitive equipment housed within the closure 20, one or more of the cables entering the closure are grounded to minimize damage from an electrical surge (e.g., due to a lightning strike). For example, within the closure, one or more of the cables are electrically connected to a grounding rod (not shown). The grounding rod exits the closure 20 through a port 28, 30 and is electrically connected to ground.

To further protect the optical fibers 12 as they are routed and managed within the closure volume 26 and to help maintain the seal where the cables enter the closure, portions of the cables (e.g., the cable 10) are fixed to the interior of the closure housing using a cable fixation assembly 100 that is secured to the housing of the closure. In this example, the cable fixation assembly 100 is secured to the housing piece 24. The securing of the cable fixation assembly can be directly to a housing piece of the closure or to one or more intermediate structures between the housing and the cable fixation assembly.

Fixing of the cables in this way helps transfer lateral or axial loads on the cables to the closure housing rather than to the optical fibers themselves, and also minimizes shifting of the cables that could compromise the closure seal. For example, a spliced optical fiber is highly sensitive to external force, and a force that causes such fiber to shift can damage the splice, or otherwise decrease the fiber's optical performance, e.g., by decreasing it's bend radius.

Figure 3:
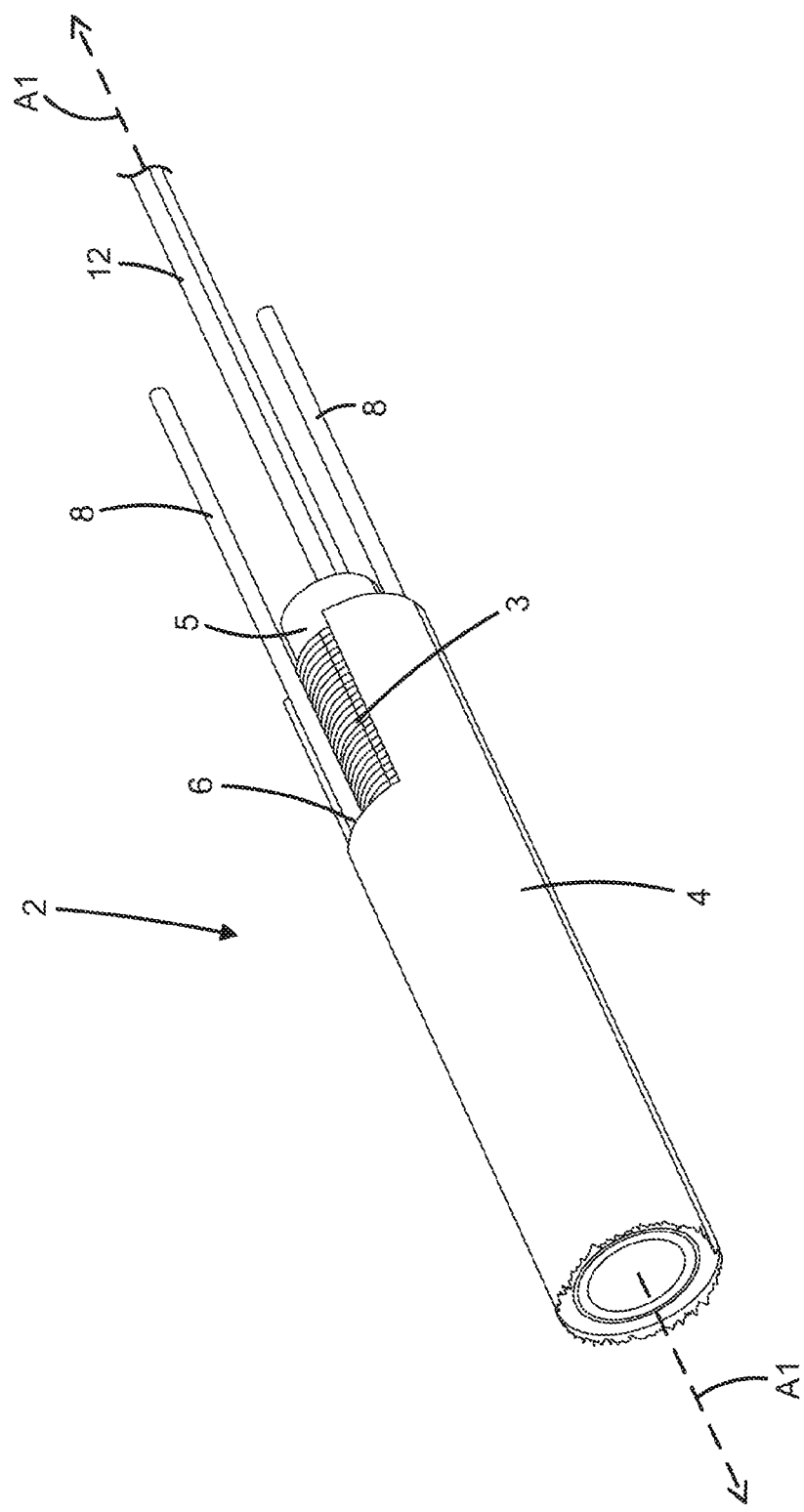
FIG. 3 depicts a portion of an example telecommunications cable that can be fixed within a telecommunications closure using a cable fixation assembly in accordance with the present disclosure.

Referring to FIG. 3, an embodiment of a telecommunications cable 2 that can be fixed to a cable fixation assembly of a telecommunications closure in accordance with the present disclosure is depicted. In this example, the cable 2 is a fiber optic cable carrying a plurality of optical fibers 12. However, the cables that are fixed using the fixation assemblies of the present disclosure can include any number of optical conductors and/or electrical conductors.

The cable 2 extends along a cable axis A1. The cable 2 includes an outer jacket (or jacket) 4 made of a non-electrically conductive material, e.g., a rubber or elastomeric material. The jacket 4 provides protection to the fibers 12 from contamination and lateral loads. A portion 6 of the jacket 4 is cut away to show additional components of the cable 2. These additional components include a conductive shield 3 surrounding a non-conductive buffer tube 5. Cables that are fixed using the fixation assemblies of the present disclosure can include, but need not include, buffer tubes and/or conductive shields. The conductive shield 3 can have a corrugated surface (as shown) and be made of an electrically conductive material. The conductive shield 3 and buffer tube 5 can shield the optical fibers 12 from electrical interference or surges, as well as provide mechanical protection from external loads on the cable 2. A pair of strength members 8, in this case metal, electrically conductive rods, extend along the cable 2 within the jacket 4. The strength members provide additional support and resistance to external loads, preventing over-bending of the optical fibers 12. In this example, the strength members 8 are made of a conductive material and can be grounded where exposed within a telecommunications closure to provide additional protection from electrical interference and surges with the closure and its contents. In other examples, the strength members are made of a non-electrically conductive material (e.g., fiberglass). In some examples, there is a single strength member rod that is, e.g., radially centralized relative to the axis A1. In some examples, more than two strength member rods are provided. In some examples, the strength members are not distinct rod-like structures but rather a collection of a thread like material, such as aramid yarn.

The optical fibers 12 are in this example a plurality of ribbonized fibers. The ribbons include coating that protects the cladded core optical fibers. In other examples, the optical fibers can be loose (i.e., not ribbonized). The cables entering the closure can include any number of optical fibers. For example, a feeder cable fixed within the closure can carry 12 fiber ribbons that are divided within the closure, and then one or more of the ribbons or one or more fibers of one or more of the ribbons is/are routed to a drop cable that is fixed within the closure.

Whatever the number of optical fibers 12 carried by a cable 2 that is terminated and fixed in a given closure, those optical fibers 12 can be managed in any number of ways within the closure using equipment provided therein. Non-limiting examples of such fiber management include: splicing, spooling, splitting, indexing, storing, and so forth. The equipment provided within the closure (e.g., power splitters, wave division multiplexers, fiber management trays, cable organizing and routing components, etc.) can be selected according to specific network needs for a given closure. Typically, optical fibers coming from a provider side in one or more relatively large cables are routed via the equipment within the closure to relatively small subscriber side cables, where both the provider and subscriber side cables have portions fixed in place within the closure to prevent undesirable shifting of the cables and fibers within the closures.

Figure 4:
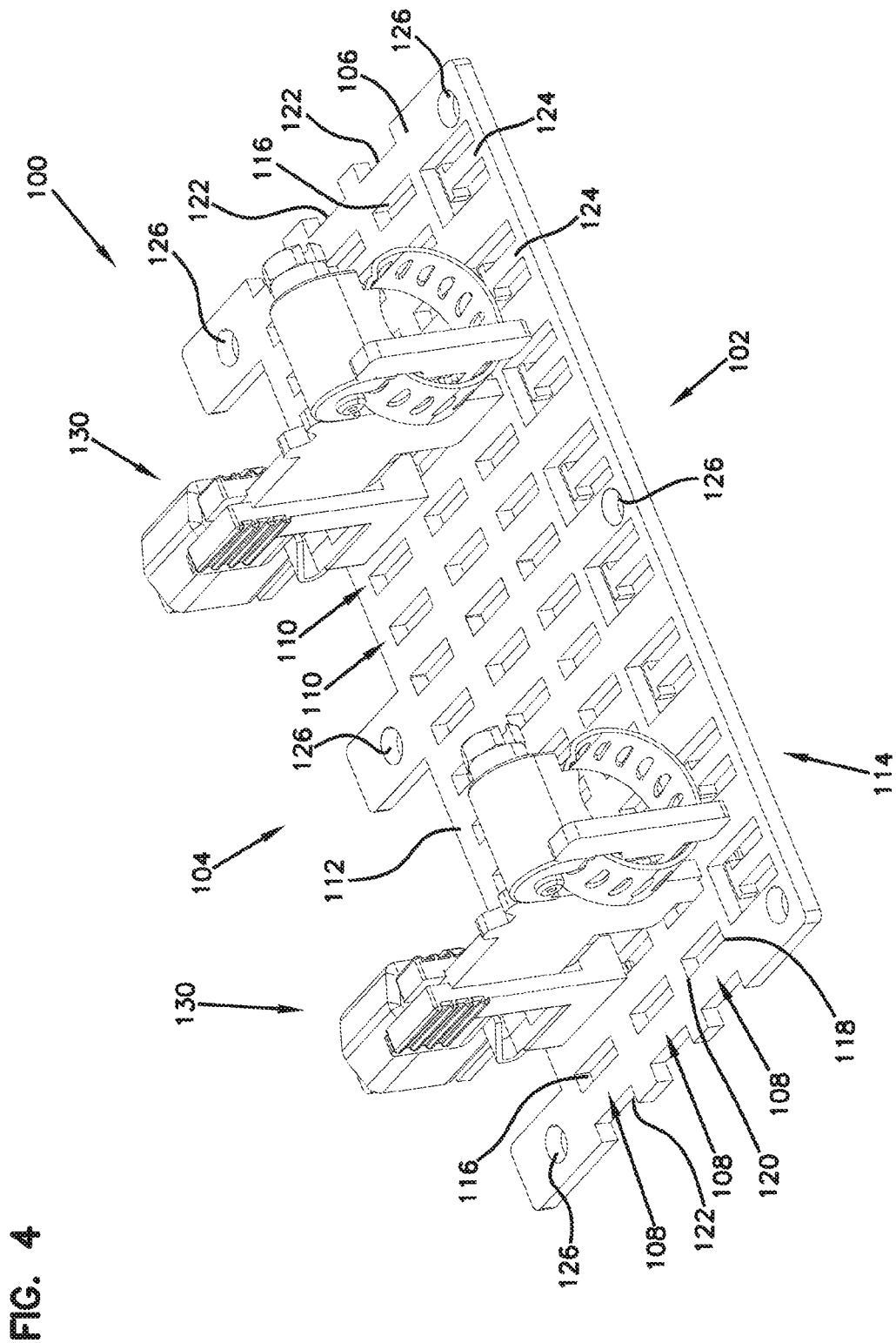
FIG. 4 is a perspective view of an embodiment of a cable fixation assembly according to the present disclosure.
Figure 5:
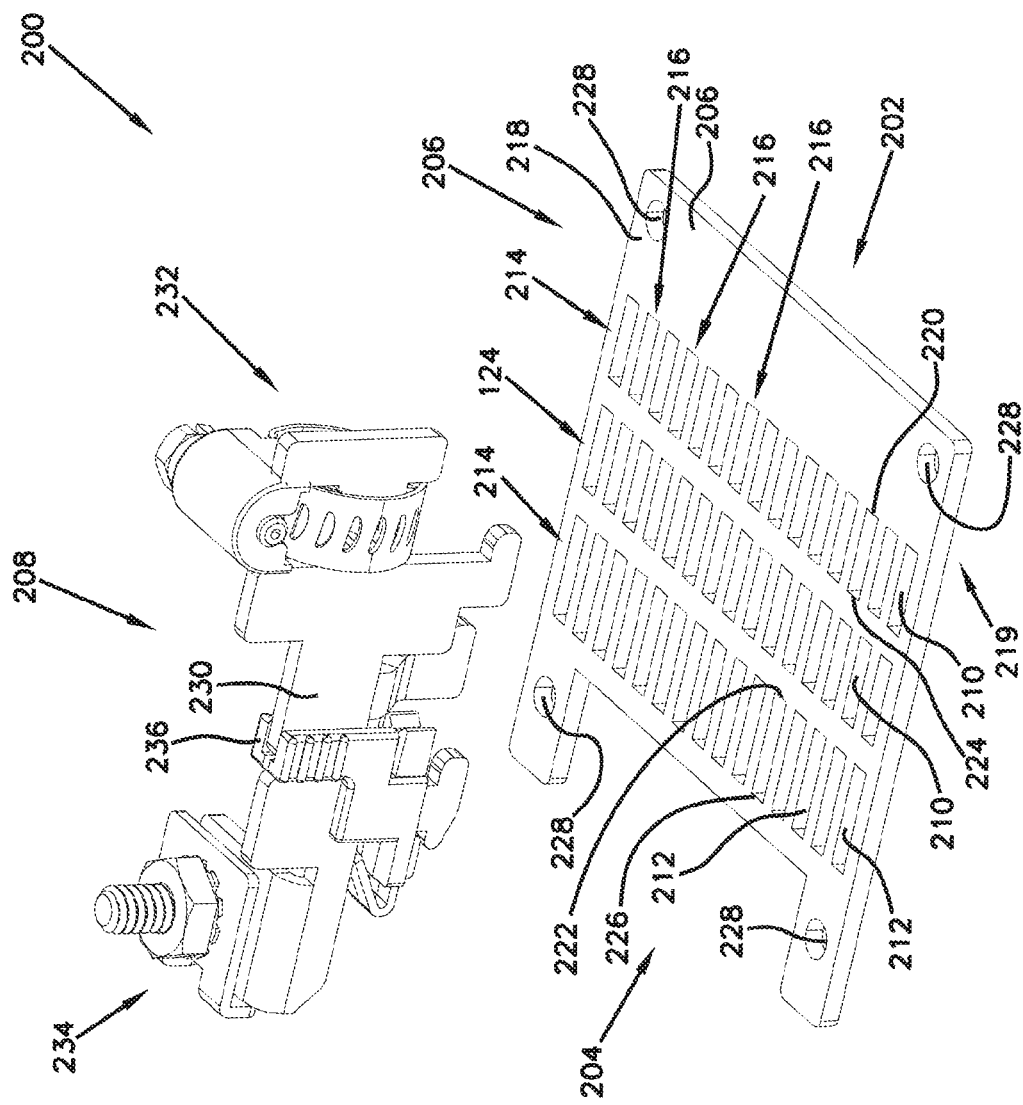
FIG. 5 is a partially exploded view of a further embodiment of a cable fixation assembly according to the present disclosure.
Figure 6:
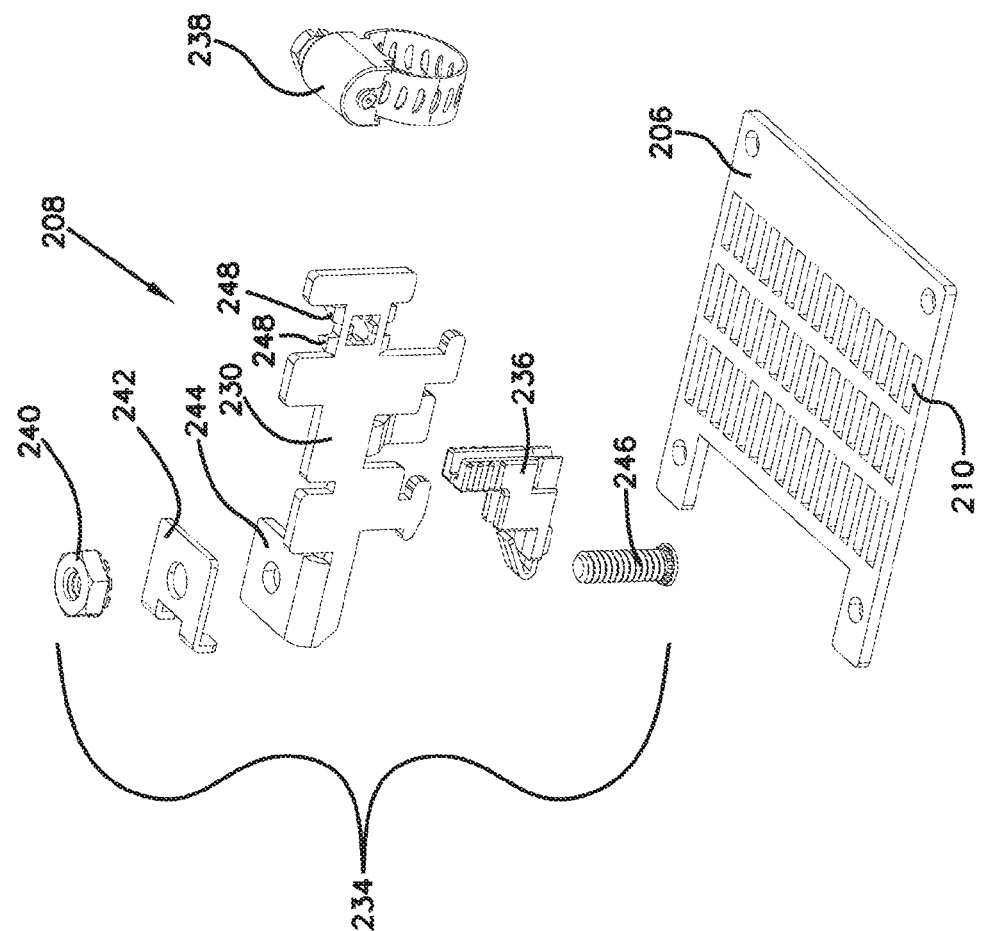
FIG. 6 is an exploded view of the assembly of FIG. 5.

Referring now to FIG. 4, for ease of description, the assembly 100 will be described as having a proximal end 102 and a distal end 104. When a cable is fixed to the assembly 100, the cable axis is generally parallel to the proximal-distal direction.

The assembly 100 includes a base plate 106. In this example, two cable fixation units 130 are mounted to the base plate 106.

The base plate 106 is modular, and thereby multiple of the base plate 106 are configured to be lined up side by side in any suitable number within a closure depending on the size of the closure and the number and size of cables to be fixed to the base plate 106. For example, two, three, four, five or more of the base plates 106 can be lined up side by side in the closure.

Depending on structural strength and electrical grounding needs, the base plate 106 can be made from an electrically conductive and/or relatively strong material (e.g., metal) or a non-electrically conductive and/or relatively weak material (e.g., plastic). In an assembly including multiple of the base plate 106, one or more of the base plates can have a certain property, (e.g., electrically conductive), and one or more other of the base plates can be a different property (e.g., electrically non-conductive).

The base plate 106 includes a first planar surface 112 and a second planar surface 114 that is opposite the first planar surface 112. A plurality of slots 116 are open at the surfaces 112 and 114 and extend through the entire thickness of the plate 106. The slots 116 are arranged in the plate 106 as a grid including a plurality of rows 108 of slots 116 and a plurality of columns 110 of slots 116. The rows 108 are parallel to one another and the columns 110 are parallel to one another. The columns 110 extend along the proximal-distal dimension, while the rows 108 extend perpendicularly to the columns 110.

Each of the slots 116 has a proximal end 118 and a distal end 120. In some examples, all of the slots 116 on a base plate 106 are of identical construction. In some examples, all of the slots 116 in each row 108 are of identical construction.

Each of the columns 110 corresponds to a selectable mounting position for a cable fixation unit (e.g., the cable fixation unit 130). The base plate 106 can support a plurality of fixation units at one time, as well as a plurality of types of fixation units at one time.

At opposite sides of the base plate 106 are partial slots 122. For example, partial slot 122 can correspond to one half of a slot 116, split along a line extending in the proximal-distal dimension. The partial slots 122 have an open side configured to align with a corresponding partial slot 122 of an adjacent base plate 106 to thereby form another complete slot, which can be selectively used to mount a cable fixation unit. In this manner, for purposes of selecting a location on a base plate 106 in an assembly that includes multiple base plates lined together side by side to mount a cable fixation unit, unusable space on the base plates (i.e., where there are no slots), is minimized.

The base plate 106 includes a row of T-shaped tabs 124, the row of T-shaped tabs is parallel to the rows 108 of slots. If a cable fixation unit mounted to the base plate 105 includes, e.g., a zip tie, or other tie wrap to clamp the jacket of the cable, such zip tie or tie wrap can be fed around one of the T-shaped tabs 124, to thereby tighten the tie/wrap and also hold the cable to the base plate 106.

Each of the base plates 106 includes a plurality of mounting through holes 126. The mounting through holes can receive fasteners (e.g., screws) for securing the base plate 106 to a housing piece of a closure or to one or more intermediate structures that are secured to a housing piece of the closure. In some examples, the planar sides 114 of the base plate 106 are supported on posts such there is a space adjacent the planar sides 114 where portions of a cable fixation unit can be positioned when the cable fixation unit is mounted to the base plate 106. In some examples, such posts can include holes or recesses adapted to receive fasteners passing through the mounting through holes 126.

Reference will now be made to FIGS. 5-18.

A cable fixation assembly 200 extends from a proximal end 202 to a distal end 204 and includes a base plate 206 and a cable fixation unit 208.

The base plate 206 includes a grid of slots 210, 212 arranged in parallel rows 214 and parallel columns 216 and extending through the plate 206 between a first planar surface 218 and an opposite second planar surface 219. Each of the slots 210, 212 extends from a proximal end 220, 222, to a distal end 224, 226. The base plate 206 includes features (e.g., mounting through holes 228 configured to secure (e.g., with fasteners) the base plate 206 directly or indirectly to a housing piece of a closure. In this example, the slots 212 are longer in the proximal-distal dimension than the slots 210 in order to accommodate a particular portion of the cable fixation unit 208 as will be described below.

The cable fixation unit 208 includes a body 230, a cable jacket clamping portion 232, a strength member clamping portion 234, and a locking member 236 that is not attached to the body 230 and slidably cooperates with the body. When the cable fixation unit is mounted to the base plate 206, the jacket clamping portion 232 is positioned towards the proximal end 202 of the assembly 200 and the strength member clamping portion 234 is positioned towards the distal end 204 of the assembly 200.

The jacket clamping portion includes a clamping member. In this example, the clamping member is an adjustable hose clamp 238 that is adjustable to clamp around different size cables (i.e., cables of different diameters). The strap of the hose clamp 238 is placed around the body 230 to tightly hold the cable to the body 230. In other examples, one or more ties or straps having a looped portion and coextensive tails extending from the looped portion can be substituted for the hose clamp 238. Optionally, the body 230 is electrically conductive and includes one or more teeth 248 configured to dig into a conductive shield of a cable fixed to the unit 208 (e.g., the conductive shield 3 of FIG. 3) to electrically ground the conductive shield. In some examples, the body 230 or portions of the body are not electrically conductive.

The strength member clamping portion 234 includes a platform 244 of the body 230, a fastening plate 242, a fastening nut 240, and a fastening bolt 246. If the cable fixed by the unit 208 includes one or more electrically conductive strength members, those strength members can be sandwiched between the platform 244 and the fastening plate 242 and secured tightly with the nut 240 and the bolt 246 passing through a hole in the platform 244. The body 230 and/or the plate 242 can be grounded and thereby ground the strength member(s).

Non-limiting example configurations of jacket clamping portions and strength member clamping portions are shown and described in PCT Pat. Pub. No. WO 2013/149857, U.S. Pat. No. 8,903,216, and PCT Pat. Pub. No. WO 2018/192917, the contents of which have been incorporated by reference in their entirety. Additional embodiments of jacket clamping portions and strength member clamping portions are shown throughout the several views herein.

Figure 18:
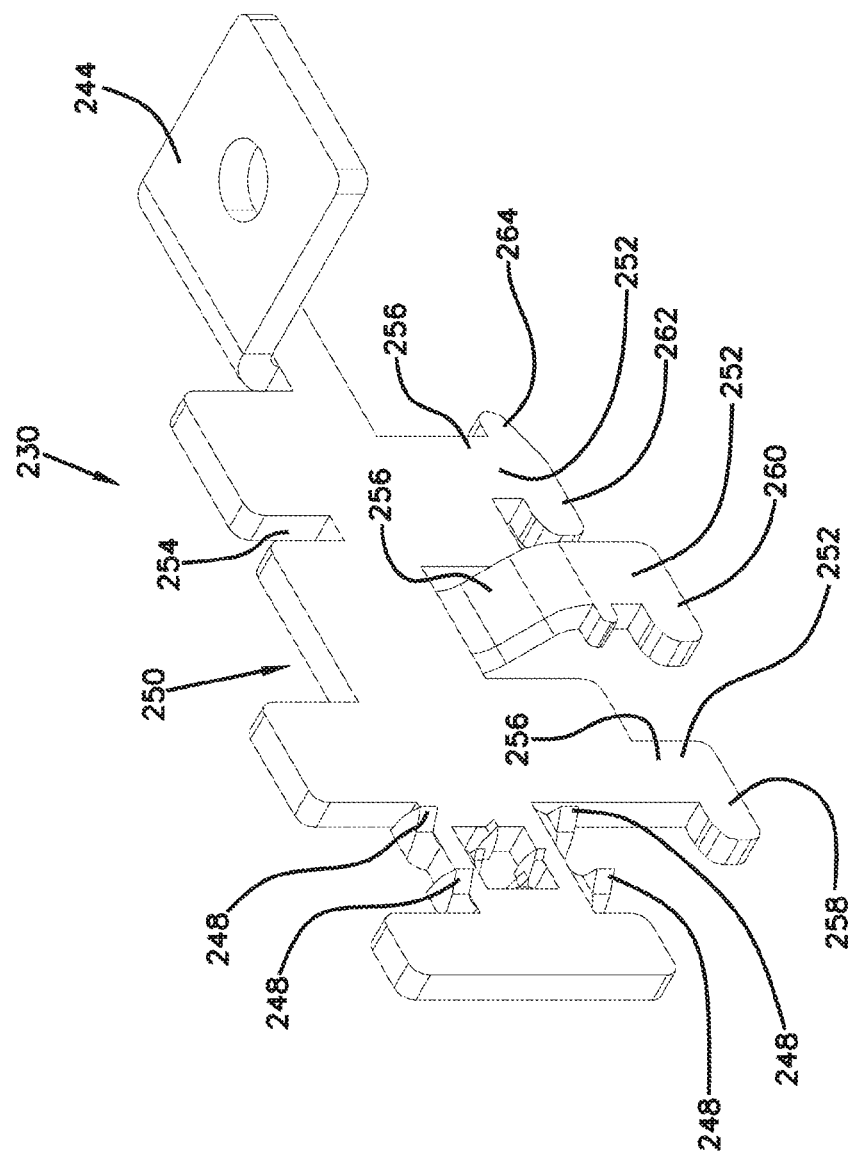
FIG. 18 is a perspective view of the body of the fixation unit of the assembly of FIG. 5.
Figure 21:
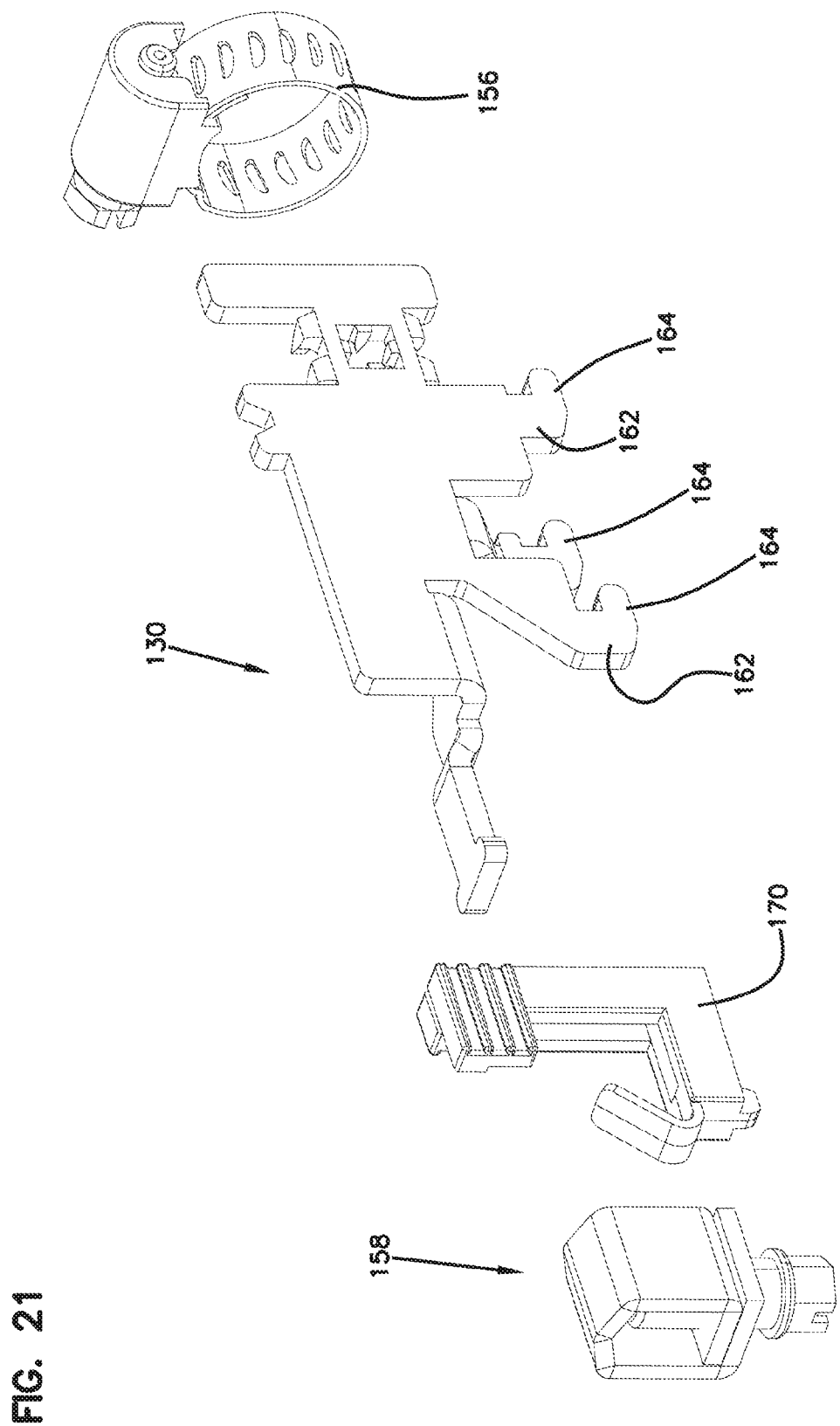
FIG. 21 is an exploded view of the fixation unit of FIG. 19.
Figure 23:
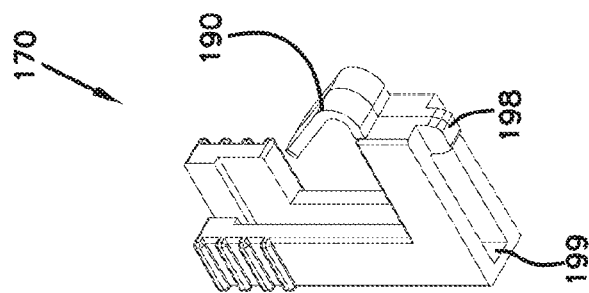
FIG. 23 is a further perspective view of the locking member of FIG. 22.

Referring to FIG. 18, the body 230 further includes a mounting portion 250 positioned proximally from the cable clamping portion and distally from the strength member clamping portion. The mounting portion 250 includes a notch 254 and three plate engageable members, each having a leg 256 and a foot 258, 260, 262 extending proximally from the corresponding leg 256.

It should be appreciated that, for all of the embodiments of cable fixation units described herein, the feet could extend distally rather than proximally from the legs without impacting the principles of operation relating to locking of the mounting portion to a base plate, which will be described in further detail below, and simply by changing references to distal motion to proximal motion and references to proximal motion to distal motion.

The feet 258 and 262 are aligned in the proximal-distal dimension, with the foot 262 being offset therefrom and extending from its leg along a line that is not collinear with the lines of extension of the feet 258 and 262 from their corresponding legs. The offset nature of the foot 262 provides stability to the fixation unit 208 against rotation when it is mounted to the base plate 206.

The locking member 236 cooperates with the notch 254 as further described below. Optionally, the locking member 236 further cooperates with a heel 264 extending from the leg 256 from which the foot 262 extends, as further described below.

Referring now to FIGS. 11-17, in this example, the locking member 236 is an integrally formed non-electrically conductive component (e.g., plastic). In other examples, the locking member can be an assembly of parts and/or at least partially electrically conductive. When the locking member is assembled in the assembly 200 (FIG. 9), the locking member 236 extends from a proximal end 296 to a distal end 298. The locking member includes a base 276, a body 270 extending from the base, and resiliently flexible arms 272, 274 extending from the body 270. The body 270 and the arms 272, 274 define a guide passage 292 so that a portion of the body of a cable fixation unit can be positioned in the guide passage 292 and the locking member 236 is slidable relative to the body of the cable fixation unit, the locking member 236 and body 270 thereby cooperating.

Protruding into the passage 292 from the two arms 272, 274 are shoulders 288 and 290. When the arms 272, 274 are in a relaxed (i.e., unflexed) configuration as shown in FIGS. 11-17, and the assembly 200 is assembled, the shoulders 288, 290 can act as a stop that prevents the body of the cable fixation unit from exiting the guide passage 292 (e.g., while handling a unit of the body 270 and the locking member 236).

Optionally, the arms 272, 274 also include a plurality of gripping elements 294 that facilitate handling of the locking member 236 and sliding of the locking member between different positions when assembling and/or disassembling the assembly 200.

Extending from the base 276 is a flexibly resilient tail 278 having a fixed end 282 attached to (or integral with) the base 276, and a free end 280. A bend 281 in the tail 278 allows the portion of the tail 278 between the bend 281 and the free end 280 to impart a biasing force, particularly when the free end 280 is urged towards the base 276.

The locking member 236 also includes a projection 283 projecting from the base 276. Optionally, the projection 283 includes one or more chamfers 284, 286 at distal and/or proximal ends of the projection 283. The projection 283 is configured to be inserted (i.e., is a portion of the locking member 236 that is insertable into) a slot of a base plate to thereby lock a cable fixation unit to the base plate. The chamfer 284 can facilitate insertion and removal of the projection 283 at the distal end of the slot into which the projection 283 is being inserted.

In some examples, when the assembly 200 (FIG. 9) is assembled, the distal end surface 285 of the projection 283 abuts the distal end of the corresponding slot (e.g., a slot 212), preventing distal movement of the cable fixation unit relative to the base plate. In other examples, a spacing between the distal end surface 285 and the distal end of the corresponding slot (e.g., as slot 212) allows for a small amount of distal movement of the fixation unit relative to the slot, but not enough distal movement to allow the feet of the mounting portion of the cable fixation unit to clear the proximal ends of their corresponding slots.

Referring now to FIGS. 7-10, a sequence of operations for mounting and un-mounting the fixation unit 208 and the base plate 206 to complete the assembly 200 will be described. For ease of illustration of FIGS. 7-10, the arrow 90 represents an upward direction, the arrow 92 represents a downward direction, the arrow 94 represents a proximal to distal direction, and the arrow 96 represents a distal to proximal direction. In at least some examples, the base plate 206 is pre-mounted to a closure with open space immediately below the base plate prior to performing the operations depicted in FIGS. 7-10, the open space being able to accommodate the feet of the fixation unit.

Figure 7:
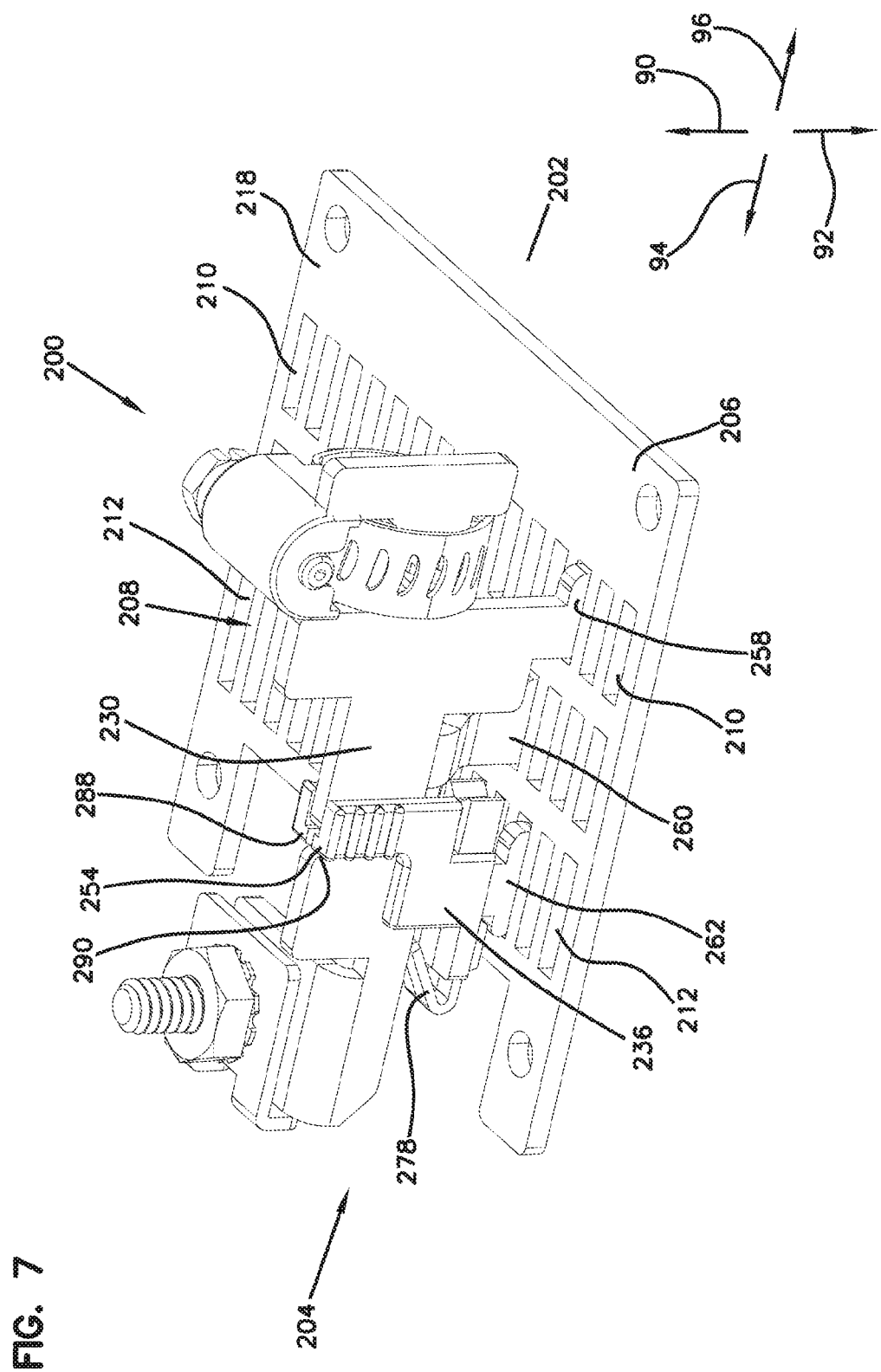
FIG. 7 is a perspective view of the assembly of FIG. 5 in a first unlocked configuration.

In FIG. 7, in a first mounting operation, the fixation unit 208 is moved downwards such that the foot 262 enters a slot 212, and the feet 258 and 260 enter two of the slots 210. The feet 258 and 262 are in the same column of slots, and the foot 260 is in a different column of slots. All three feet 258, 260, 262 are in mutually different rows of slots. Alternatively, two of the feet can be in the same row of slots.

Figure 8:
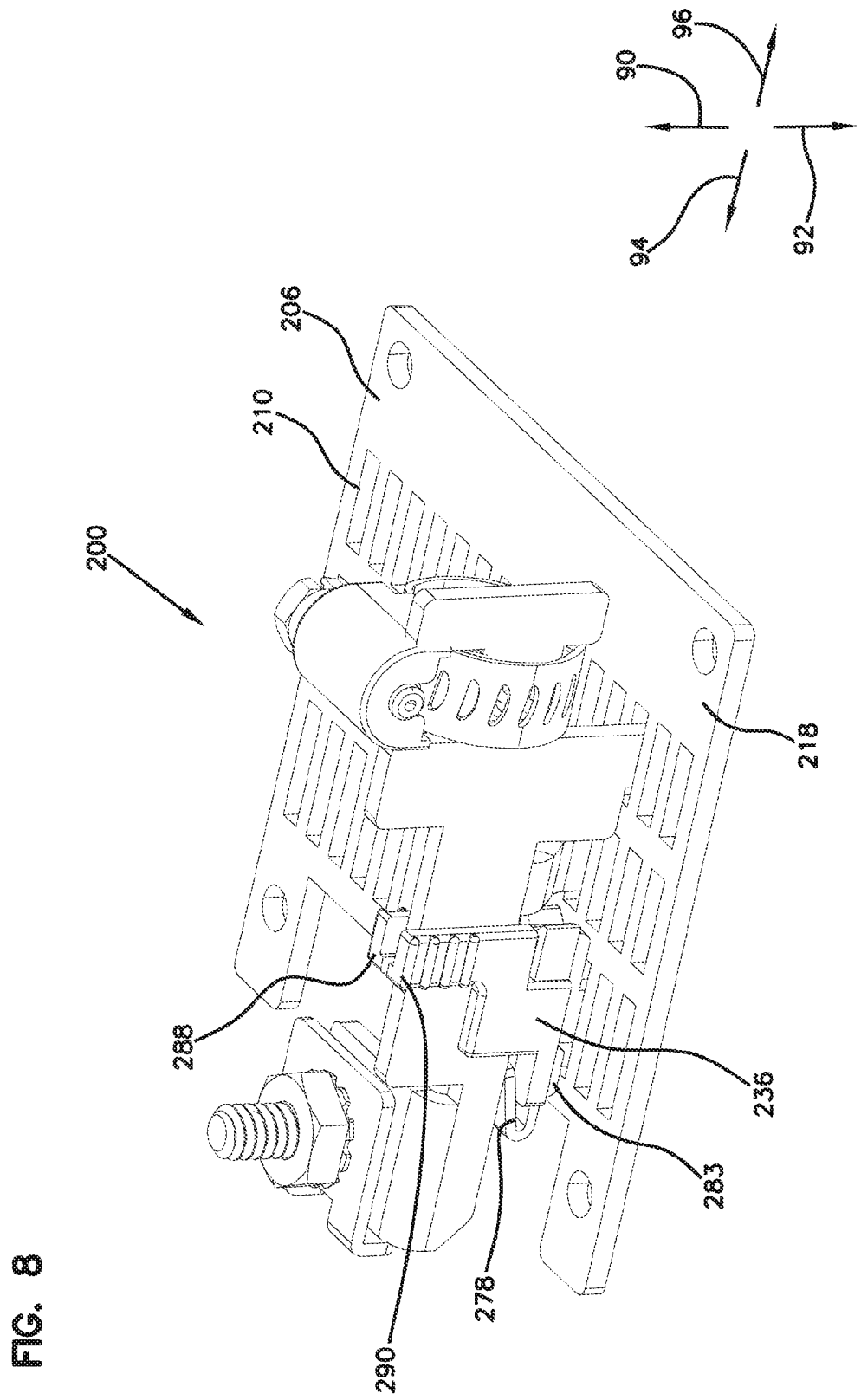
FIG. 8 is a perspective view of the assembly of FIG. 5 in a second unlocked configuration.

In FIG. 8 the fixation unit 208 has been pushed downwards sufficiently such that all three feet have cleared the bottom of the base plate 206. The projection 283 is being pressed against the upper surface 218 of the base plate 206 causing the flexibly resilient tail 278 to bend against the body 230 of the cable fixation unit, thereby loading the tail 278 with a biasing force and causing the shoulders 288, 290 to at least partially rise above the notch 254.

Figure 9:
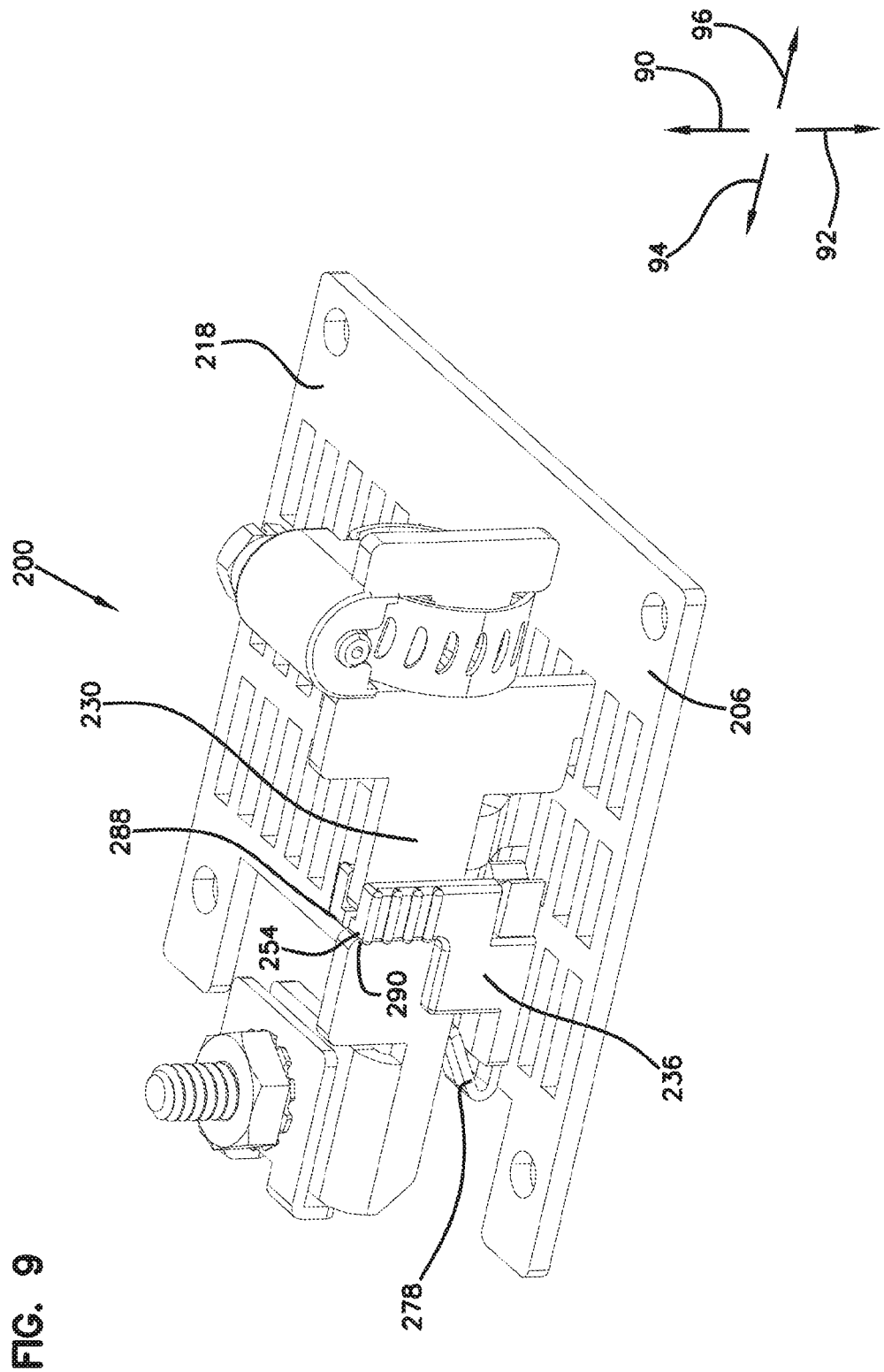
FIG. 9 is a perspective of the assembly of FIG. 5 in a locked configuration.
Figure 10:
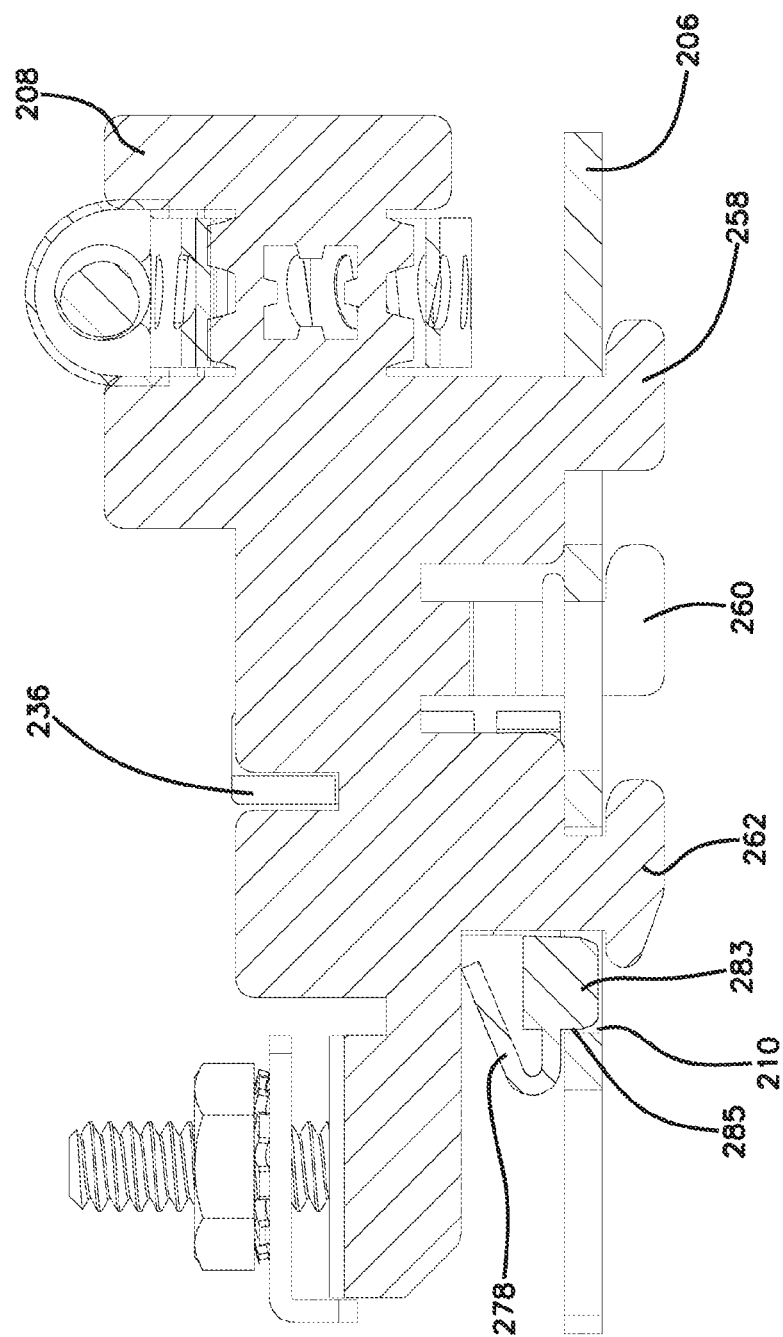
FIG. 10 is a cross-sectional view of the assembly of FIG. 5 in the locked configuration.
Figure 11:
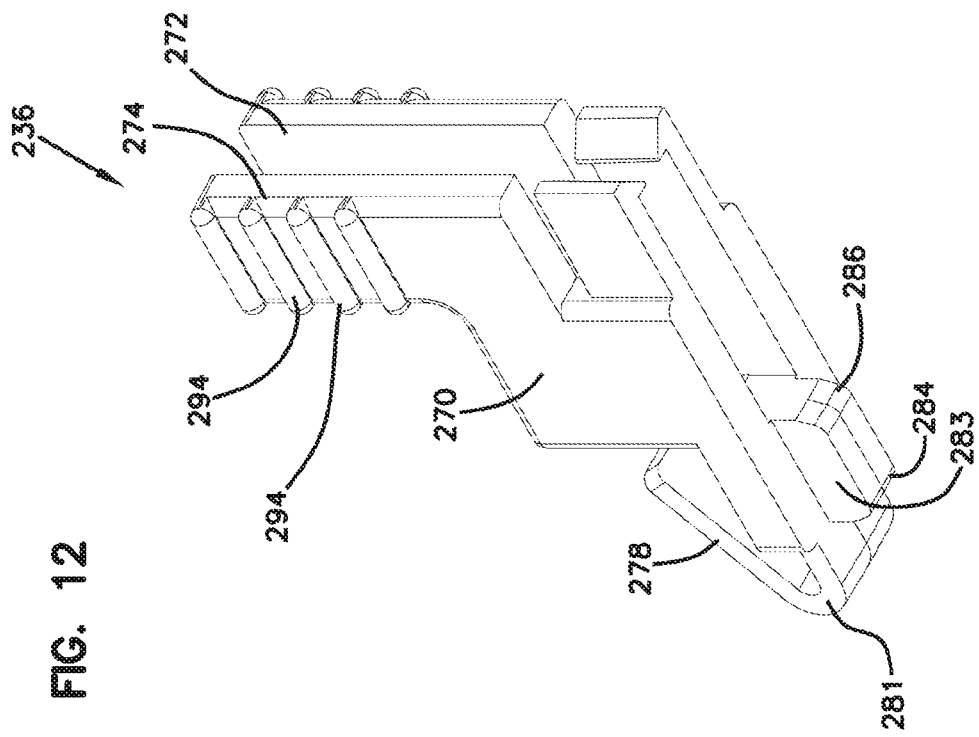
FIG. 11 is a perspective view of the locking member of the cable fixation unit of the assembly of FIG. 4.
Figure 12:
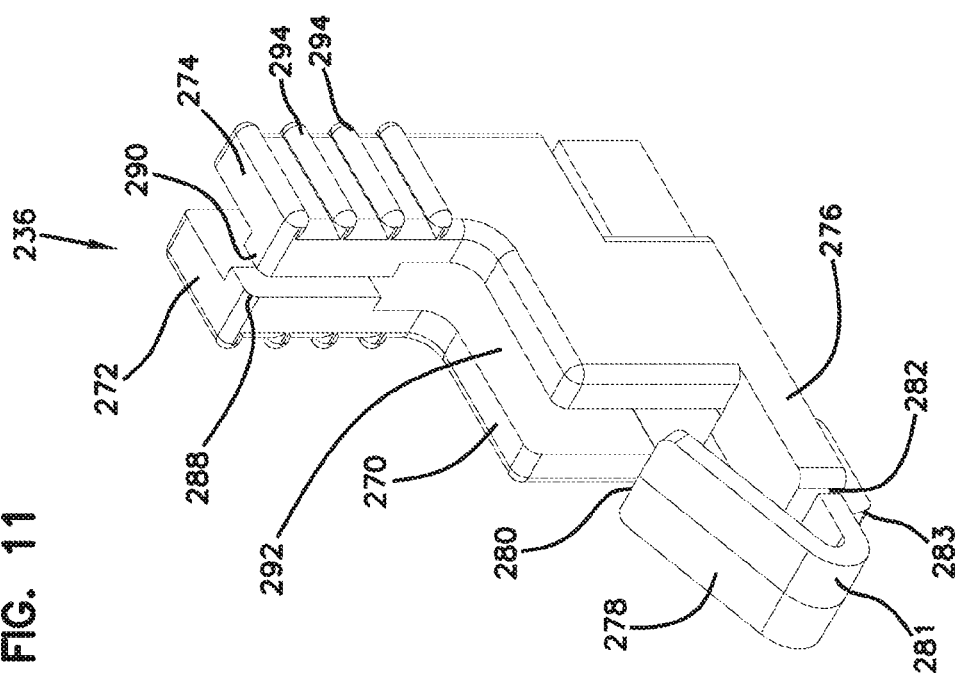
FIG. 12 is a further perspective view of the locking member of FIG. 11.
Figure 13:
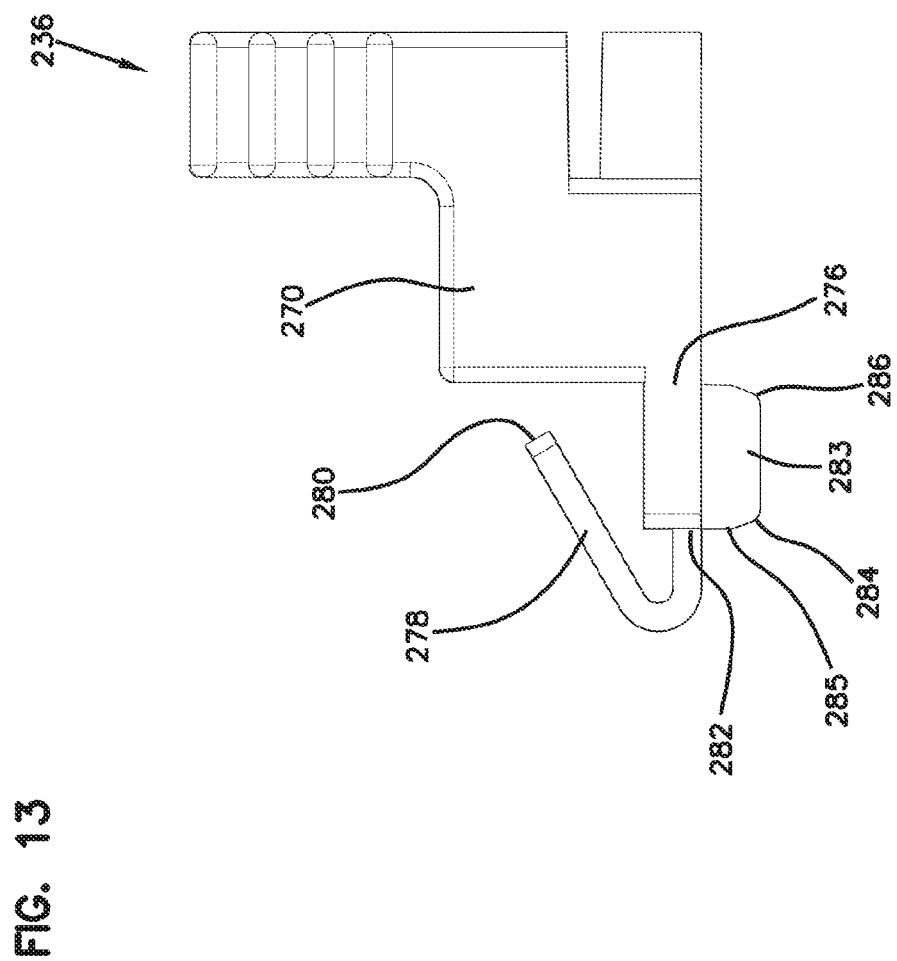
FIG. 13 is a side view of the locking member of FIG. 11.
Figure 15:
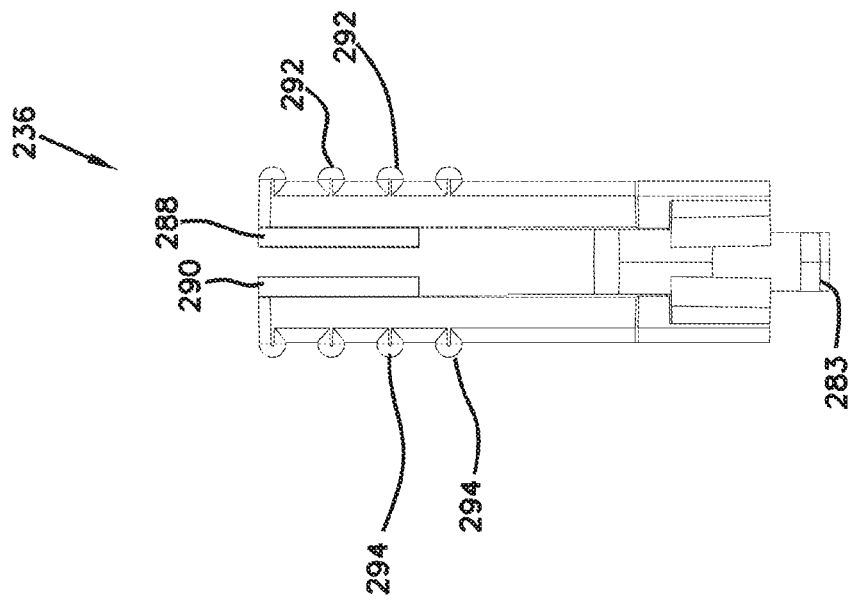
FIG. 15 is a proximal end view of the locking member of FIG. 11.
Figure 14:
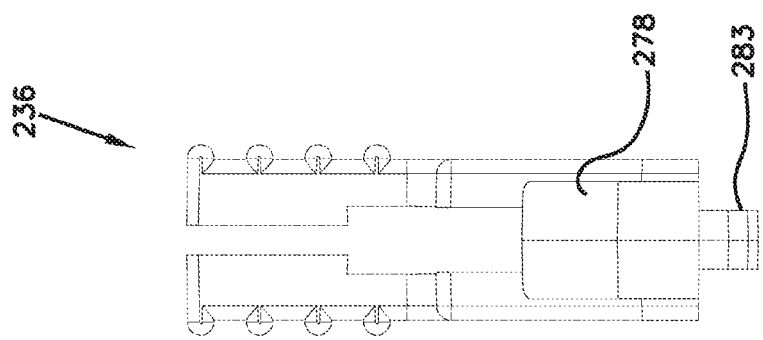
FIG. 14 is a distal end view of the locking member of FIG. 11.
Figure 17:
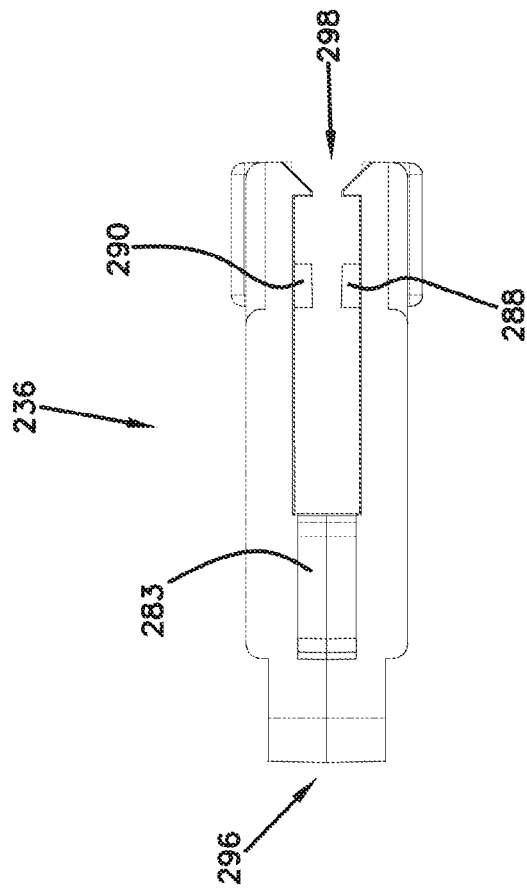
FIG. 17 is a further side view of the locking member of FIG. 11.
Figure 16:
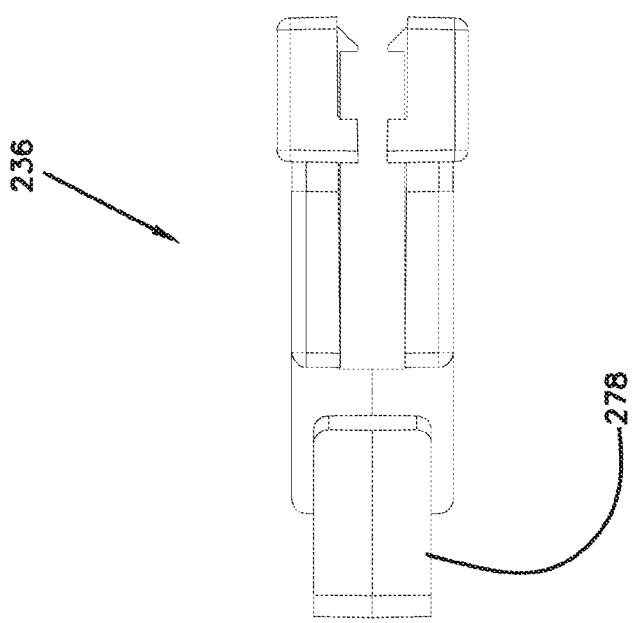
FIG. 16 is a further side view of the locking member of FIG. 11.

In FIGS. 9-10, the fixation unit 208 has been moved proximally from its position in FIG. 8, such that the proximal ends of the feet extend beyond the proximal end of the corresponding slots 210, 212. In addition, the projection 283 has been biased into the same slot as the foot 262 by the biasing action of the tail 278, the tail 278 unflexing as the projection 283 finds the slot, further causing the shoulders 288, 290 to seat in the notch 254. As shown in FIG. 10, the distal end of the projection abuts the distal end of the corresponding slot, preventing any further distal motion within the slot. Thus, the presence of the projection 283 within the slot prevents or sufficiently reduces the ability of the body 230 to move distally, thereby locking the cable fixation unit 208 to the base plate 206 by preventing the feet 258, 260, 262 from distally clearing the proximal ends of the corresponding slots. In particular, attempted distal movement of the body 230 is stopped by engagement of the body 230 with the base 276 of the locking mechanism 236.

Engagement of body to locking mechanism upon a distally directed force applied to the body 230 can occur at multiple locations, e.g., at the shoulders 288, 290, and between the leg 256 and the projection 283. Providing multiple contact locations between body and locking mechanism in this manner can help minimize or eliminate rotation of the body relative to the locking mechanism when a distal force is applied to the body. At this point, the jacket and/or strength member(s) of a cable can be clamped to the cable fixation unit 208.

Referring now to FIG. 9, to release the cable fixation unit 208 from the base plate 206, the arms of the locking member 236 can be grasped and the locking mechanism lifted upwards causing the tail to flex. With the locking mechanism lifted upwards, the projection 283 upwardly clears the corresponding slot 212 and, while still applying an upward force, the locking member 236 is also moved distally back to the position shown in FIG. 8, bringing the body 230 with it distally. At this point, the entire cable fixation unit 208 can be lifted upwards away from the base plate (as shown in FIG. 7), since the feet will have distally cleared the proximal ends of their corresponding slots 210, 212.

Referring now to FIGS. 19-26, the cable fixation unit 130 and assembly 100 will be described in greater detail. Many of the features and principles of the cable fixation unit 130 are similar to those of the cable fixation unit 208, and in the interest of brevity the following description will focus largely on the features of the unit 130 that differ from the unit 208.

The cable fixation unit 130 includes a body 150, a cable clamping portion 152 including (optionally) a hose clamp 156, and a strength member clamping portion 158. The strength member clamping 158 may or may not be electrically connected to ground. For example, the unit 130 can be used to fixate a cable having a non-electrically conductive strength member and therefore there is no need to provide a grounding connection to the strength member via the strength member clamping portion 158.

Extending from the body 150 is a mounting portion 160 that includes three base plate engageable members each having a leg 162 and a foot 164 projecting from each leg 162, with the projection of one of the feet 164 being offset from the others to provide stability to the unit 130. None of the legs 162 has a protruding heel. Each leg-foot construction partially defines a notch 166 configured to receive the portion of the base plate that defines the proximal end of a slot in the base plate when the unit 130 is locked to the base plate 106.

The unit 130 also includes a locking member 170 that is separate from the body 150 and is configured to slidably cooperate with the body 150 and a base plate 106 to lock and unlock a unit 130 relative to a base plate 106. The locking member 170 is made from a flexibly resilient material with rigidity, e.g., a plastic. The locking member 170 includes a base 172 and flexibly resilient arms 174, 176 extending from the base 172. The base 172 and the arms 174, 176 define guides passages 178, 180 through which a portion of the body 150 of the unit 130 can slide. To insert the body 150, the arms 174, 176 can be flexed apart (in the directions of the arrows 182 and 184), allowing the body 150 to pass between the shoulders 186, 188 protruding from the arms 174, 176. Once the body is inserted, the arms 174, 176 can resiliently return to their unflexed configuration, whereby the shoulders 186, 188 prevent or inhibit the body 150 from entirely disengaging the guide passages 178 and 180. Opposing the shoulders 186, 188, a wall 199 of the locking element 170 can serve a similar function of preventing decoupling of locking and element 170 and body 150.

A flexibly resilient tail 190 is attached to, or integral with, the base 172, and has a fixed end 192 and a free end 194. A bend 196 in the tail 190 allows the tail 190 to hold a biasing force when the free end 194 is flexed towards the base 172.

A chamfered base plate slot-insertable projection 198 projects from the base 172.

The locking member 170 operates similarly to the locking member 236 described above. As shown in FIG. 26, when the unit 130 is locked to the base plate 106, the feet 164 extend proximally beyond proximal ends of slots 116 in the base plate 106, and the slot-insertable projection 198 is a positioned in a slot 116 to prevent or reduce the ability to move the body 150 distally. The resiliently elastic tail 190 urges the projection 198 into the slot 116. To unlock the unit 130 from the base plate 106, the locking member arms are gripped and pulled to flex the free end of the elastic tail 190, at which point the projection 198 leaves the slot 116 and the unit 130 can be slid distally such that the feet 164 clear the proximal ends of the corresponding slots 116, allowing the unit 130 to be completely disengaged from the base plate.

Referring now to FIGS. 27-28, the locking and unlocking characteristics of the cable fixation unit 300 are identical to those of the unit 130 described above. The unit 300 includes a body 302. The strength member clamping portion 304 differs from that of the unit 130. In the unit 300, the strength member clamping portion 304 is configured to be electrically grounded and is further configured to clamp one or multiple electrically conductive strength rods of a cable whose jacket is fixed to the jacket clamping portion of the unit 300.

Figure 31:
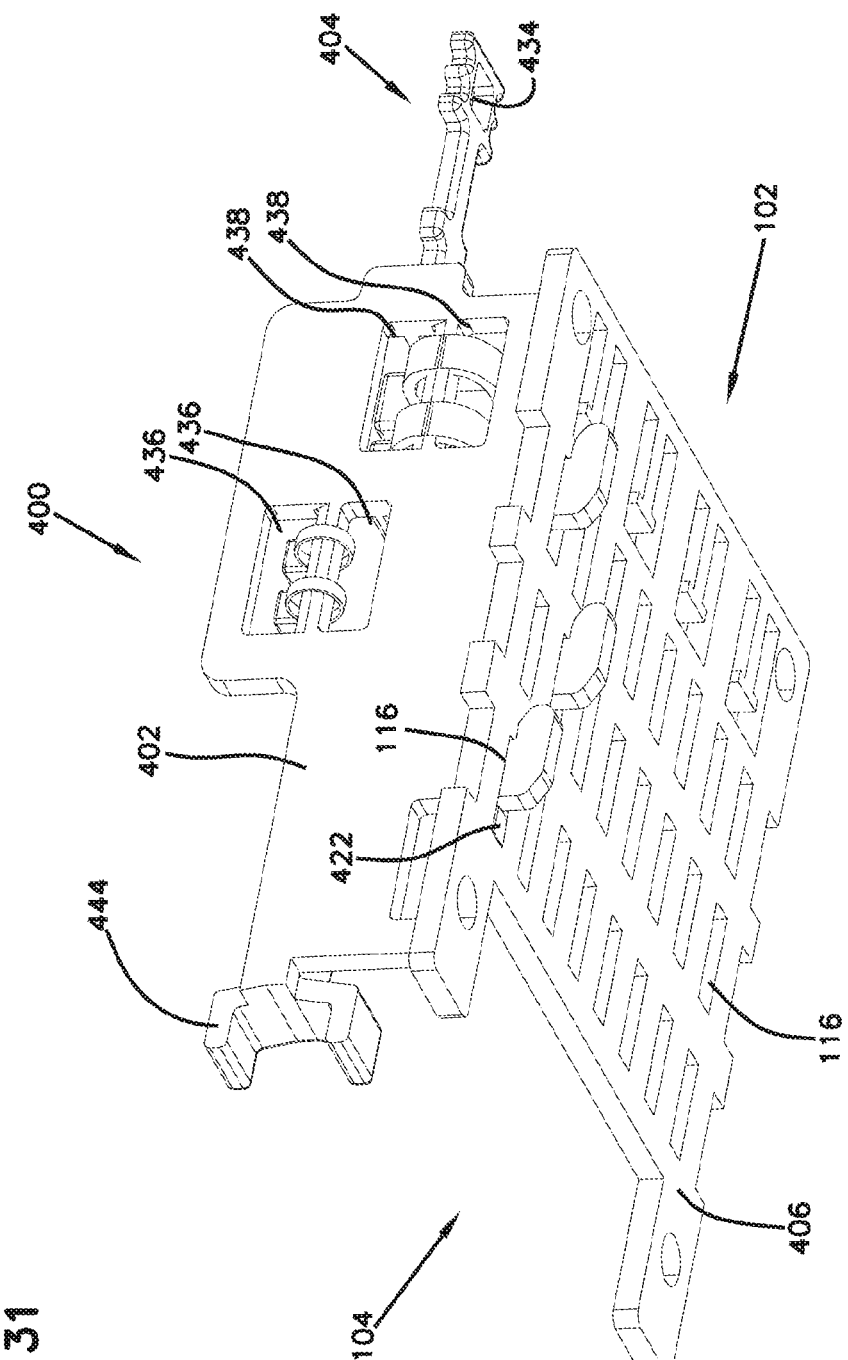
FIG. 31 is a perspective view of a further embodiment of a cable fixation assembly in accordance with the present disclosure and including the cable fixation unit of FIG. 29.

Referring now to FIGS. 29-31, the cable fixation unit 400 is generally configured for supporting smaller diameter cables than, e.g., the units 130 and 300 described above. For example, the fixation unit 400 is configured to support a pair of drop cables. For ease of description, the fixation unit 400 has a top 401 and a bottom 403. In some examples the entirety of the unit 400 is non-electrically conductive (e.g., molded from plastic). Unlike the units 130, 208, and 300, the locking mechanism of the unit 400 is integrally formed with (or otherwise attached to) the body of the unit.

A seal member support 404 includes first and second opposite surfaces 408 and 430. A first cable enters the closure and is affixed to the body 402, the first cable being positioned above the surface 408. A second cable enters the closure and is affixed to the body 402, the second cable being positioned below the surface 430. The first and second cables enter through the same cable port in the closure. Because two cables enter the same port, a gap can form in the seal at the port between the two cables. To plug the gap, an additional seal member can be provided, the seal member being mounted to the seal member support 404. The seal member support 404 includes teeth 432 and an opening 434, which can be filled by the sealing member, to enhance the coupling of the seal member to the support 404. The body 402 defines two pairs of openings 436 and 438 with a crossbar 440, 442 between each pair. Ties 407 can be fed through the openings 436, around the crossbar 440 and around the outer jacket of the first cable to secure the first cable to the body 402. Ties 409 can be fed through the openings 438, around the crossbar 442 and around the outer jacket of the second cable to secure the second cable to the body 402.

Positioned distally from the pairs of openings 436, 438 and extending from the body 402 is a strength member fixation anchor 444. The anchor 444 is configured to be wrapped with aramid yarn strength members of the first and second cables to thereby facilitate fixation of the cables' strength members.

A mounting portion 410 of the unit 400 extends from the body 402 and includes three legs, with a foot projecting from each leg. The legs are positioned to provide stability when the unit 400 is locked to a base plate (e.g., the base plate 106) or an adapter, as described in more detail below.

The locking mechanism of the unit 400 includes a cantilever arm 412 having an elbow 418 and being attached to, or integral with, the body 402. The cantilever arm 412 has a fixed end 414 that is fixed to the body 402, and a free end 416, the elbow 418 being positioned between the fixed end 414 and the free end 416. A slot-insertable projection 422 projects from the free end 416.

In FIGS. 29-30, the cantilever arm 412 is shown in an unflexed or relaxed position. The cantilever arm can be resiliently flexed about the elbow 418 such that the free end 416 moves into the opening 420.

To lock the unit 400 to a base plate 406, the mounting portion 410 is inserted in slots 116 as described above. In addition, the cantilever arm 412 is flexed (e.g., by hand, with a tool, or by the planar surface of the base plate 406) about the elbow 418 in the direction of the arrow 424. The unit 400 is then moved proximally until the projection 422 finds a slot 116, the cantilever arm 412 then returning to its relaxed position such that the projection 422 enters the slot 116 and prevents or inhibits distal movement of the unit 400 relative to the base plate 406. The base plate 406 is identical to the base plate 106 except for having fewer columns of slots and fewer mounting positions.

To remove the unit 400 from the base plate 106, the cantilever arm 412 is flexed again (as in the manner just described) such that the projection 422 clears the slot 116. At this point the unit 400 can be moved distally until the feet of the mounting portion 410 distally clear the proximal ends of their corresponding slots 116. At this point, the unit 400 can be entirely removed from the base plate 406.

Figure 41:
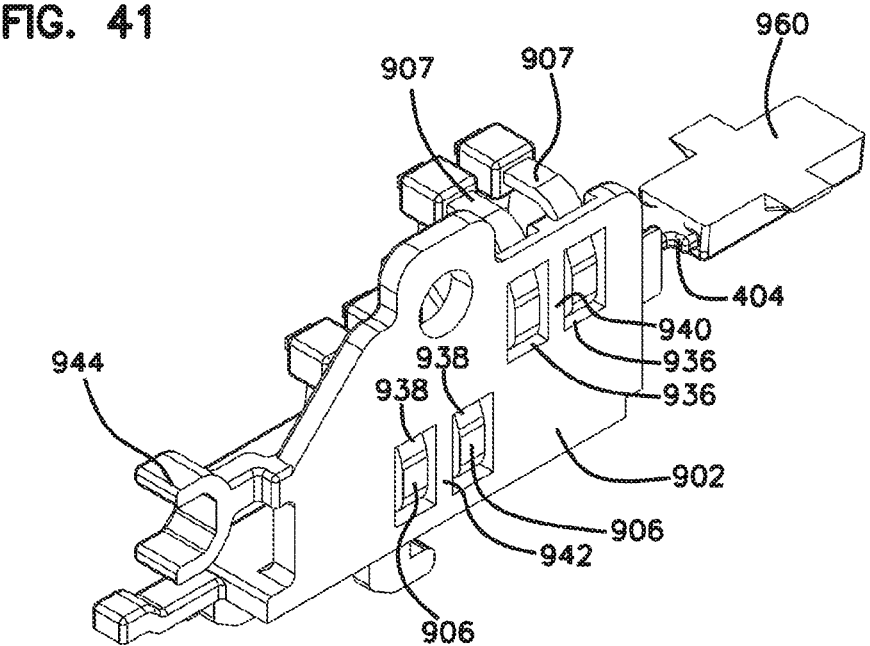
FIG. 41 is a perspective view of a further embodiment of a cable fixation unit that can be used as part of a cable fixation assembly in accordance with the present disclosure.
Figure 42:
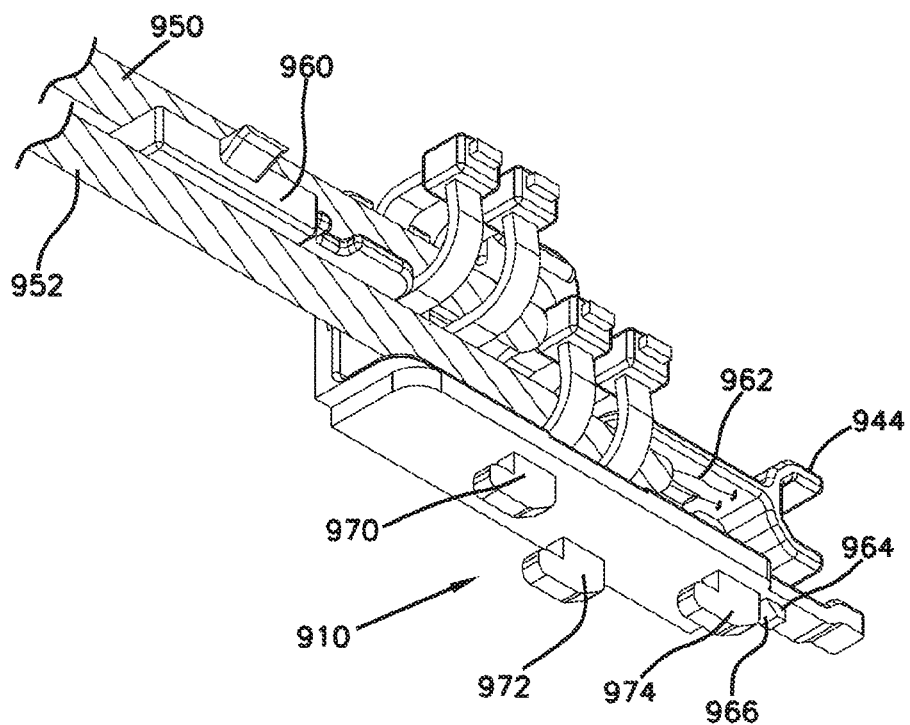
FIG. 42 is a further perspective view of the cable fixation unit of FIG. 41.

Referring now to FIGS. 41-42, the cable fixation unit 900 includes a body 902 and is generally configured for supporting smaller diameter cables than, e.g., the units 130 and 300 described above. For example, the fixation unit 900 is configured to support a pair of drop cables 950, 952 (not shown in FIG. 41). For ease of description, the fixation unit 900 has a top 901 and a bottom 903. In some examples the entirety of the unit 900 is non-electrically conductive (e.g., molded from plastic).

The unit 900 includes the seal member support 404 described above. A first cable 950 enters the closure and is affixed to the body 902, the first cable being positioned above the surface 408 of the seal member support 404 (FIG. 29). A second cable 952 enters the closure and is affixed to the body 902, the second cable being positioned below the surface 430 of the seal member support 404 (FIG. 29). The first and second cables 950, 952 enter through the same cable port in the closure. Because two cables enter the same port, a gap can form in the seal at the port between the two cables. To plug the gap, an additional sealing member 960 is provided, the sealing member 960 (e.g., a piece of gel) being mounted to the seal member support 404 as described above.

The body 902 defines two pairs of openings 936 and 938 with a crossbar 940, 942 between each pair. Ties 907 can be fed through the openings 936, and around the outer jacket of the first cable 950 to secure the first cable to the body 902. Ties 906 can be fed through the openings 938 and around the outer jacket of the second cable 952 to secure the second cable to the body 902.

Positioned distally from the pairs of openings 936, 938 and extending from the body 402 is a strength member fixation anchor 944. The anchor 944 is configured to be wrapped with aramid yarn strength members 962 (schematically represented) of the first and second cables to thereby facilitate fixation of the cables' strength members.

A mounting portion 910 of the unit 900 extends from the body 902 and includes three legs 970, 972, 974, with a foot projecting from each leg. The legs are positioned to provide stability when the unit 900 is locked to a base plate (e.g., the base plate 106) or to an adapter, as described in more detail below.

A locking member includes a wedge 964 defining a ramp 966. The wedge 964 is integrally formed with the body 902. The wedge 964 is positioned distally of the distal-most leg 974.

The wedge 964 is positioned to be inserted in a slot of a base plate or an adapter when the unit 900 is moved proximally such that the feet proximally extend beyond proximal ends of their corresponding slots. Inserted in a slot in this manner, the wedge 964 prevents or inhibits distal movement of the unit 900 relative to the base plate or adapter, effectively locking the unit 900 to the base plate or adapter.

To remove the unit 900 from the base plate or adapter, a tool can be used to engage the wedge 964 and pry it out of the corresponding slot, the wedge 964 being small enough to completely clear the slot even while the feet have not yet cleared the proximal ends of their corresponding slots. Once the wedge 964 has cleared the slot, the unit 900 can be moved distally until the feet clear the proximal ends of the slots. At this point, the unit 900 can be completely removed from the base plate or adapter.

Figure 34:
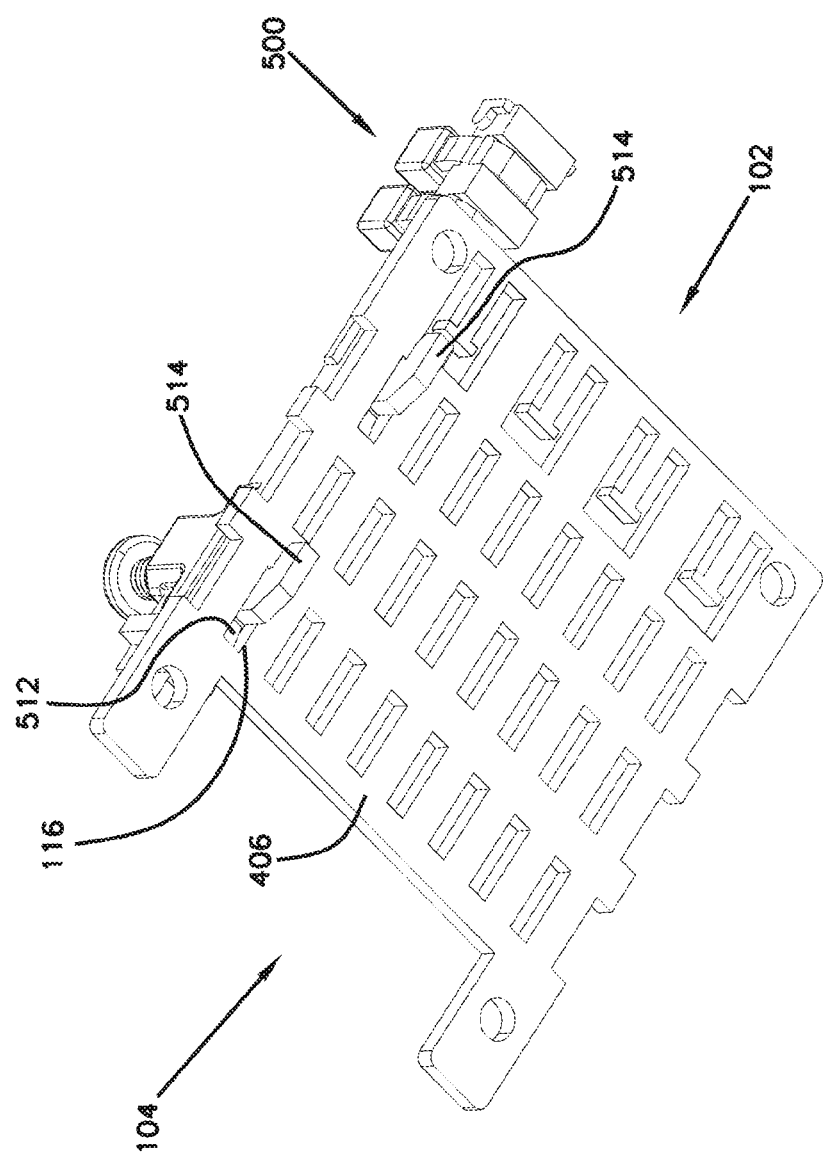
FIG. 34 is a perspective view of a further embodiment of a cable fixation assembly in accordance with the present disclosure and including the cable fixation unit of FIG. 32.

Referring now to FIGS. 32-34, in a further embodiment of a cable fixation unit 500, the unit 500 includes a body 502 that supports a cable jacket clamping portion 504 and a strength member clamping portion 506. A jacket of a cable can be clamped to the cable jacket clamping portion 504 using one or more ties 508. A mounting portion 510 extends from the body 502 and includes two legs 512 with a foot 514 projecting from each leg. A locking member includes a wedge 516 defining a ramp 518. The wedge 516 is integrally formed with the body 502. The wedge 516 is positioned distally of the distal-most leg 512. The ramp 518 inclines away from the rest of the body 502 as the wedge 516 extends distally.

As shown in FIG. 34, the wedge 516 is positioned to be inserted in a slot 116 when the unit 500 is moved proximally such that the feet 514 proximally extend beyond proximal ends of their corresponding slots 116. Inserted in a slot 116 in this manner, the wedge 516 prevents or inhibits distal movement of the unit 500 relative to the base plate 406 (or adapter), effectively locking the unit 500 to the base plate 406.

To remove the unit 500 from the base plate 406 (or adapter), a tool can be used to engage the wedge 516 and pry it out of the corresponding slot 116, the wedge 516 being small enough to completely clear the slot even while the feet 514 have not yet cleared the proximal ends of their corresponding slots. Once the wedge 516 has cleared the slot 116, the unit 500 can be moved distally until the feet 514 clear the proximal ends of the slots 116. At this point, the unit 500 can be completely removed from the base plate 406 (or adapter).

Figure 35:
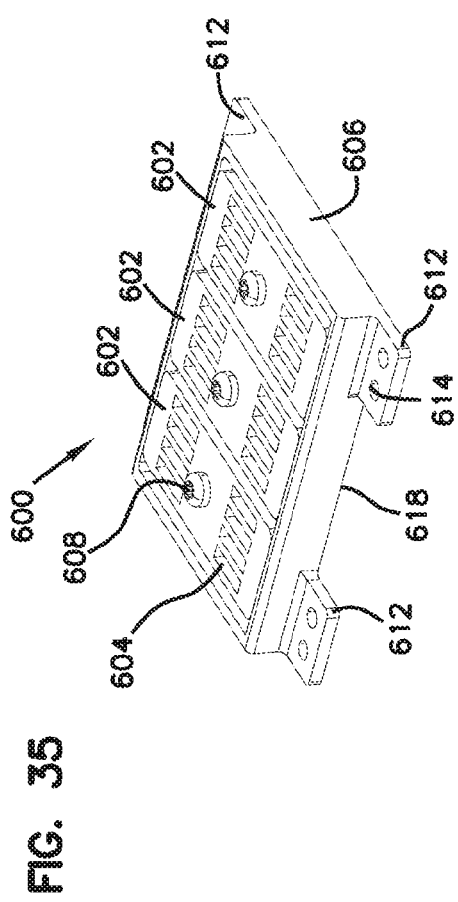
FIG. 35 is a perspective view of an embodiment of a support structure that can be used as part of a cable fixation assembly in accordance with the present disclosure.
Figure 37:
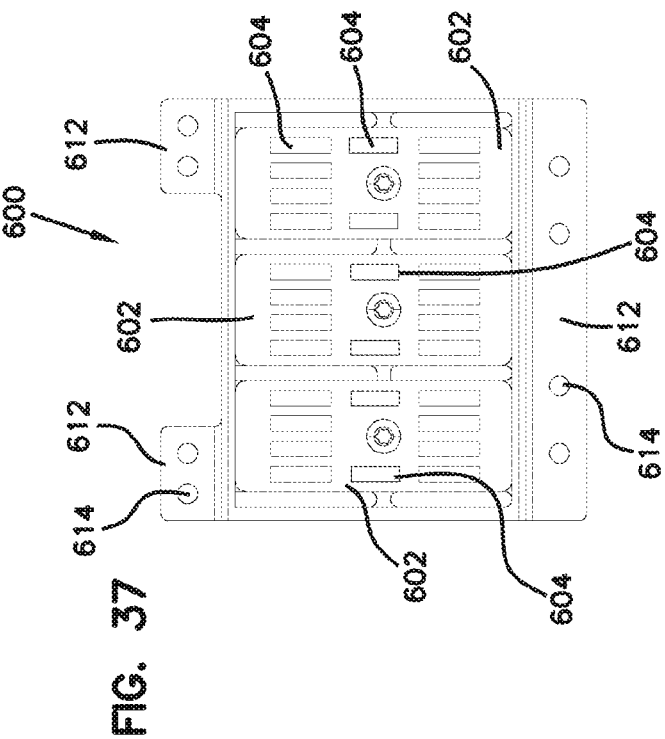
FIG. 37 is a further side view of the support structure of FIG. 35.
Figure 36:
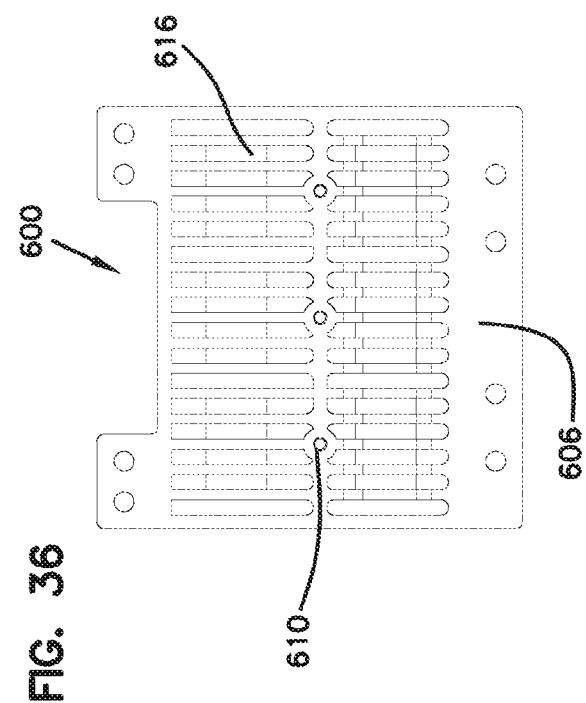
FIG. 36 is a side view of the support structure of FIG. 35.

Referring now to FIGS. 35-37, a further embodiment of a base plate assembly 600 is shown. The base plate assembly 600 can substitute for, e.g., the base plates 106, 206, 406 described above.

The assembly 600 includes a plurality of electrically conductive base plates 602 (e.g., made from metal) that are each individually secured to a non-conductive outer frame 606 (e.g., made from plastic) with fasteners (e.g., screws 608) inserted through fastener holes in the base plates 602 and through fastener holes 610 in the frame 606. In this example, the frame 606 secures three of the base plates 602. However, any number of base plates can be supported by a frame.

Each of the base plates 602 includes a plurality of through-slots 604 arranged as a grid of rows and columns of slots. The through-slots 604 are configured to receive the slot engageable members of cable fixation units, as described above.

When secured to the frame 606, the base plates 602 are electrically isolated from one another since they are only coupled to one another via the non-conductive frame 606. Due to this electrical isolation, a cable fixed to one of the base plates 602 is electrically isolated from a cable fixed to another of the base plates 602. By electrically isolating the cables in this manner, an electrical surge in one cable is less likely to impact another cable. In addition, this arrangement can facilitate toning, whereby a cable is traced by transmitting an electrical signal from one location along the cable and detecting the signal when at another location along the cable (e.g., within a closure). Because the cables are electrically isolated from one another, a toning signal sent down one cable is less likely to jump to, or be confused with, another cable.

The frame 606 includes slots 616 that align with the slots 604. Thus, the feet of the mounting portions of cable fixation units can be accommodated in the slots 616 when the fixation unit is locked to a base plate 602. In addition, a bottom edge 618 of the frame is spaced (in the top-bottom dimension) from the bottom planar surfaces of the base plates 602. A plurality of mounting feet 612 are provided on the frame 606. The mounting feet 612 include mounting holes 614 through which fasteners can be passed to fasten the assembly 600 to a closure.

Figure 38:
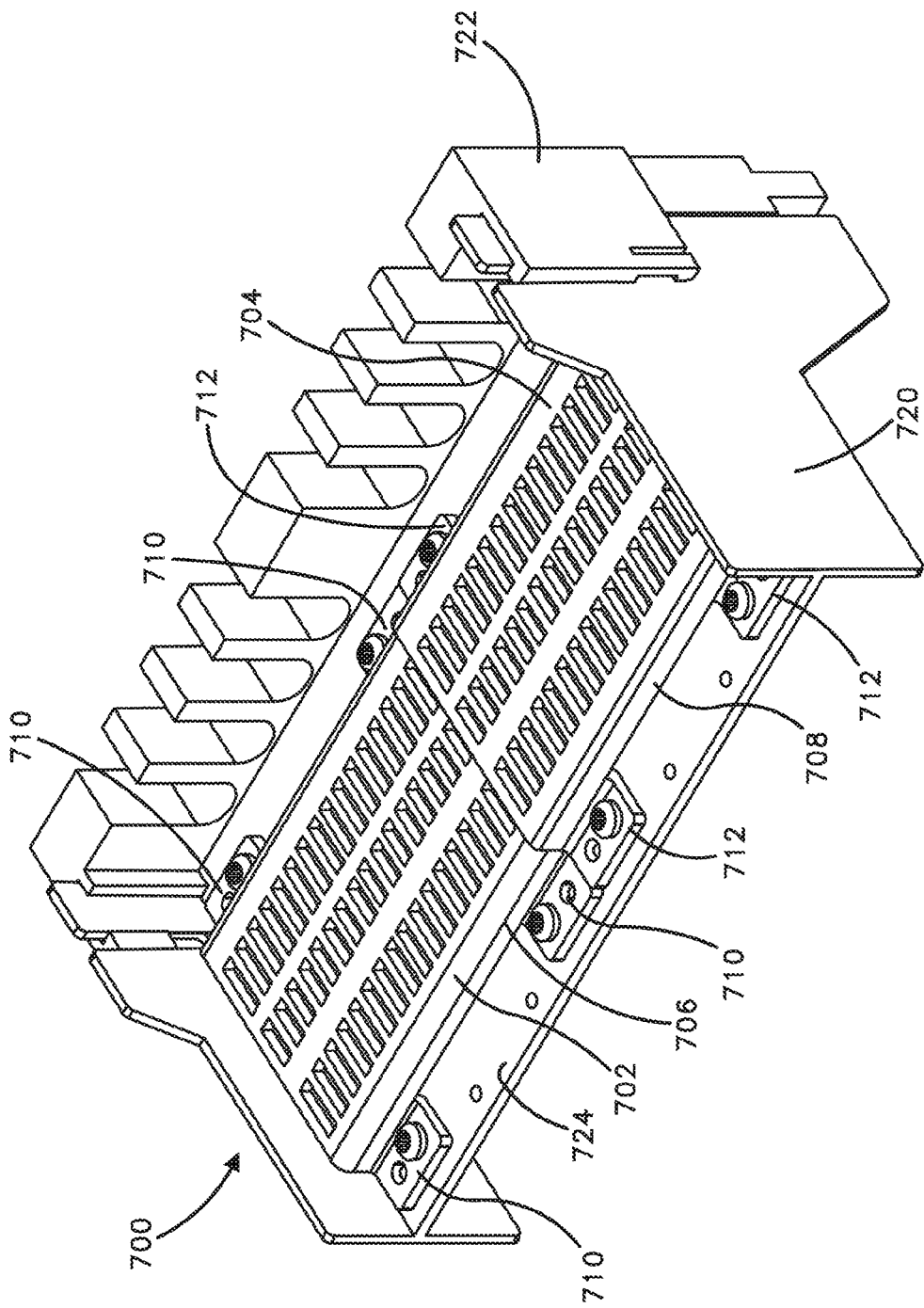
FIG. 38 is a perspective view of a partial telecommunications closure assembly including embodiments of base plates of a cable fixation assembly in accordance with the present disclosure.

Referring now to FIG. 38, a further embodiment of a base plate assembly 700 is shown. The base plate assembly 700 can substitute for, e.g., the base plates and base plate assemblies 106, 206, 600 described above.

The assembly 700 includes an electrically conductive base plate 702 and a non-electrically conductive base plate 704. The base plate 702 can be metal and therefore relatively strong and able to support relatively large diameter cables, as well as provide grounding capabilities via the base plate. The base plate 704 can be plastic and support relatively smaller diameter cables, as well as provide electrical isolation between multiple cables mounted thereto.

The base plates 702 and 704 are mounted to a base plate support structure 720 positioned within a closure (not shown). The support structure 720 is itself coupled to a cable seal block 722.

The base plates 702 and 704 includes support legs 706, 708 which elevate the slots of the base plates above a surface 724 of the support structure 720, such that the feet of mounting portions of cable fixation units can be accommodated in the space provided by the support legs 706, 708. In addition, the elevated positioned of the slots can better align fixated cables with their corresponding cable ports. Extending from the support legs 706, 708 are mounting feet 710, 712 with through holes adapted to receive fasteners (e.g., screws) to secure the base plates 702, 704 to the support structure 720.

Figure 39:
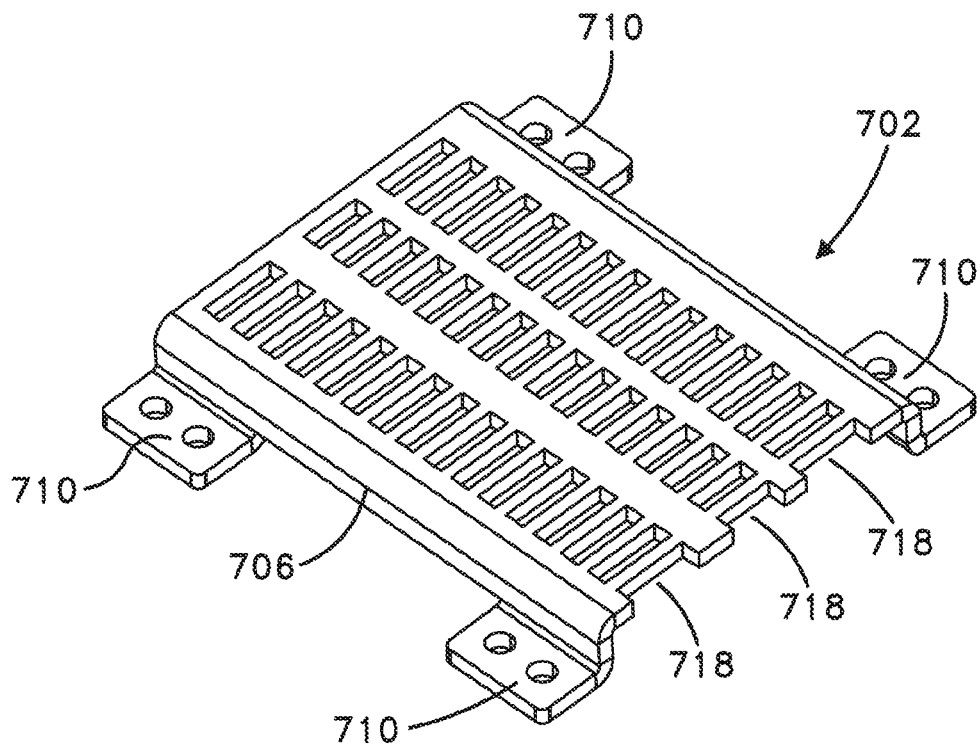
FIG. 39 is a perspective view of one of the base plates of FIG. 38.
Figure 40:
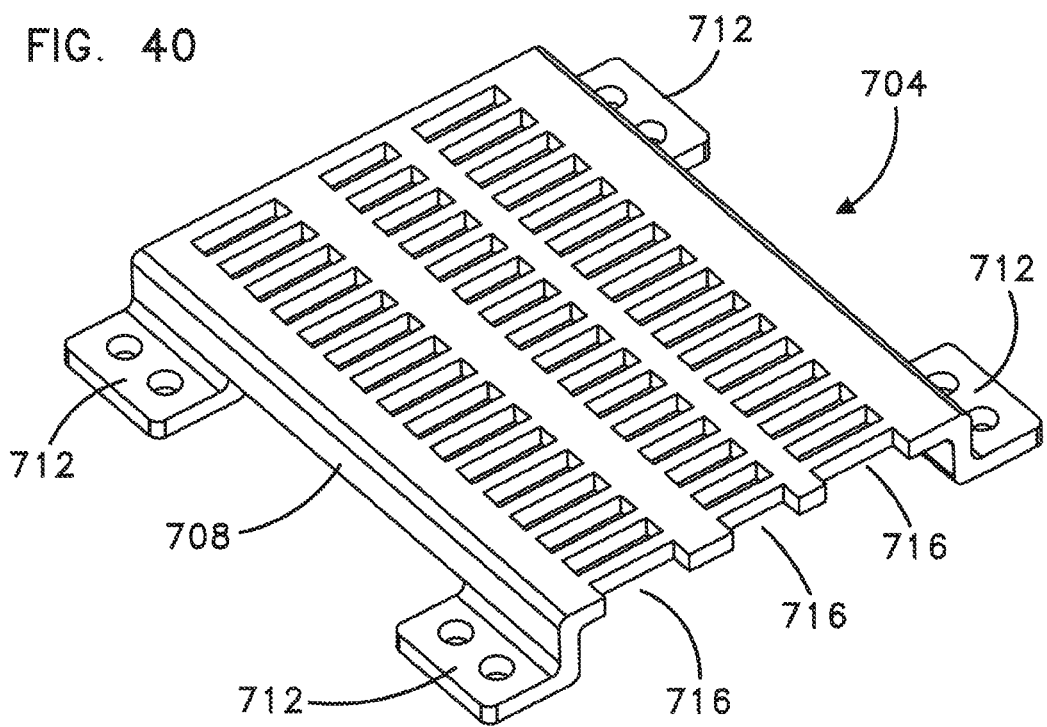
FIG. 40 is a perspective view of the other of the base plates of FIG. 40.

Referring to FIGS. 39-40, each of the base plates 702, 704 includes a column of partial slots 716. The partial slots 716 of one base plate can be juxtaposed those of another base plate to provide an additional column of complete slots that can be used as a selectable fixation position for a cable fixation unit, thereby maximizing usable space within a closure.

Figure 43:
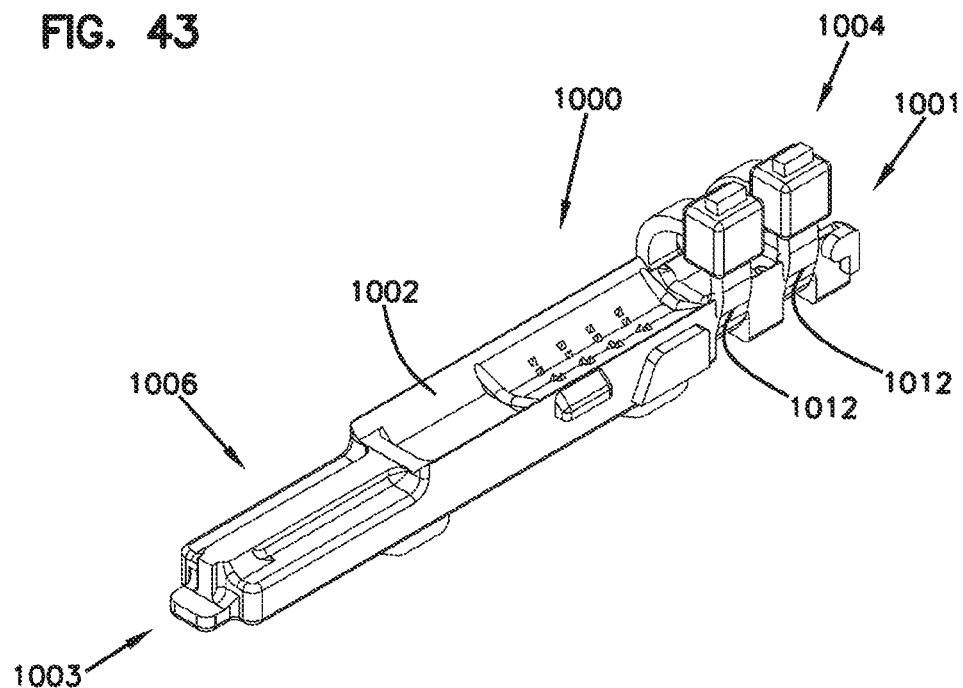
FIG. 43 is a perspective view of a further embodiment of a cable fixation unit that can be used as part of a cable fixation assembly in accordance with the present disclosure.
Figure 44:
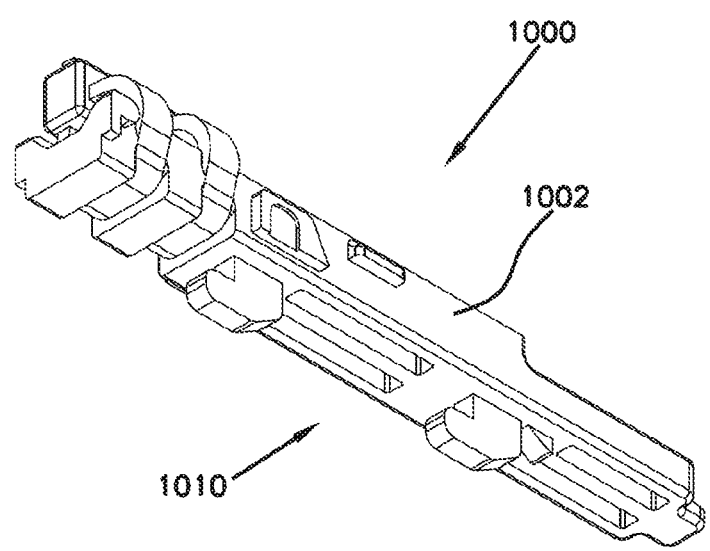
FIG. 44 is a further perspective view of the cable fixation unit of FIG. 43.

Referring now to FIGS. 43-44, a further embodiment of a cable fixation unit 1000 is depicted. The unit 1000 includes a body 1002 and extends from a proximal end 1001 to a distal end 1003. The body 1002 includes a cable jacket clamping portion 1004 and a strength member fixation portion 1006. The unit 1000 is configured to fix a single cable, such as a drop cable, with ties 1012 or other fasteners around the body 1002. A mounting portion 1010 extends from the body 1002 and is identical in construction and operation to the mounting portion 510 described above, allowing the unit 1000 to be lockingly and removably mounted to a slotted base plate or slotted adapter.

Figure 45:
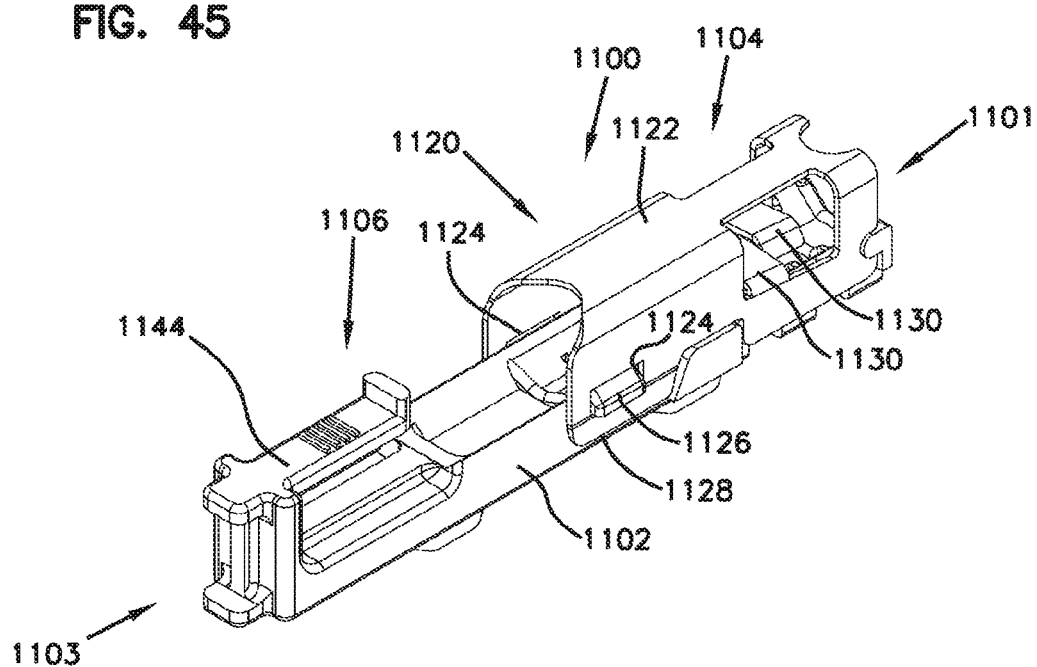
FIG. 45 is a perspective view of a further embodiment of a cable fixation unit that can be used as part of a cable fixation assembly in accordance with the present disclosure.
Figure 46:
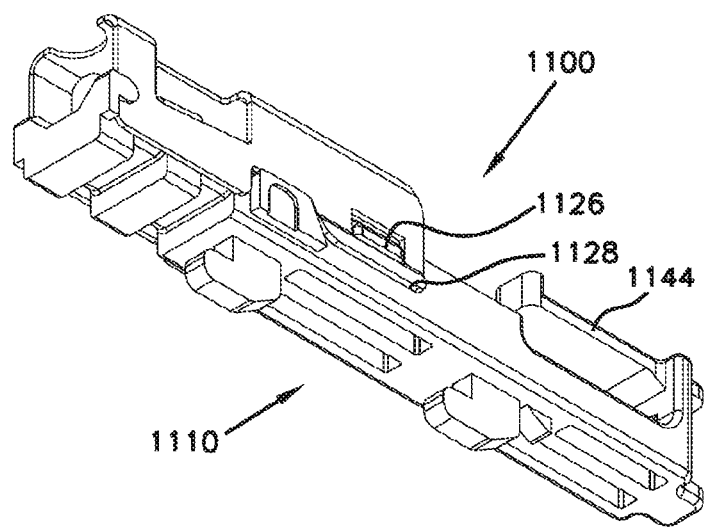
FIG. 46 is a further perspective view of the cable fixation unit of FIG. 45.
Figure 47:
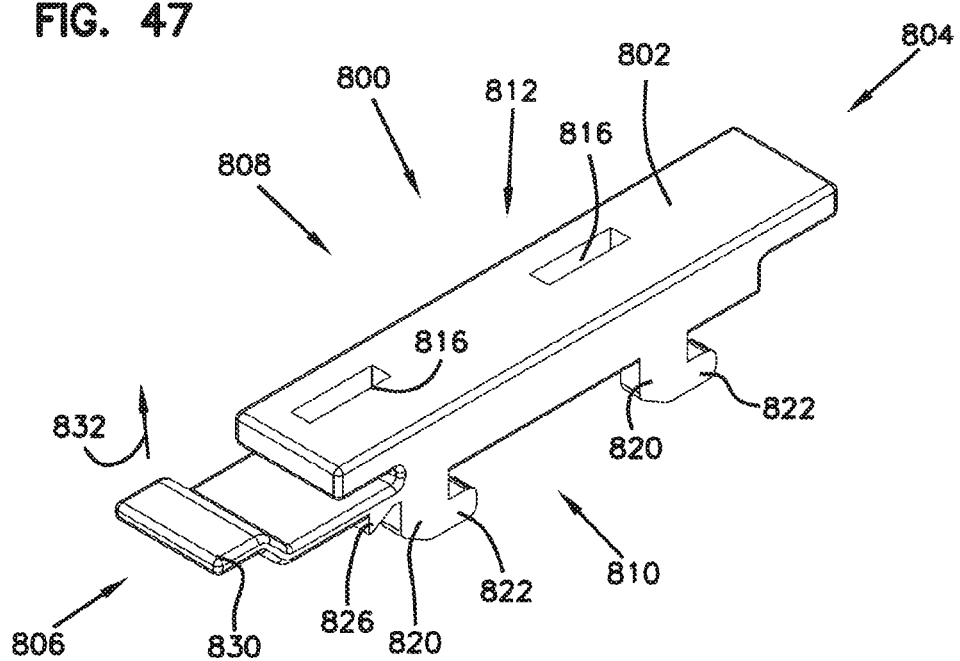
FIG. 47 is a perspective view of an embodiment of an adapter that can be used as a part of a cable fixation assembly in accordance with the present disclosure.
Figure 48:
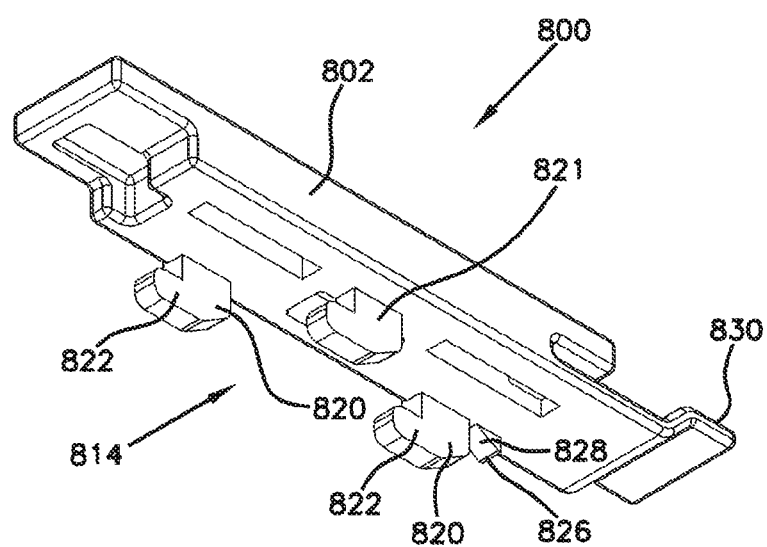
FIG. 48 is a further perspective view of the adapter of FIG. 47.
Figure 49:
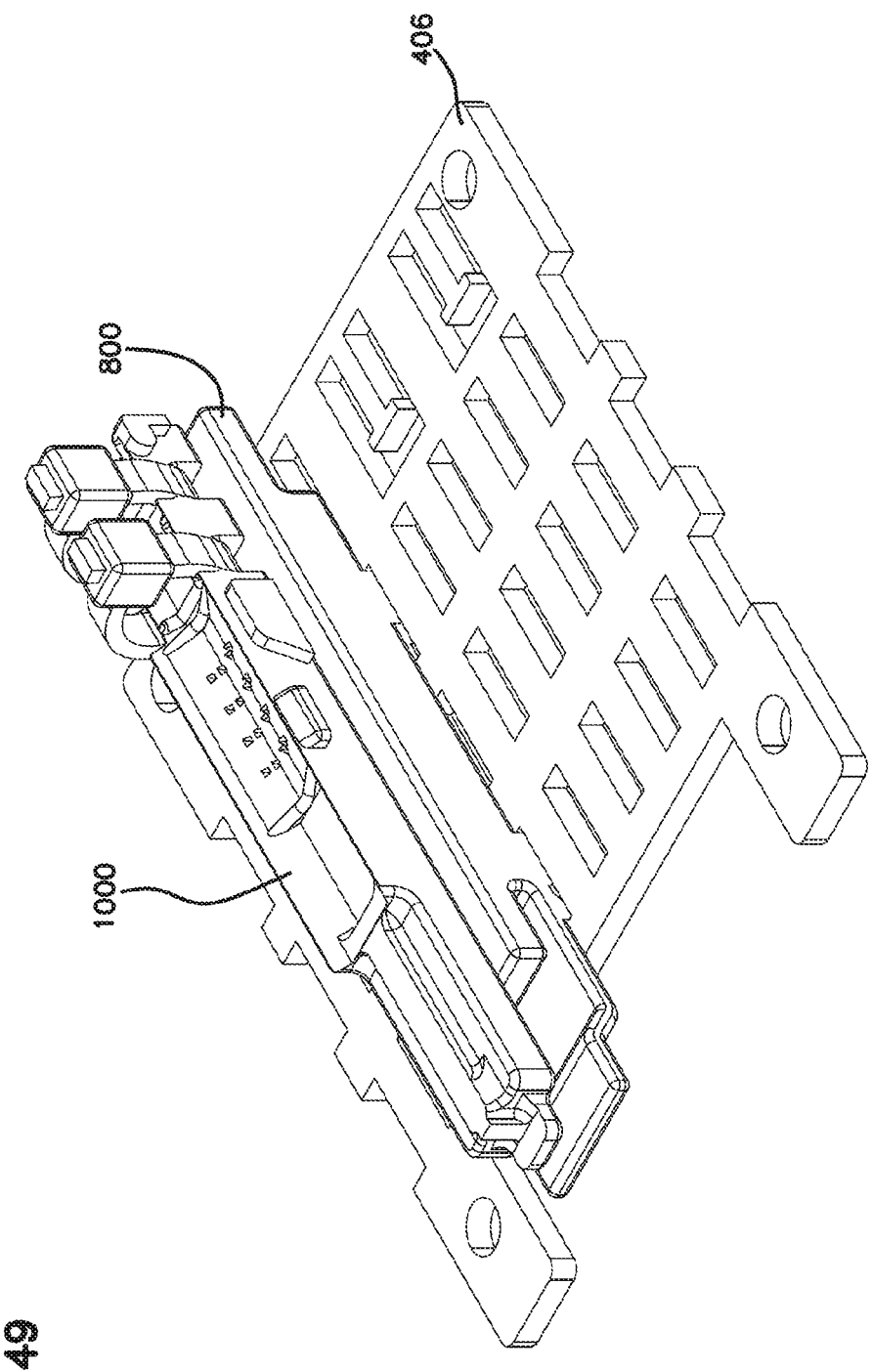
FIG. 49 is a perspective view of an embodiment of a cable fixation assembly in accordance with the present disclosure.
Figure 50:
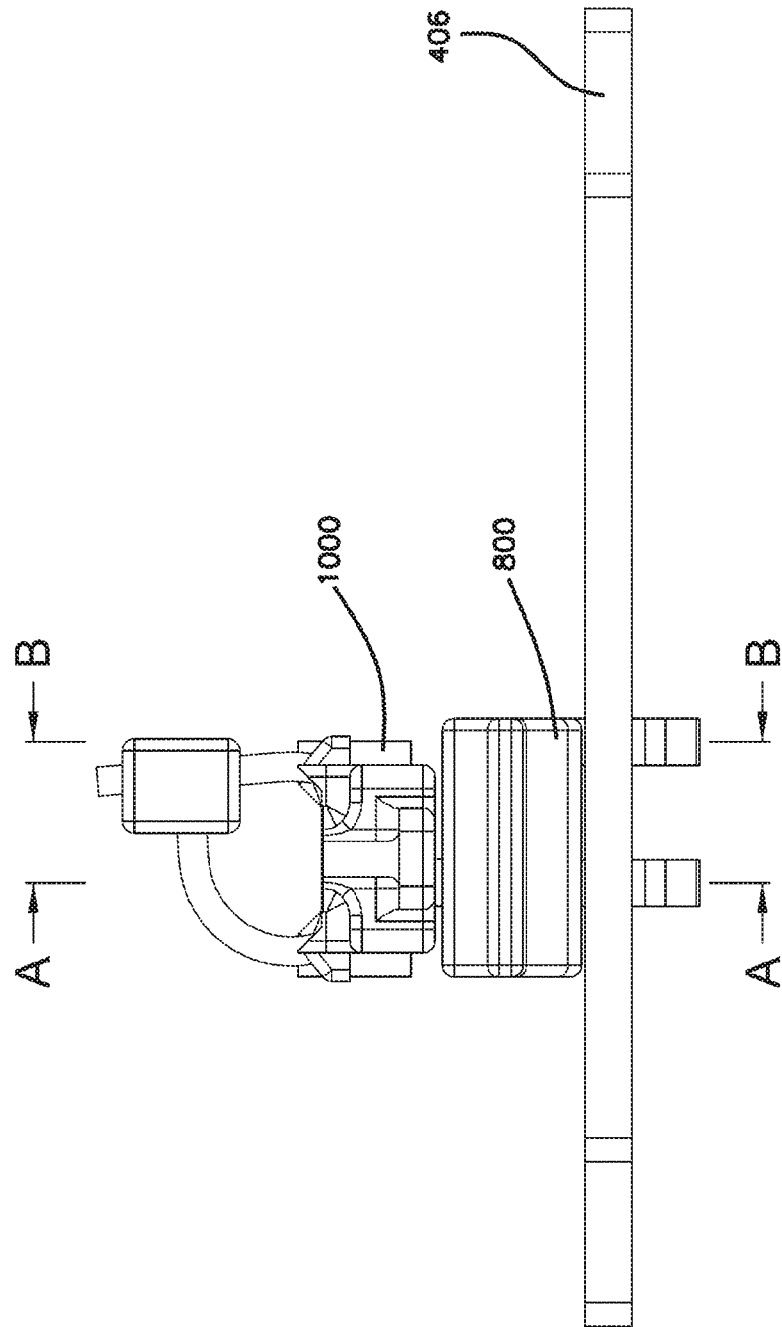
FIG. 50 is an end view of the assembly of FIG. 49.
Figure 51:
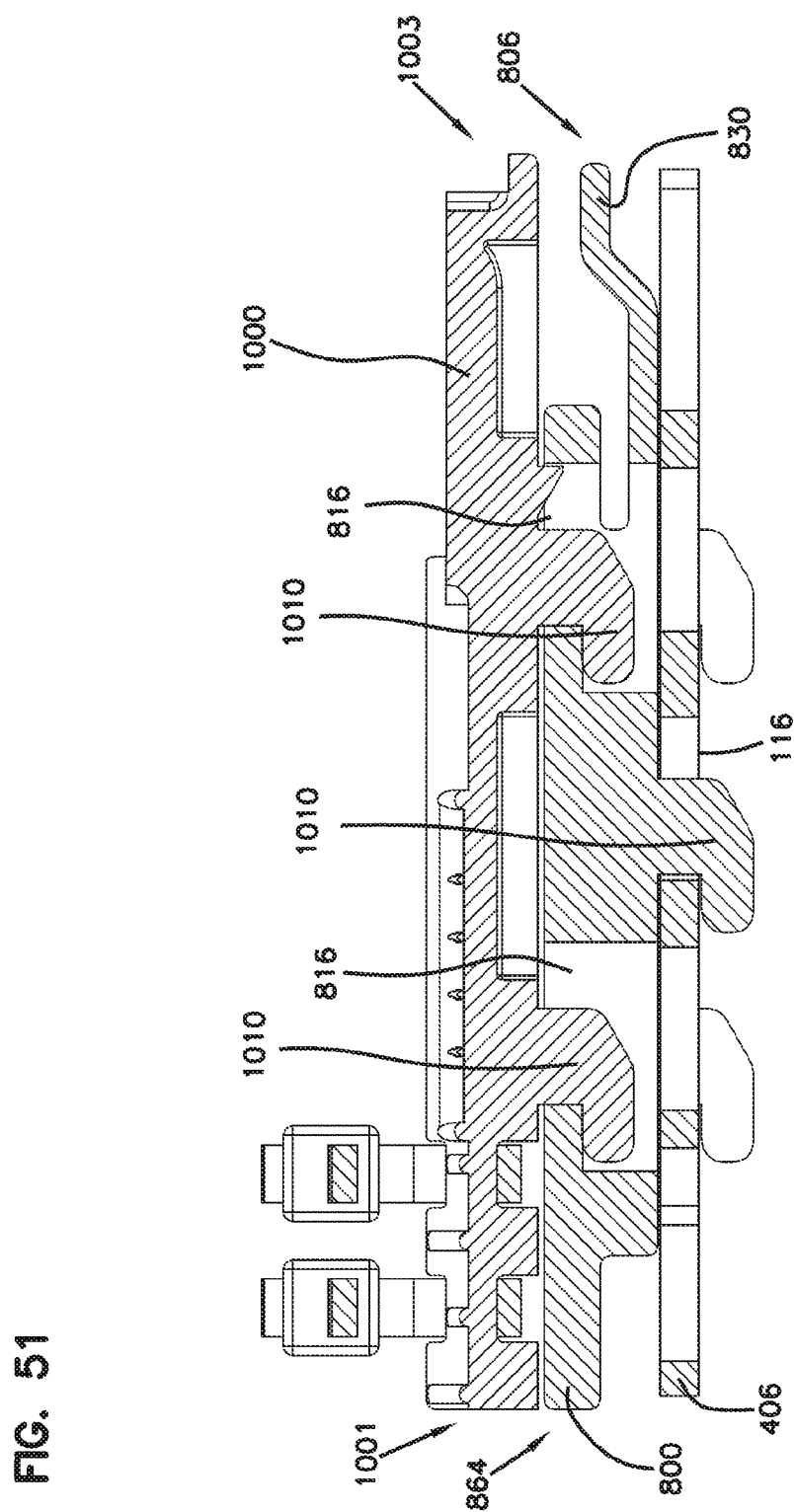
FIG. 51 is a cross-sectional view of the assembly of FIG. 49 along the line A-A in FIG. 50.
Figure 52:
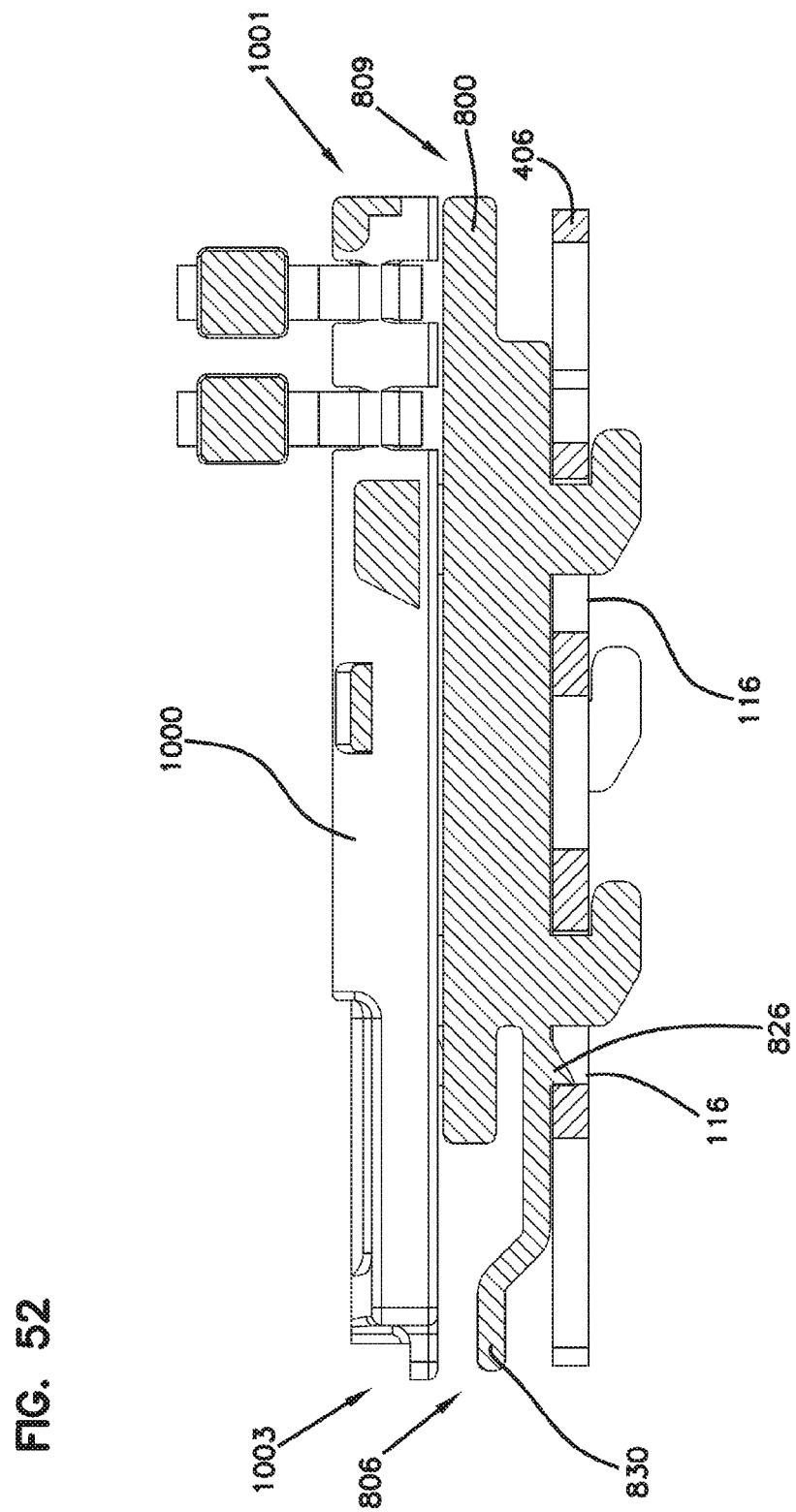
FIG. 52 is a cross-sectional view of the assembly of FIG. 49 along the line B-B in FIG. 50.

Referring now to FIGS. 45-46, a further embodiment of a cable fixation unit 1100 is depicted. The unit 1100 includes a body 1102 and extends from a proximal end 1101 to a distal end 1103. The body 1102 includes a cable jacket clamping portion 1104 and a strength member fixation portion 1106. The unit 1100 is configured to accommodate a single cable, such as a drop cable.

The cable jacket fixation portion 1004 includes a holder 1120. The holder 1120 includes a holder body 1122 that releasably locks to the body 1102 of the unit 1100. Openings 1124 defined by the holder body 1122 receive locking projections 1126 projecting from the body 1102. Release tabs 1128 extending from the holder body 1122 can be resiliently flexed to disengage the locking projections 1126 from the openings 1124 to thereby detach the holder 1120 from the body 1102. The holder 1120 includes one or more cable jacket retaining tongues 1130 configured to engage the cable jacket and fix the cable jacket between the retaining tongues 1130 and the body 1102. Additionally or alternatively, ties or other fasteners can be used to affix the cable jacket to the body 1102, as described above.

The strength member clamping portion 1106 includes an anchor 1144 configured for strength member fibers (e.g., aramid yarn) to be wrapped around the anchor 1144 to facilitate fixation of the yarn.

A mounting portion 1110 extends from the body 1102 and is identical in construction and operation to the mounting portion 510 described above, allowing the unit 1100 to be lockingly and removably mounted to a slotted base plate or slotted adapter.

For some closures, aligning cables entering the closure with the cable ports through which those cables enter the closure can present a challenge, particularly for smaller cables such as drop cables. Referring to FIGS. 47-52, an adapter component 800 of a cable fixation assembly (or simply, an adapter 800) is depicted. The adapter 800 includes a body 802. For ease of description, the body 802 extends between a proximal end 804 and a distal end 806, and from a top 808 to a bottom 810. The body 802 defines a cable fixation unit mounting portion 812 at the top 808, and a base plate mounting portion 814 at the bottom 810. The base plate mounting portion 814 is configured to lockingly and releasably engage with slots in a slotted based plate, such as any of the slotted based plates described herein. The cable fixation unit mounting portion 812 is configured to lockingly and releasably engage with a mounting portion of a cable fixation unit, such as a mounting portion of one of the cable fixation units described herein. In particular, the cable fixation mounting portion 812 is configured to lockingly and releasably engage with a mounting portion of a cable fixation unit that affixes one or more relatively small cables such as a drop cable. In this manner the adapter 800 serves to support the cable fixation unit while serving as a spacer for distancing the cable fixation unit from the base plate such that the cable or cables affixed to the cable fixation unit is/are better aligned with the corresponding cable port.

The cable fixation mounting portion 812 includes two slots 816 adapted to receive and lockingly engage, e.g., one of the mounting portions 510, 1010, or 1110 described above and thereby lock in one of the units 500, 1000, 1100 to the adapter 800. The slots 816 are open at the top and bottom, extending completely through a thickness of the body 802, such that the feet of the legs of the mounting portions 510, 1010, 1110, have space below the body 802 to move proximally and distally for engagement and disengagement, respectively. It should be appreciated that the mounting portions 510, 1010, 1110 lock into and unlock from the slots 816 in the same manner as they do with respect to the slots of a base plate as described above.

The mounting portion 814 extends from the body 802 and includes two legs 820 with a foot 822 projecting from each leg, and an optional third leg 821 with a foot for providing additional stability against rotation when the adapter 800 and a base plate are engaged. A locking member includes a wedge 826 defining a ramp 828. The wedge 826 is integrally formed with the body 802. The wedge 826 is positioned distally of the distal-most leg 822. The wedge 826 is positioned to be inserted in a slot of a base plate (e.g., a slot 116 of a base plate 106) when the adapter is moved proximally such that the feet 822 proximally extend beyond proximal ends of their corresponding slots of the base plate (see FIG. 52). Inserted in a slot in this manner, the wedge 826 prevents or inhibits distal movement of the adapter 800 relative to the base plate, effectively locking the adapter 800 to the base plate.

To remove the adapter 800 from a base plate a flexibly resilient wedge release arm 830 is provided, extending distally from the body 802. The wedge 826 projects from a bottom surface of the release arm 830. Thus, when the release arm 830 is flexed upwards (i.e., in the direction of the arrow 832), the wedge 826 is urged upwards out of its base plate slot. Once the wedge 826 has cleared the slot, the adapter 800 can be moved distally until the feet 822 clear the proximal ends of the corresponding slots. At this point, the unit 800 can be completely removed from the base plate. Removal of the fixation unit from the adapter 800 can be achieved in a similar fashion.

Figure 53:
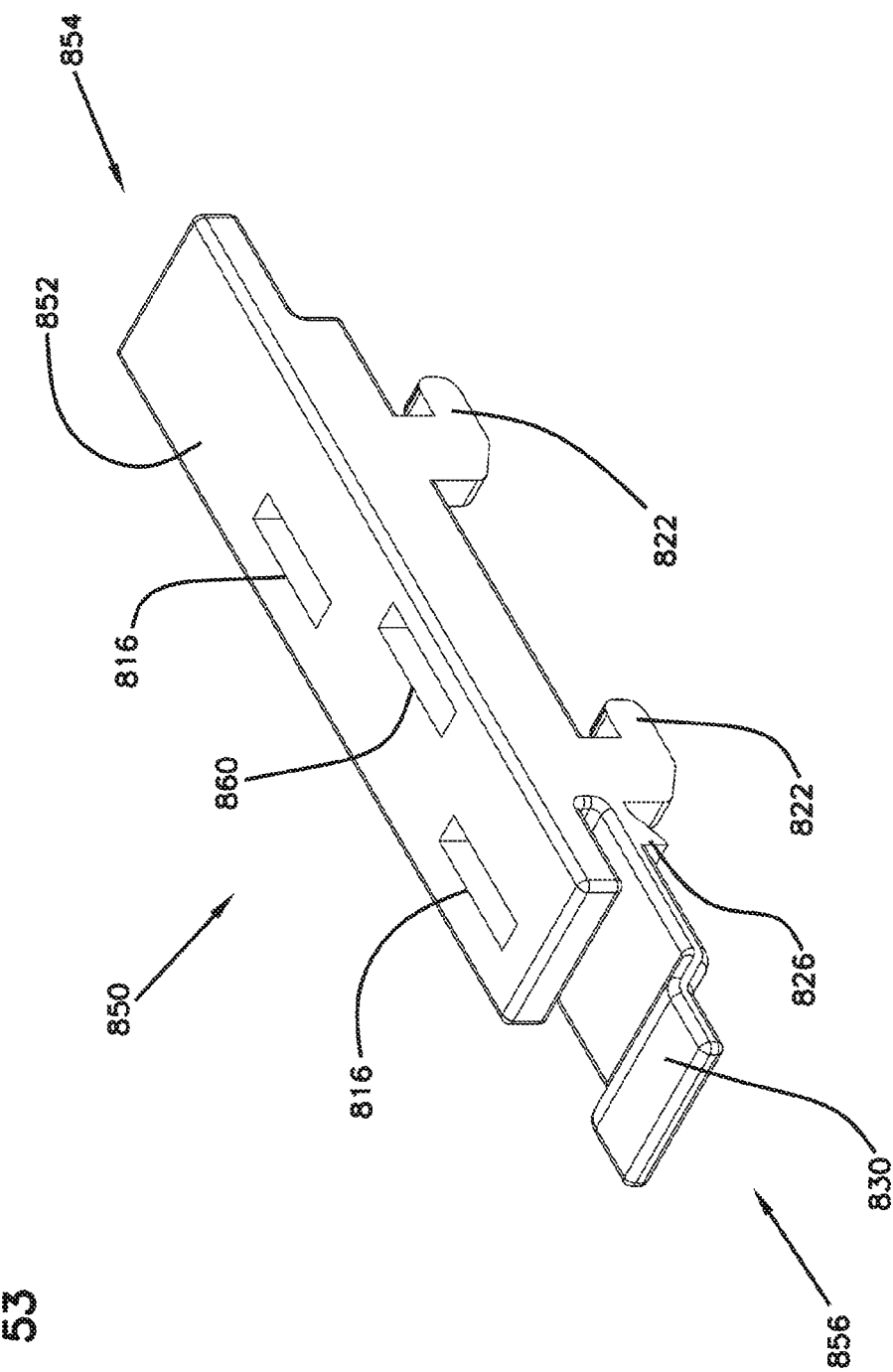
FIG. 53 is a perspective view of a further embodiment of an adapter that can be used as part of a cable fixation assembly in accordance with the present disclosure.
Figure 54:
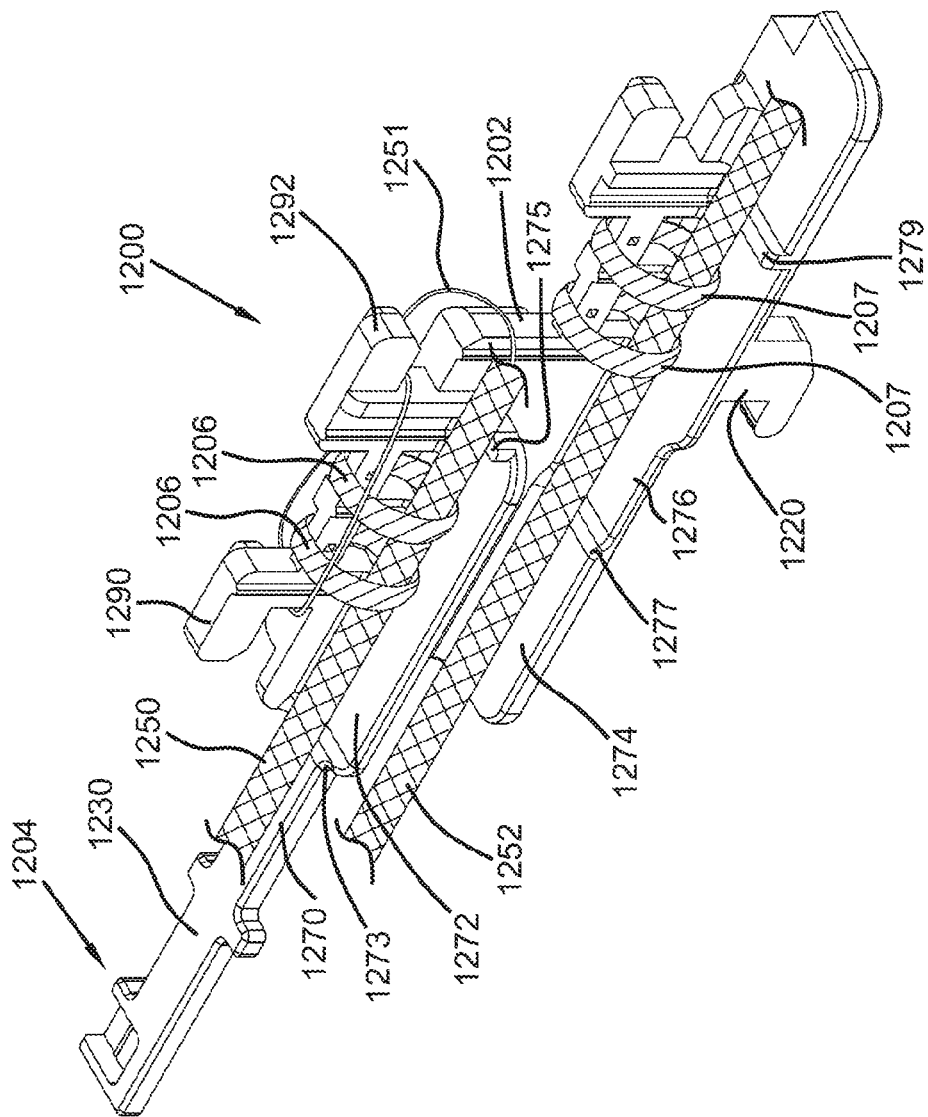
FIG. 54 is a perspective view of a further embodiment of a cable fixation unit that can be used as part of a cable fixation assembly in accordance with the present disclosure, and including a pair of cables affixed to the cable fixation assembly.
Figure 55:
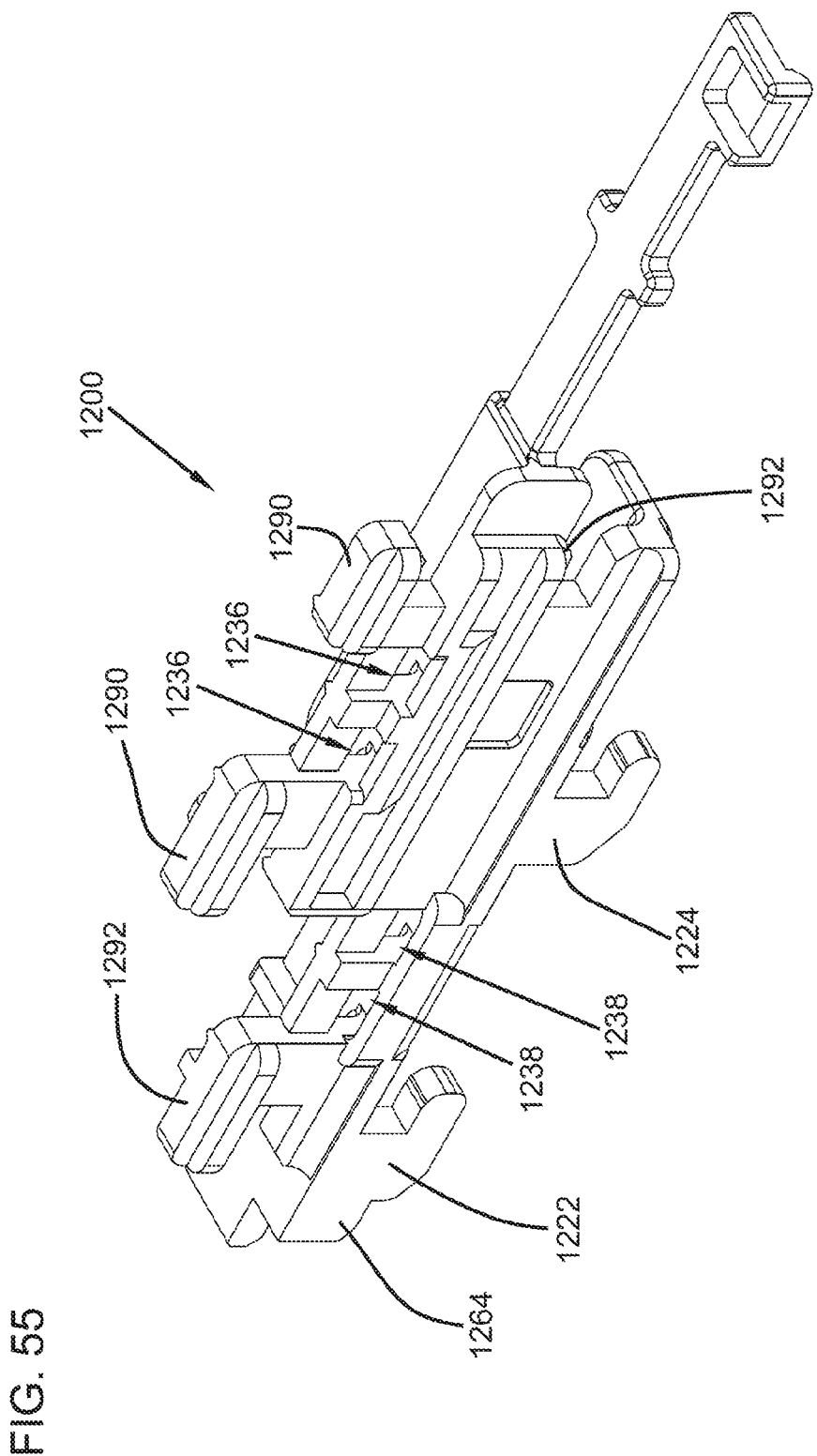
FIG. 55 is a further perspective view of the cable fixation unit of FIG. 54.
Figure 56:
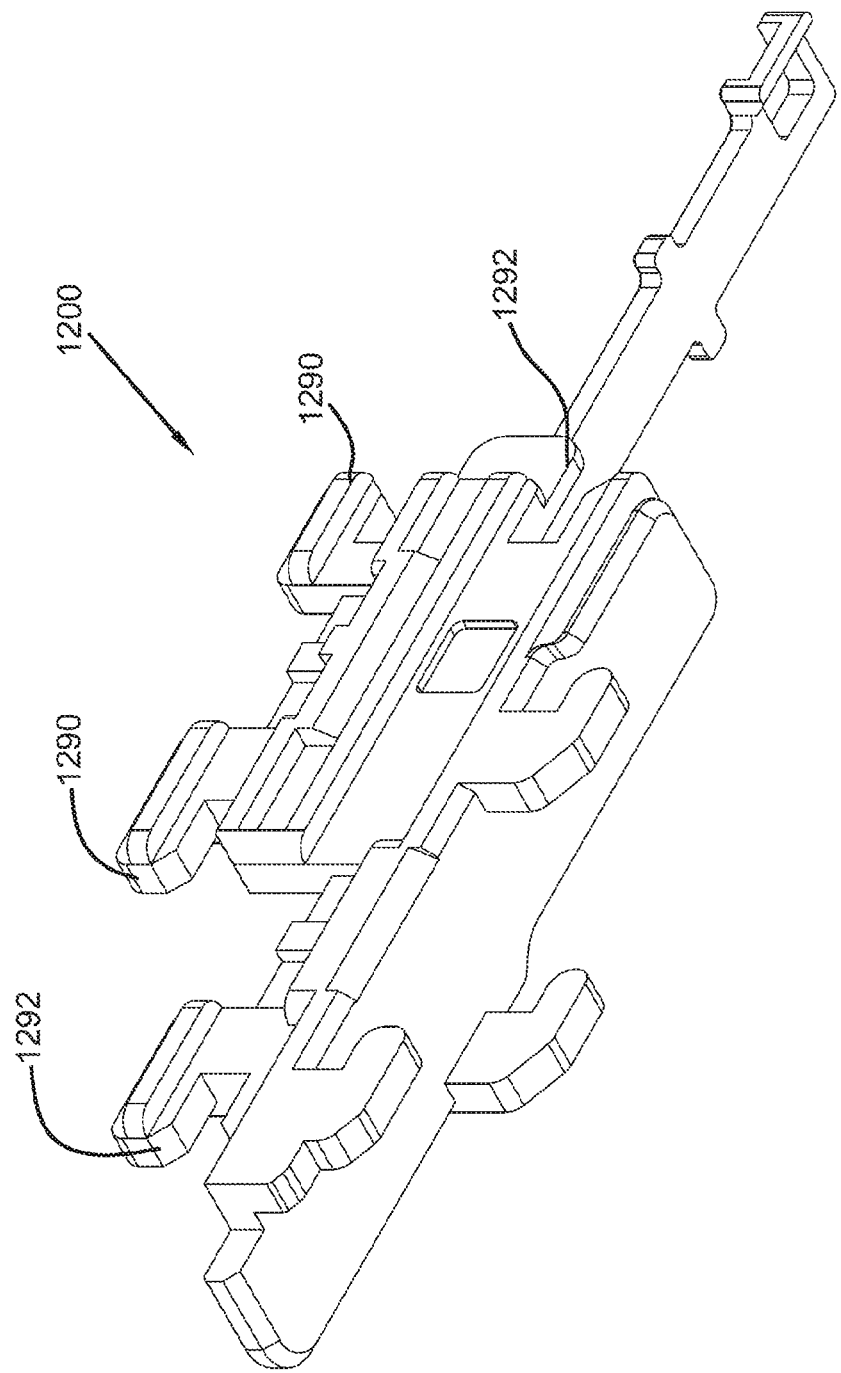
FIG. 56 is a further perspective view of the cable fixation unit of FIG. 54.
Figure 57:
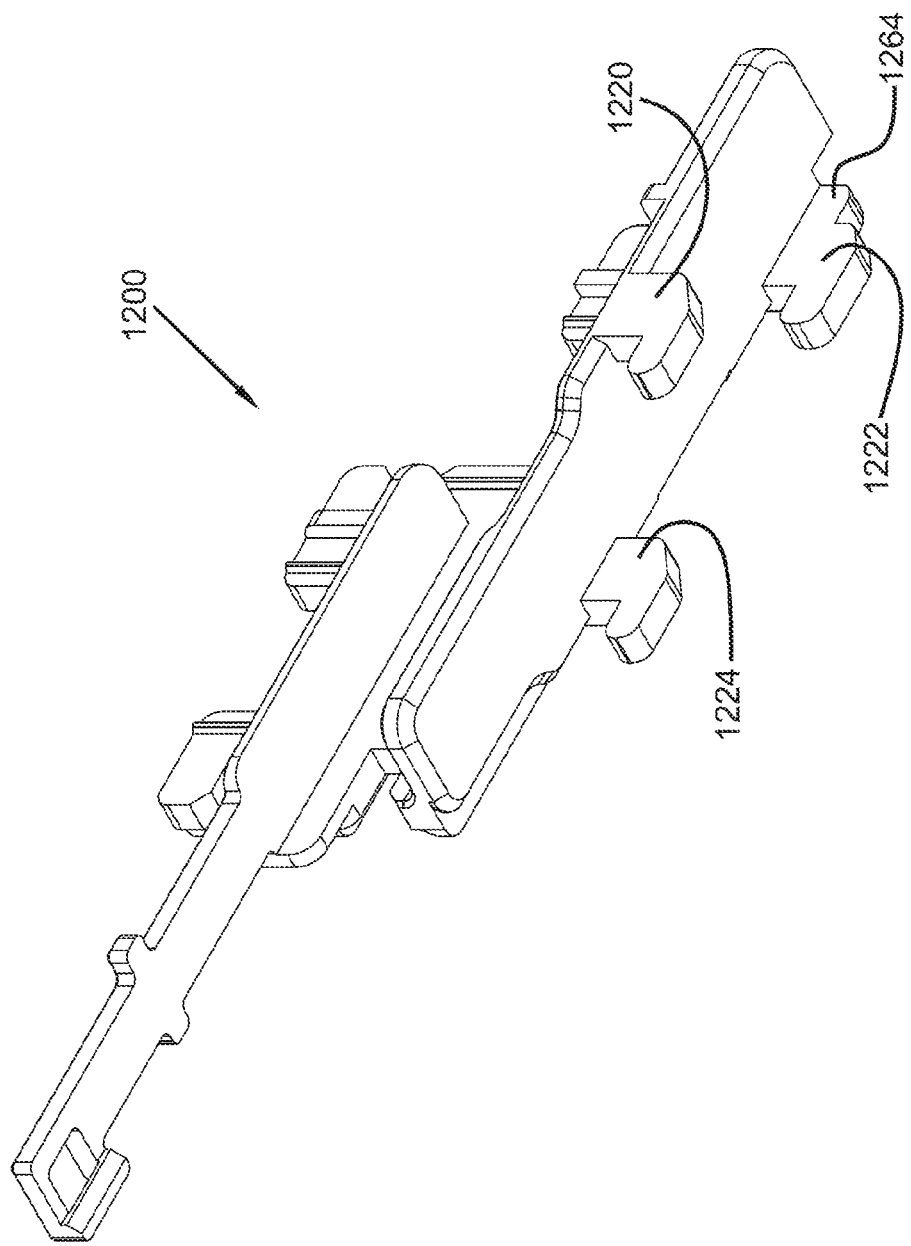
FIG. 57 is a further perspective view of the cable fixation unit of FIG. 54.
Figure 58:
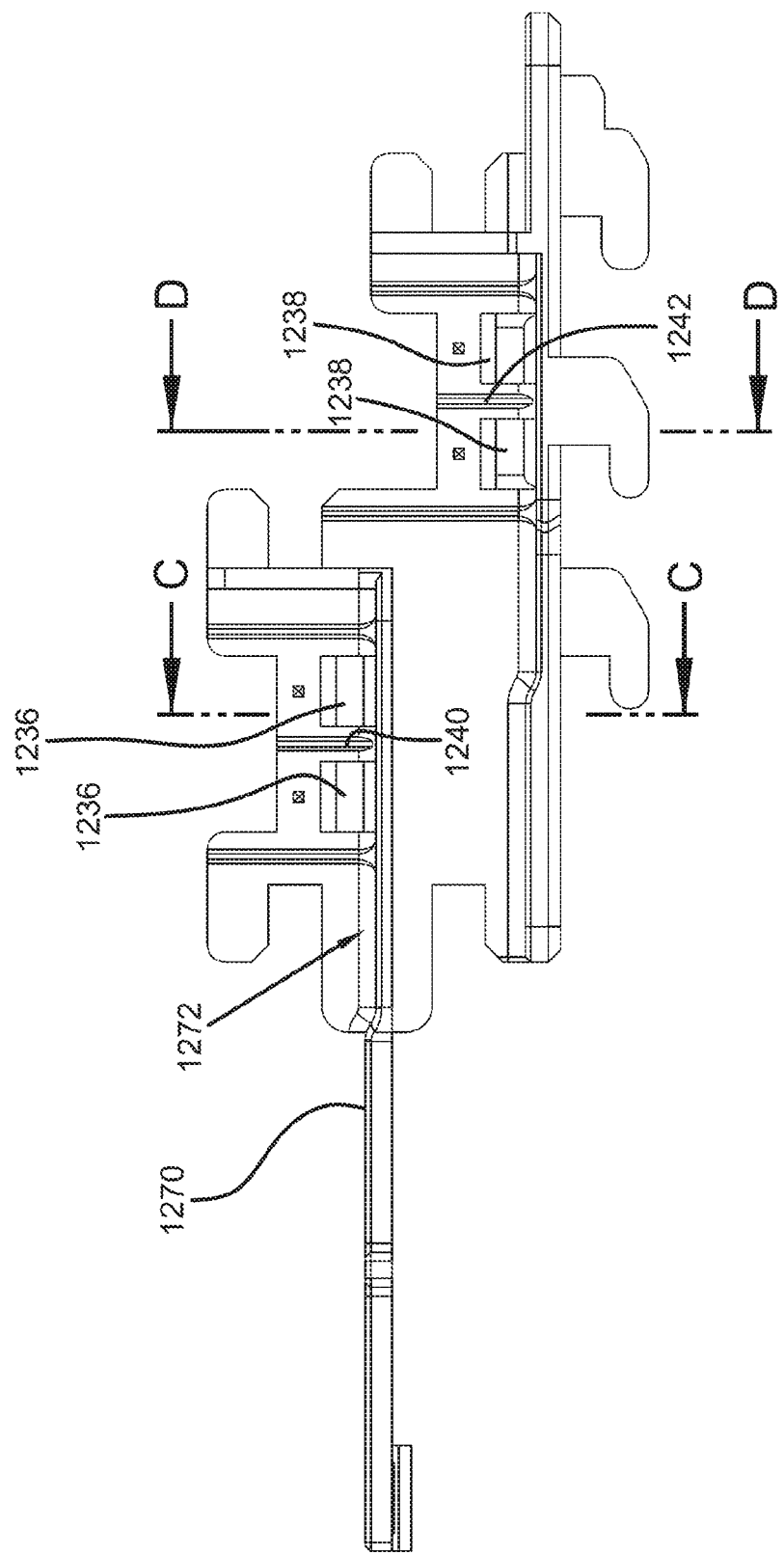
FIG. 58 is a side view of the cable fixation unit of FIG. 54.
Figure 60:
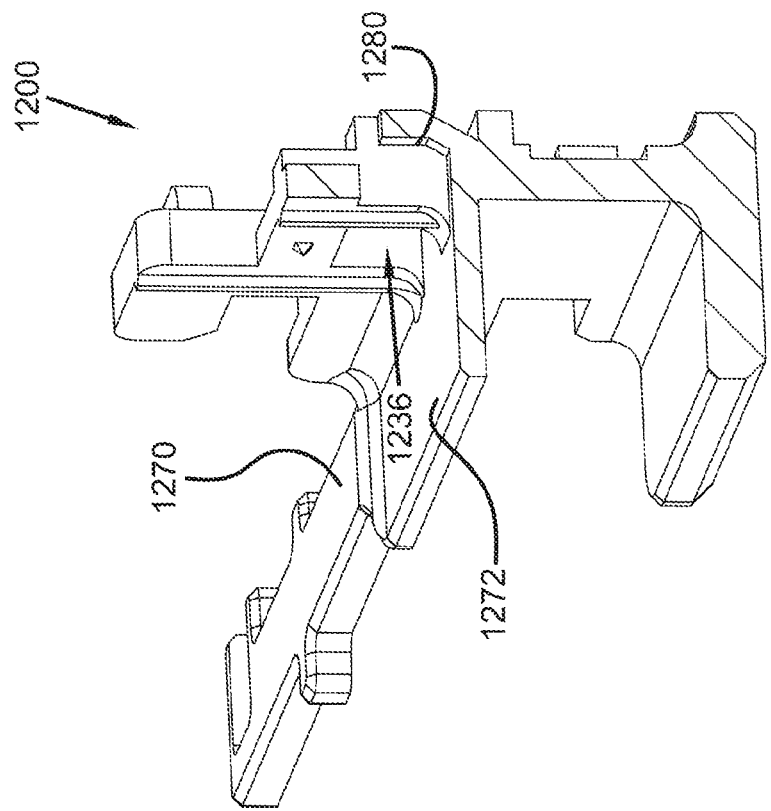
FIG. 60 is a cross-sectional perspective view of the cable fixation unit of FIG. 54 along the line C-C in FIG. 58.
Figure 59:
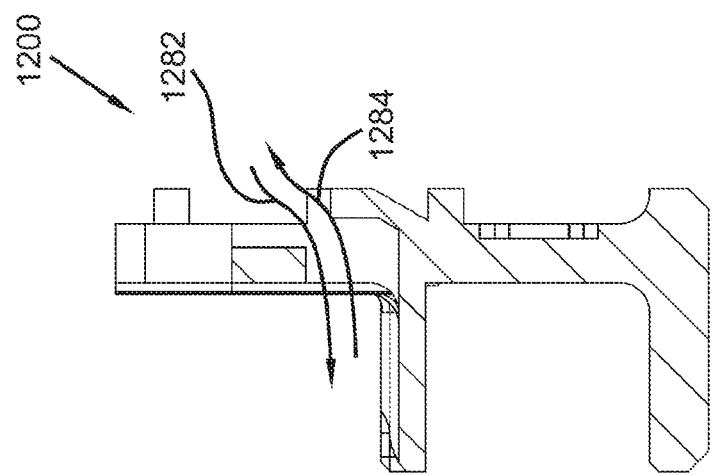
FIG. 59 is a cross-sectional end view of the cable fixation unit of FIG. 54 along the line C-C in FIG. 58.
Figure 62:
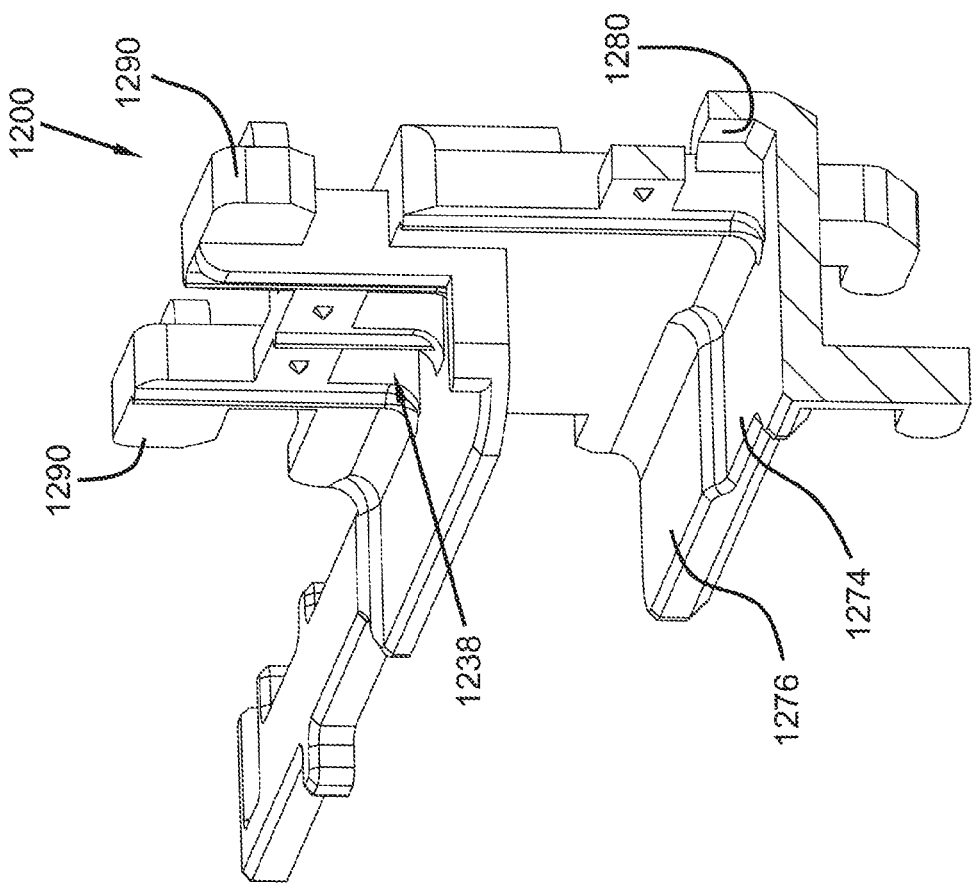
FIG. 62 is a cross-sectional perspective view of the cable fixation unit of FIG. 54 along the line D-D in FIG. 58.
Figure 61:
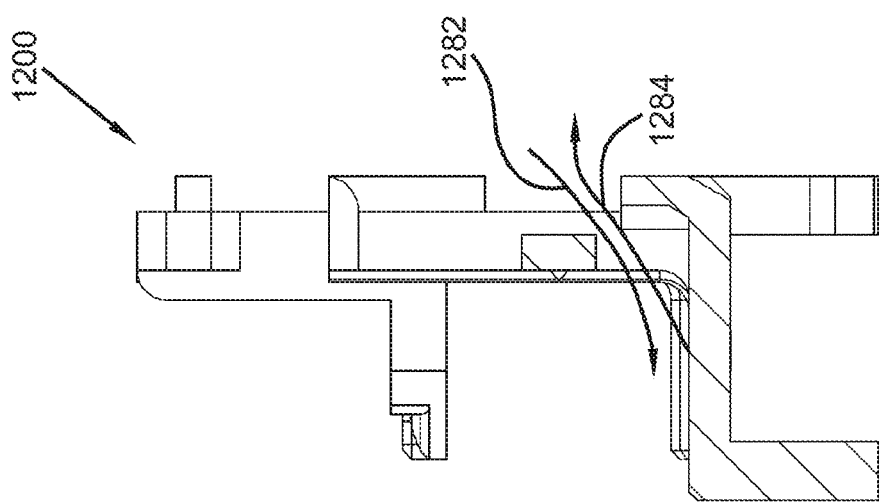
FIG. 61 is a cross-sectional end view of the cable fixation unit of FIG. 54 along the line C-C in FIG. 58.
Figure 63:
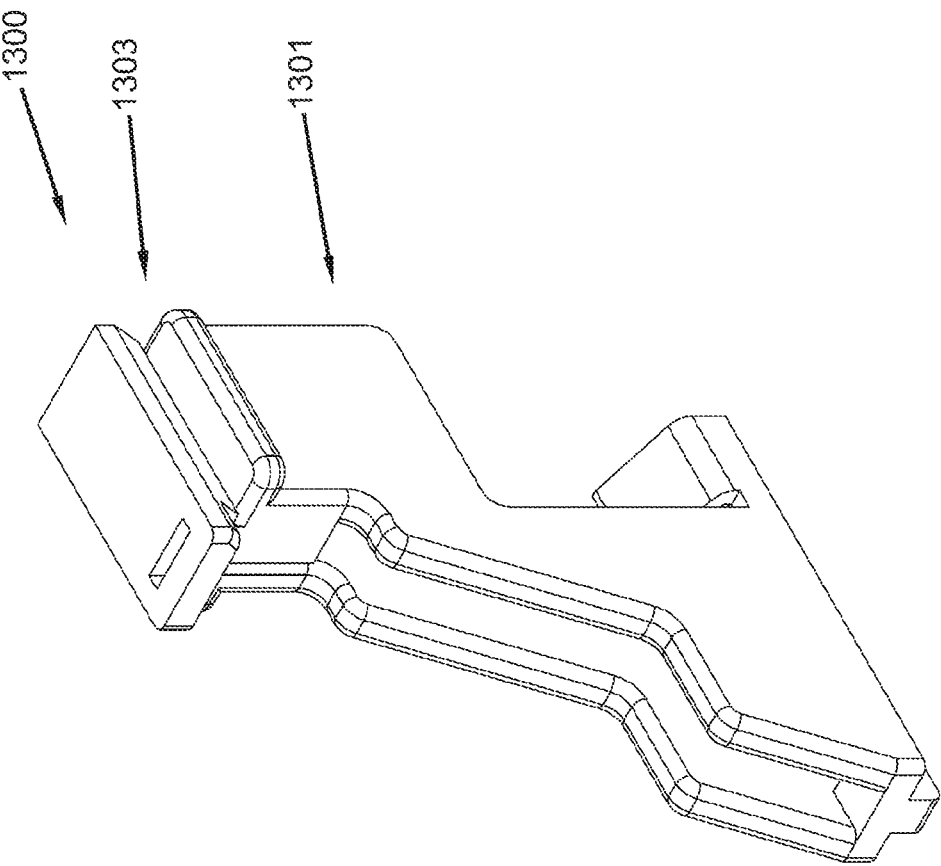
FIG. 63 is a perspective view of a further example locking member that can be used with one or more cable fixation assemblies according to the present disclosure.
Figure 64:
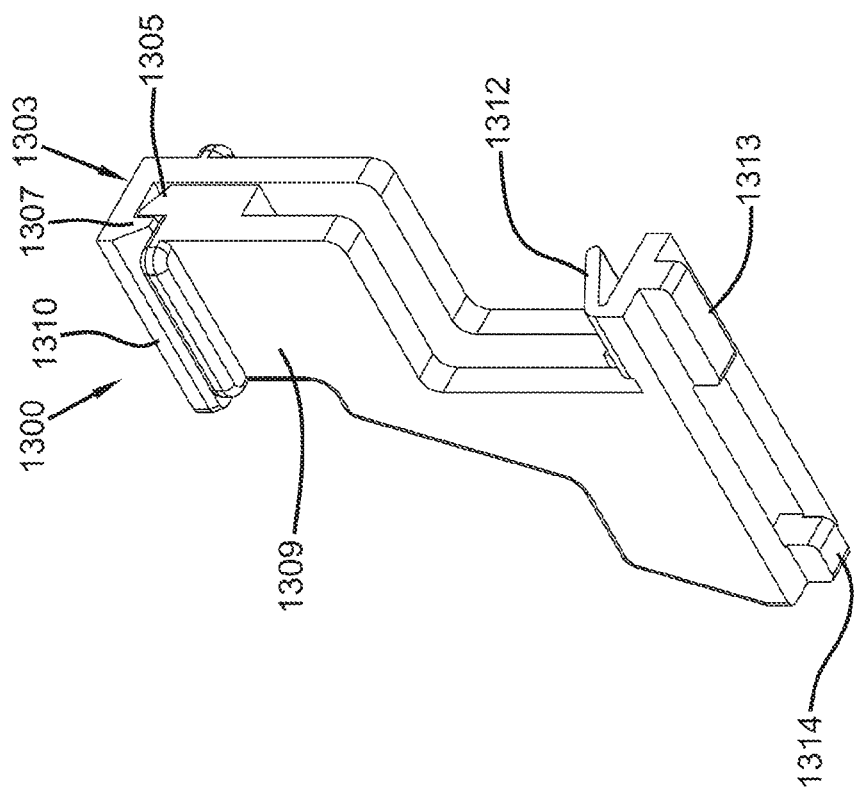
FIG. 64 is a further perspective view of the locking member of FIG. 63.
Figure 65:
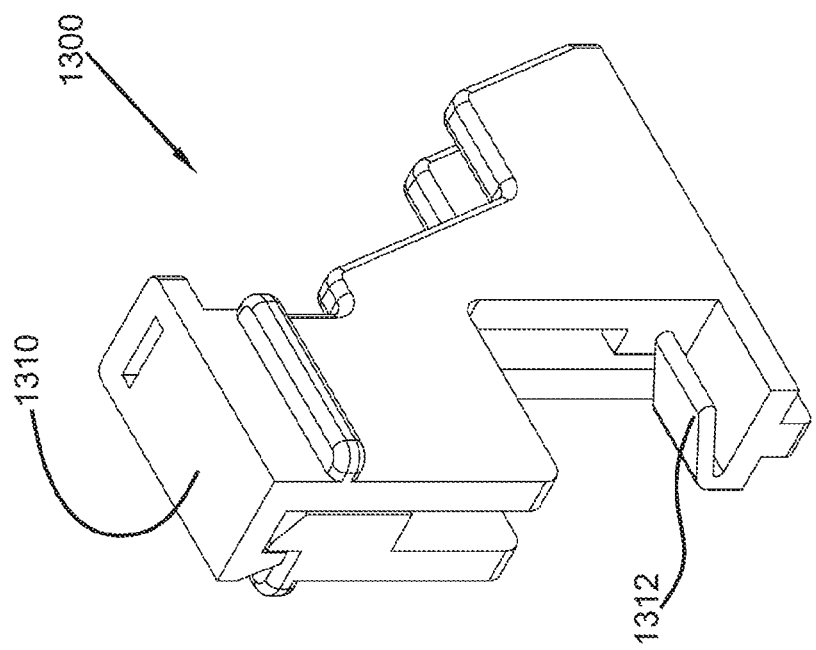
FIG. 65 is a further perspective view of the locking member of FIG. 63.
Figure 66:
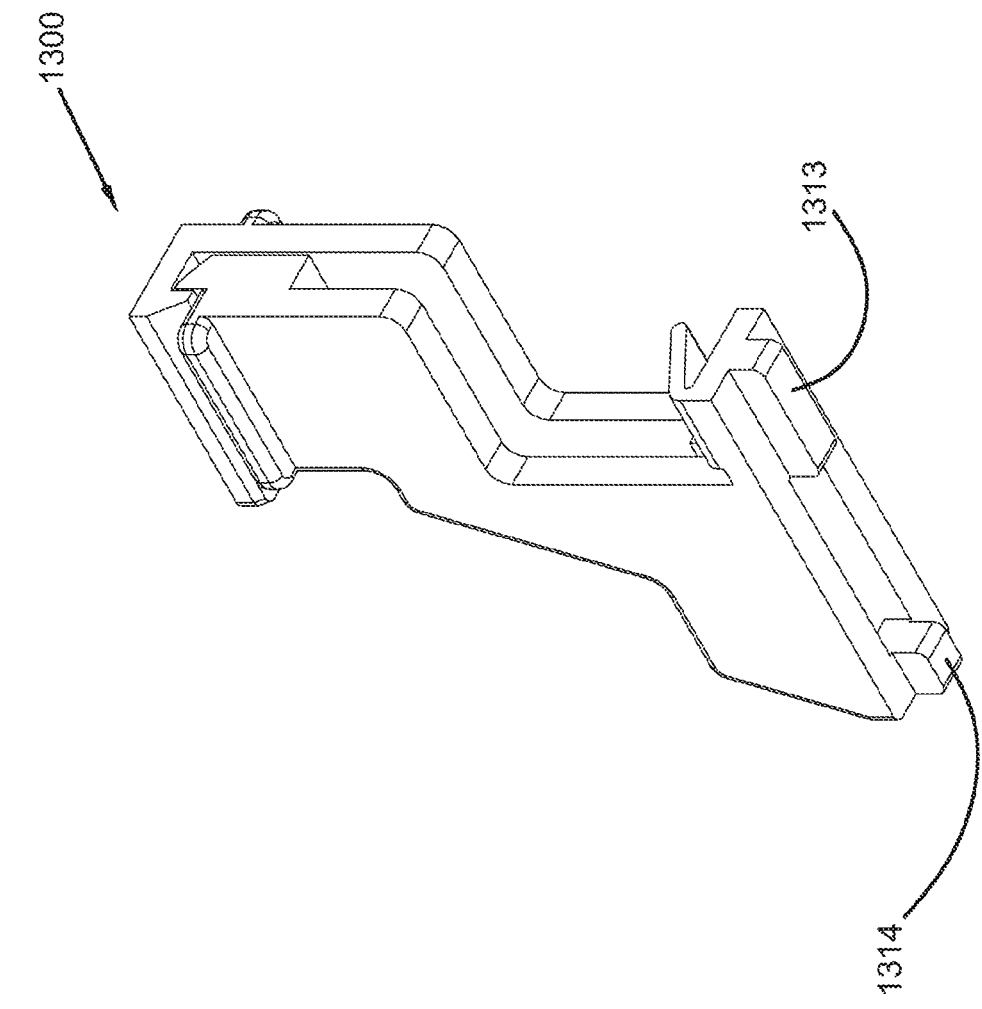
FIG. 66 is a further perspective view of the locking member of FIG. 63.
Figure 67:
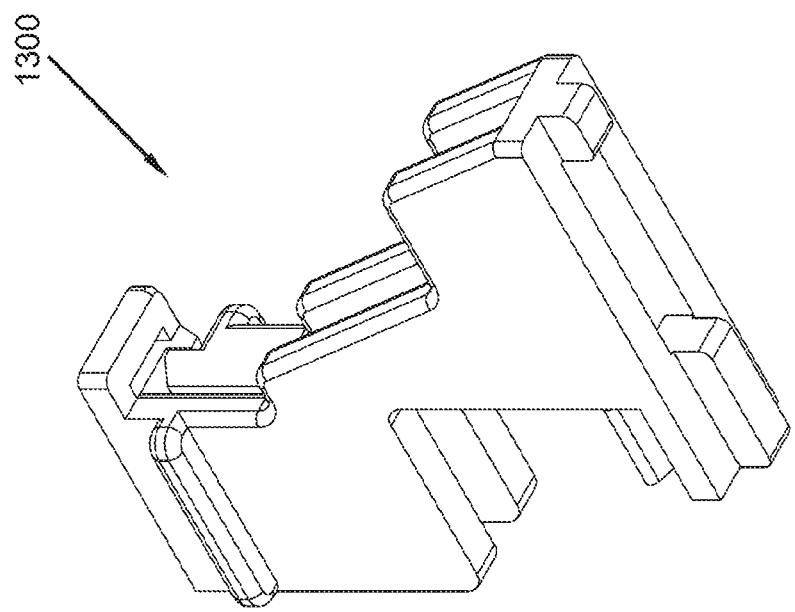
FIG. 67 is a further perspective view of the locking member of FIG. 63.
Figure 69:
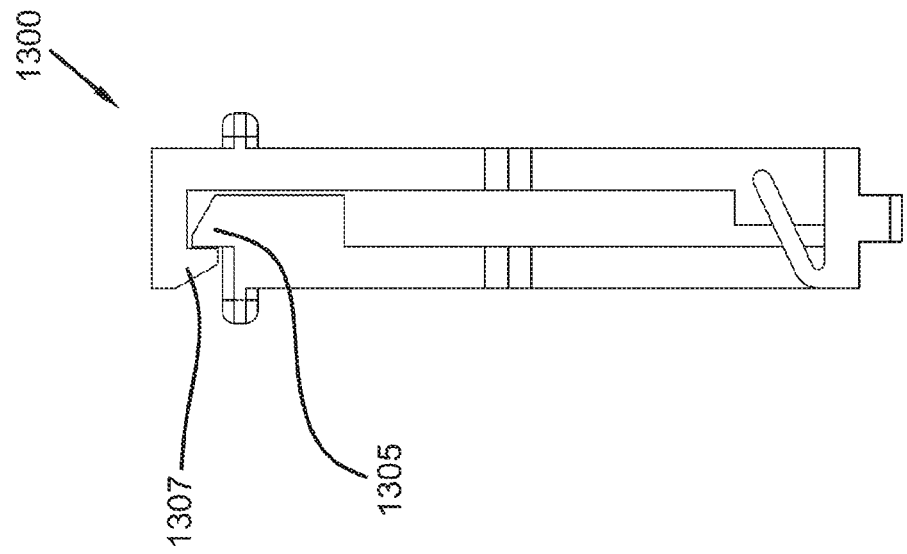
FIG. 69 is a further side view of the locking member of FIG. 63.
Figure 68:
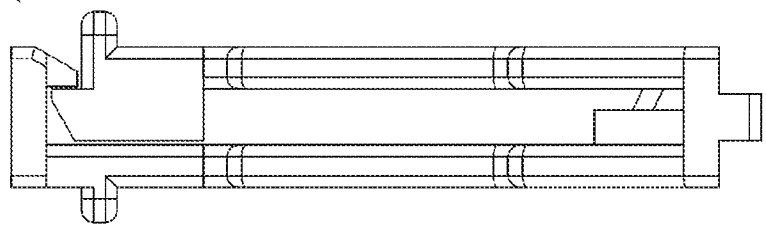
FIG. 68 is a side view of the locking member of FIG. 63.

Referring now to FIG. 53, an alternative embodiment of an adapter 850 is depicted. The adapter 850 has many of the same features as the adapter 800. The adapter 850 includes a body 852 and extends from a proximal end 854 to a distal end 856. In addition to the two through slots 816, the adapter 850 also includes a third through slot 860 laterally offset from the slots 816. The configuration of the slots 816 and 860 allow the adapter 850 to lockingly engage a three-legged fixation unit, such as the units 400 or 900 described above, with the fixation unit locking into the slots 816 and 860 in their respective manners as described above.

It should be appreciated that any number and positioning of slots can be provided in an adapter body as needed to engage particular configurations of mounting portions of particular fixation units.

Referring now to FIGS. 54-62, the cable fixation unit 1200 includes a body 1202 and is generally configured for supporting smaller diameter cables than, e.g., the units 130 and 300 described above. For example, the fixation unit 1200 is configured to support a pair of drop cables 1250, 1252. For ease of description, the fixation unit 1200 has a top 1201 and a bottom 1203. In some examples the entirety of the unit 1200 is non-electrically conductive (e.g., molded from plastic).

A first cable 1250 enters a closure and is affixed to the body 1202 that is mounted to a slotted base plate. The first cable 1250 is positioned above the surface 1208 of a seal member support 1204. A second cable 1252 enters the closure and is affixed to the body 1202. The second cable 1252 is positioned below the surface 1230 of the seal member support 1204. The first and second cables 950, 952 enter through the same cable port in the closure. Because two cables enter the same port, a gap can form in the seal at the port between the two cables. To plug the gap, an additional sealing member can be provided as described above, the sealing member (e.g., a piece of gel) being mounted to the seal member support 1204.

The body 1202 defines two pairs of tie passages 1236 and 1238 with a dividing crossbar 1240, 1242 between each pair. Ties 1207 can be fed through the tie passages 1236, and around the outer jacket of the first cable 1250 to secure the first cable to the body 1202. Ties 1206 can be fed through the tie passages 1238 and around the outer jacket of the second cable 1252 to secure the second cable to the body 1202.

The cable support platform 1270 of the body 1202 for the cable 1250 includes a downwardly recessed portion 1272 adjacent the tie passages 1236, and defined by opposing lips 1273 and 1275 at proximal and distal ends of the recessed portion 1272, respectively. Similarly, a cable support platform 1274 of the body 1202 for the cable 1252 includes a downwardly recessed portion 1276 adjacent the tie passages 1236 and defined by opposing lips 1277 and 1279 at proximal and distal ends of the recessed portion 1276, respectively. The recessed portions 1272, 1276 provide clearance below the outer jacket of the cables 1250, 1252 to more easily pass the ties 1206, 1207 when wrapping and securing the cables 1250, 1252 to the body 1202 using the ties 1206, 1207, with the jackets of the cables resting on the lips 1273, 1275, 1277, 1279.

The tie passages 1236, 1238 are defined by guide surfaces that favor advancement of a tie through a tie passage in a first direction 1282 and disfavor advancement of a tie through the tie passage in the opposite direction 1284. For example, when attempting to advance a tie in the direction 1284, a tip of the tie encounters a guide surface 1280 that resists further advancement of the tie in the direction 1284. This can facilitate proper placement of the head portion of the tie at the end of the cable tying process, e.g., by ensuring that the head portion does not increase the lateral width of the fixation assembly. In addition, the labyrinthine configuration of the tie passages (e.g., the opening at one end of a tie passage is at a different vertical height than the opening at the opposite end of the tie passage) can resist self-advancement of the tie through the tie passage in the preferred direction 1282, thereby providing improved control of the positioning of the tie when securing the cables.

The body 1202 includes pairs of oppositely facing hooks 1290, 1292 positioned proximally and distally from each pair of tie passages 1236, 1238. A yarn strength member 1251 of the cable 1250 can be anchored by looping and tying off the yarn strength member around the two hooks 1290. Similarly, a yarn strength member (not shown) of the cable 1252 can be anchored by looping and tying off the yarn strength member around the hooks 1292.

A mounting portion 1210 of the unit 1200 extends from the body 1202 and includes three legs 1220, 1222, 1224, with a foot projecting from each leg. The legs are positioned to provide stability when the unit 1200 is locked to a base plate (e.g., the base plate 106) or to an adapter.

A locking member includes a slot-insertable piece 1264. The slot-insertable piece 1264 is positioned to be inserted in a slot of a base plate or an adapter when the unit 1200 is moved proximally such that the feet proximally extend beyond proximal ends of their corresponding slots. Inserted in a slot in this manner, the slot-insertable piece 1264 prevents or inhibits distal movement of the unit 1200 relative to the base plate or adapter, effectively locking the unit 1200 to the base plate or adapter.

To remove the unit 1200 from the base plate or adapter, a tool can be used to engage the slot-insertable piece 1264 and pry it out of the corresponding slot, the slot-insertable piece 1264 being small enough to completely clear the slot even while the feet have not yet cleared the proximal ends of their corresponding slots. Once the slot-insertable piece 1264 has cleared the slot, the unit 1200 can be moved distally until the feet clear the proximal ends of the slots. At this point, the unit 1200 can be completely removed from the base plate or adapter.

Referring now to FIGS. 102-107, the cable fixation unit 2200 is similar to the cable fixation unit 1200. The following description of the cable fixation unit 2200 will generally focus on differences between the cable fixation unit 2200 and the cable fixation unit 1200.

The cable fixation unit 2200 includes a body 2202 and is generally configured for supporting smaller diameter cables than, e.g., the units 130 and 300 described above. The fixation unit 2200 is configured to support a pair of drop cables. For ease of description, the fixation unit 2200 has a top 2201 and a bottom 2203 and extends longitudinally from a proximal end 2205 to a distal end 2207.

The body 2202 defines an upper cable jacket clamping area or portion 2209 and a lower cable clamping area or portion 2211 above and below, respectively, the cable support platform 2270. Extending from the body is a mounting portion 2213 for mounting the unit 2200 to a base plate assembly.

The body 2202 defines two pairs of tie wrap passages 2236 and 2238 with a dividing crossbar 2240, 2242 between each pair. Unlike the tie passages 1236 and 1238 of the unit 1200, the passages 2236 and 2238 are aligned one atop the other at the same longitudinal position of the fixation unit 2200. As a result of this alignment, a single pair of tie wraps (rather than a pair for each cable) can be used to secure both cables above and below the cable support platform 2270. One or more notches 2230, 2232 are provided in the platform 2270 to allow the tie wraps to hug the outer jackets of the cables and prevent the platform 2270 from interfering with the tie wraps when tying down the cables, thereby providing a tighter anchoring of the cables to the unit 2200.

Because a single set of tie wraps can be used to secure both cables, the longitudinal length of the unit 2200 can be shortened relative to another cable fixation unit, such as the cable fixation unit 1200. Due to the shorter longitudinal length, only two, rather than three, transversely offset slot engageable members 2220, 2222 (including legs and feet) of the mounting portion 2213 are provided to lock the unit 2200 to any suitable base plate assembly described herein. In addition, the shorter longitudinal length can reduce manufacturing cost for the cable fixation unit and associated components (e.g., fewer tie wraps are needed) and maximize fiber management space (by minimizing cable fixation space) within a telecommunications closure.

Any of the fixation unit to base plate slot-locking mechanisms described herein can be applied to the fixation unit 2200, and the fixation unit 2200 can be modified accordingly. For example, any of the slot engageable members 2220, 2222 can be modified to include a heel or other slot-insertable piece for engaging a resilient member in a slot of a base plate assembly.

Referring now to FIGS. 63-69, the locking member 1300 serves the same function as the locking members 170 and 236 described above. In some examples, the locking member 1300 can be used interchangeably with either the locking member 170 or the locking member 236 for the same given assembly of a slotted base plate and cable fixation unit. The following description will therefore primarily focus on features of the locking member 1300 that differ from features of the locking members 170 and 236 described above.

The locking member 1300 includes a main body engaging portion 1301 that receives a body of a fixation unit. The side wall 1309 of the locking member 1300 is configured to completely surround a portion of a cable fixation unit body. To minimize disengagement of the fixation unit body and the locking member 1300, and also for ease of mounting the locking member 1300 to the fixation unit body, the locking member 1300 includes a coupling mechanism 1303. In this example, the coupling mechanism 1303 includes a pair of complementary catches 1305 and 1307 that snap together and can be pulled apart due to their resilience, e.g., by pulling the side wall 1309 of the locking member 1300 away from the cable axis and/or by pulling up on the top member 1310 of the locking member 1300. The locking member 1300 also includes a biasing member 1312 and a pair of spaced apart slot insertable portions 1313 and 1314 for improved stability and great resistance to unwanted proximal to distal shifting of a fixation unit mounted to a base plate. In this example, the biasing member 1312 is an elastic tail positioned above one of the slot insertable portions and positioned to elastically engage a leg or a body of a fixation unit when the body of the fixation unit is moved downward relative to the locking member 1300. With the locking member 1300 and body of a fixation unit engaged and the feet of the fixation unit slid beyond the distal ends of the slots of the base plate as described above, the slot insertable portions 1313, 1314 are biased downward by the biasing member 1312 into slots of the base plate. With the slot insertable portions 1313, 1314 positioned in a slot, the feet of the fixation unit are prevented from proximally clearing the distal ends of the corresponding slots of the base plate, such that the cable fixation unit is effectively locked to the base plate. To release the cable fixation unit from the base plate, the locking member 1300 can be pulled upwards causing the elastic tail 1312 to flex against a leg or the body of the fixation unit, which in turn causes the slot-insertable portions 1313, 1314 to exit the slots, allowing the feet of the fixation unit to be slid proximally beyond the distal ends of the corresponding slots and thereby permitting removal of the fixation unit from the base plate.

Figure 70:
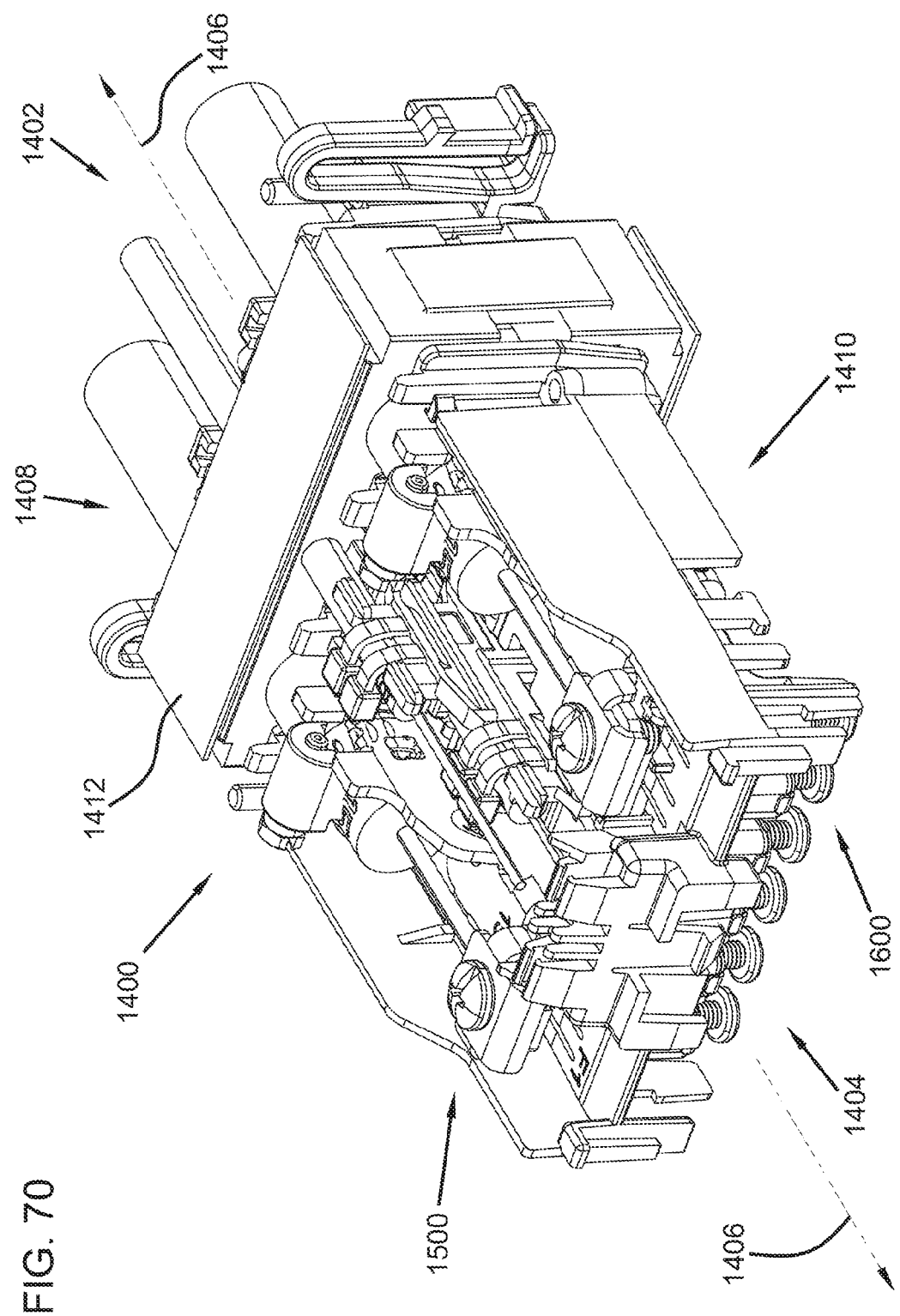
FIG. 70 is a perspective view of a portion of a telecommunications closure assembly including cable fixation assemblies in accordance with the present disclosure.
Figure 71:
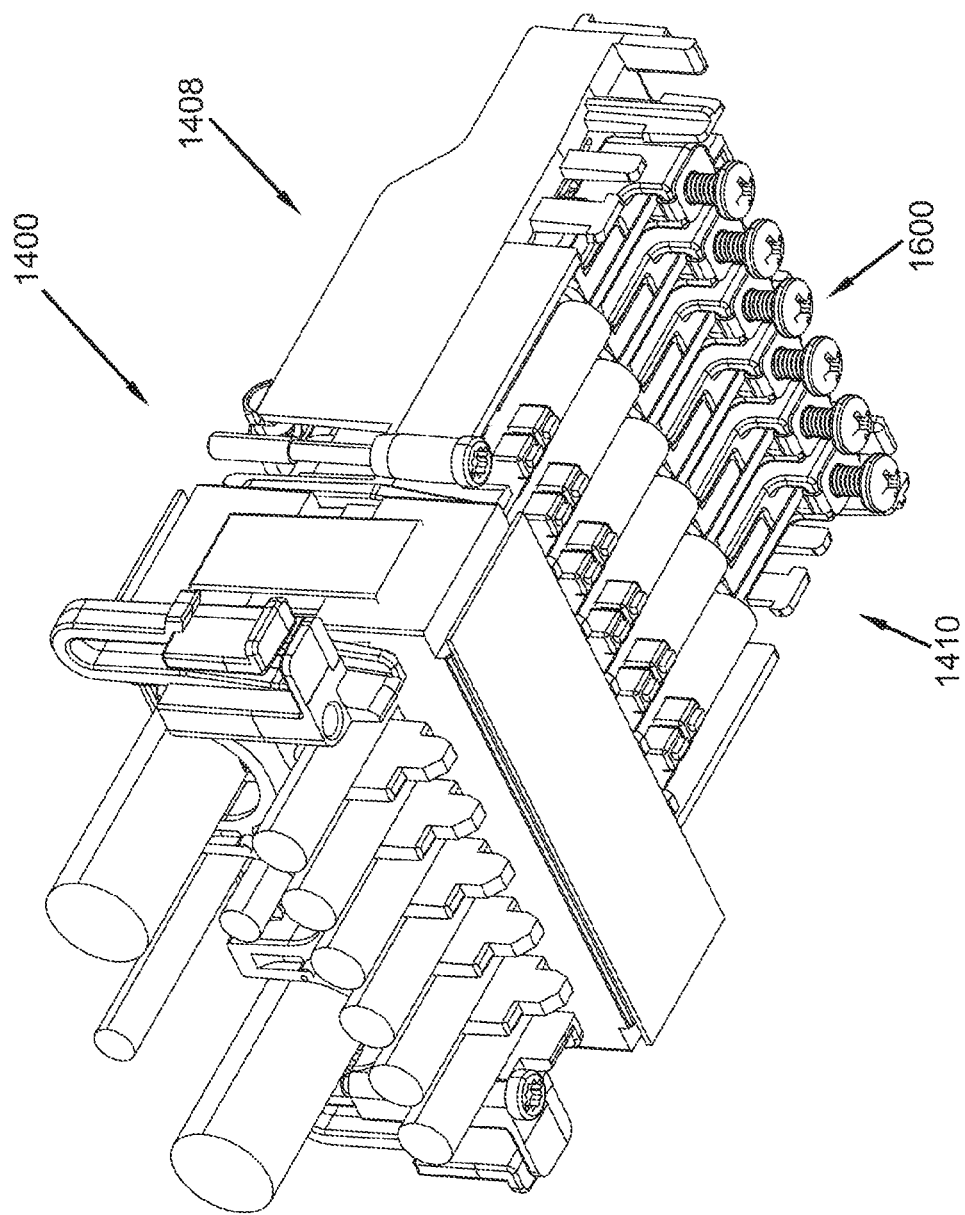
FIG. 71 is a further perspective view of the closure assembly of FIG. 70.

Referring to FIGS. 70-71, an example closure assembly 1400 extends from a proximal end 1402 to a distal end 1404 along an axis 1406 that is parallel to the longitudinal direction of the cables mounted to the closure assembly 1400, and from a bottom 1408 to a top 1410 of the closure assembly 1400. The closure assembly 1400 includes a lower subassembly 1500 and an upper subassembly 1600. The lower subassembly 1500 fixes a lower set of cables, e.g., feeder cables and/or branch cables, to a closure while the upper subassembly 1600 fixes an upper set of cables, e.g., drop cables, to the closure. Optical fibers of the lower set of cables can be managed within the closure and connected to fibers of the upper set of cables to achieve a desired fiber routing and network distribution scheme. The closure assembly 1400 is adapted to mount within a closure volume of the closure. A cable sealing block bulkhead 1412 divides an exterior of the closure from an interior of the closure.

Figure 24:
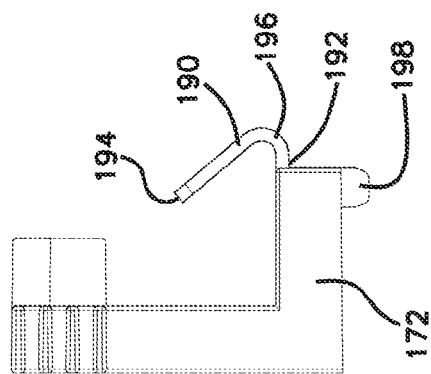
FIG. 24 is a side view of the locking member of FIG. 22.
Figure 22:
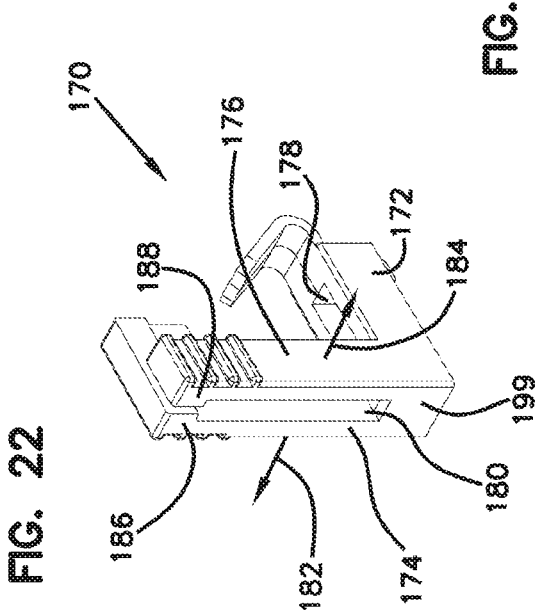
FIG. 22 is a perspective view of the locking member of the fixation unit of the assembly of FIG. 4 and of the fixation unit of FIG. 19.
Figure 25:
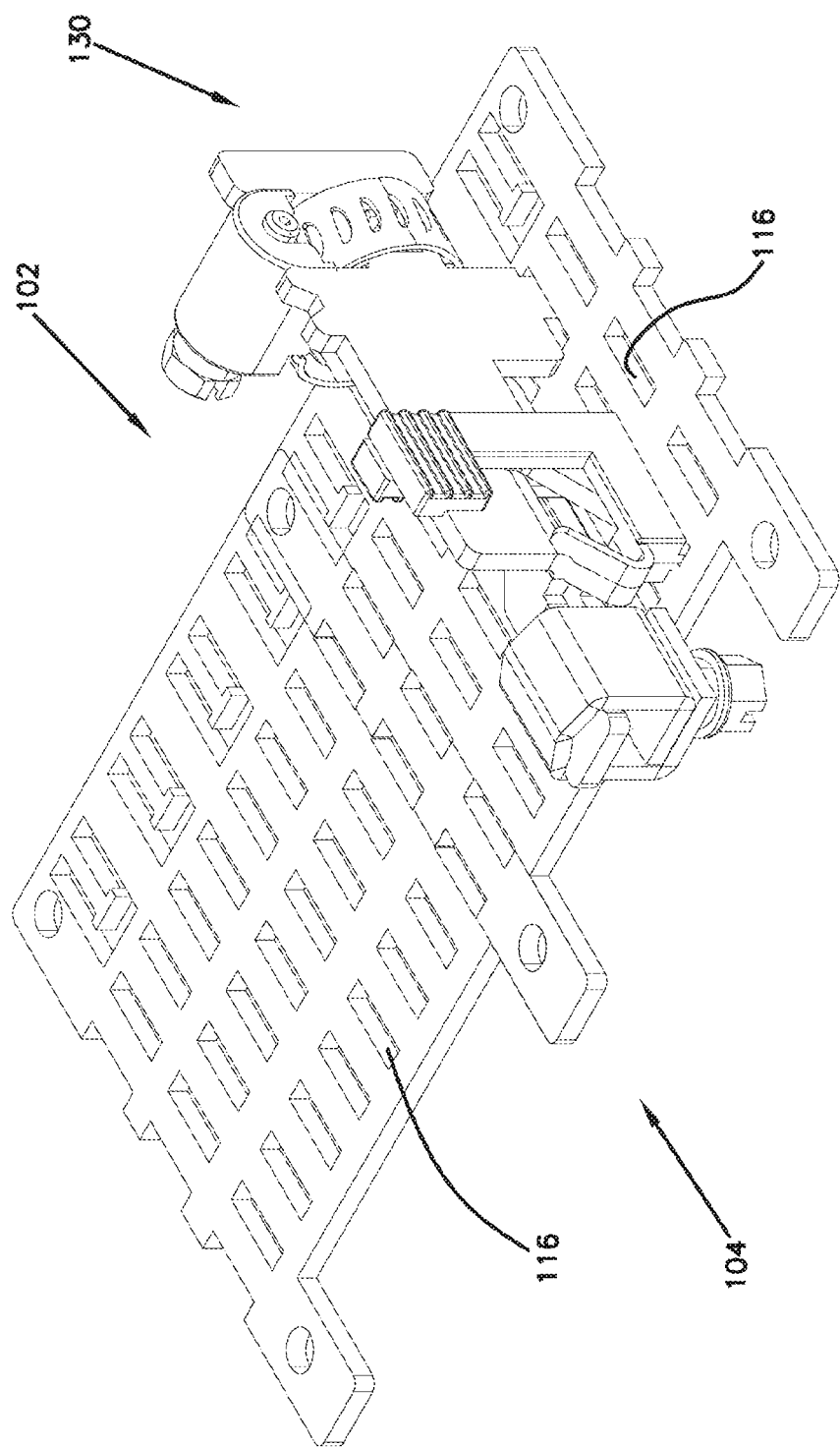
FIG. 25 is a perspective view of a further example assembly according to the present disclosure, including the fixation unit of FIG. 19.
Figure 72:
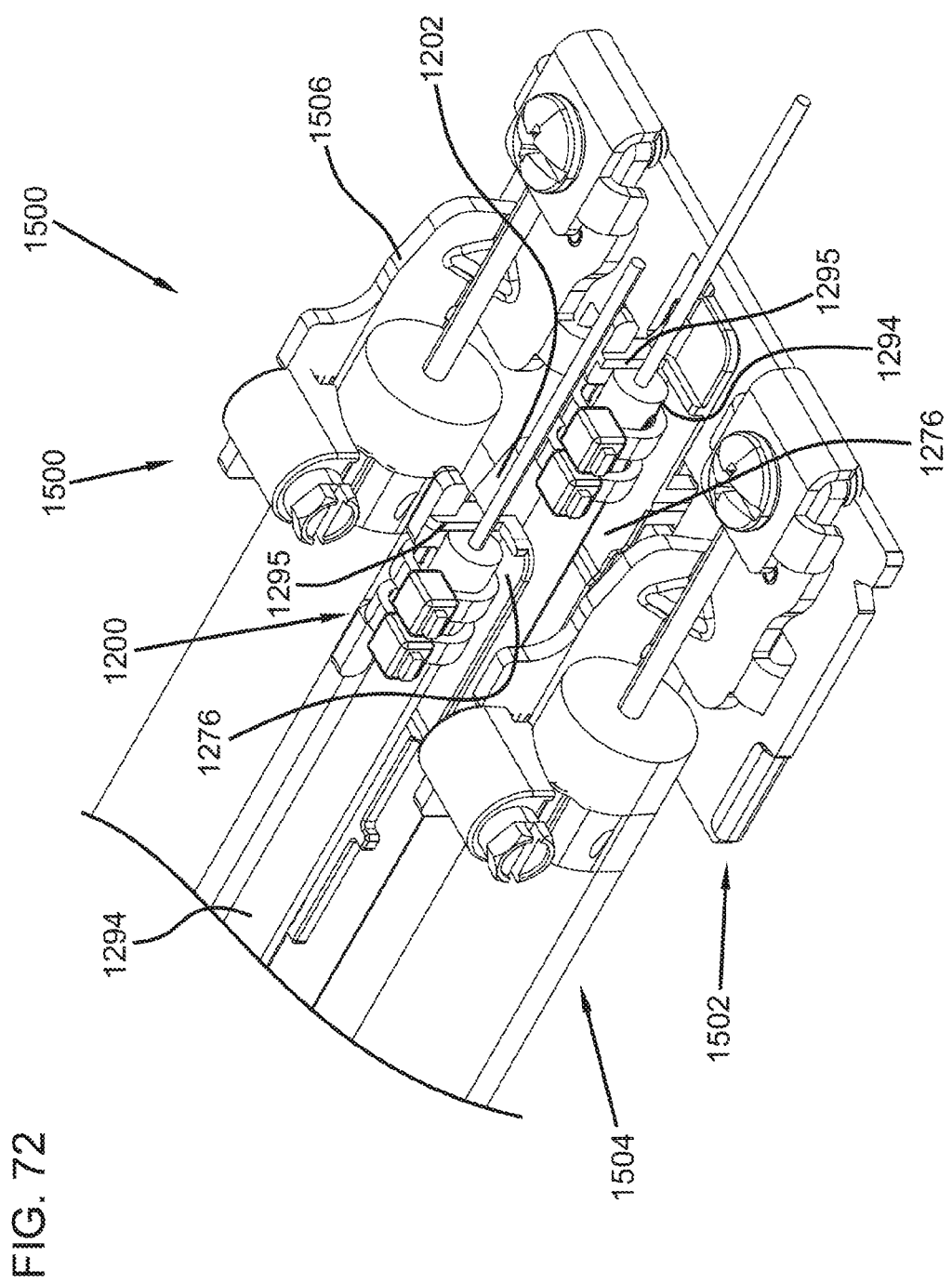
FIG. 72 is a perspective view of a lower subassembly of the closure assembly of FIG. 70.
Figure 73:
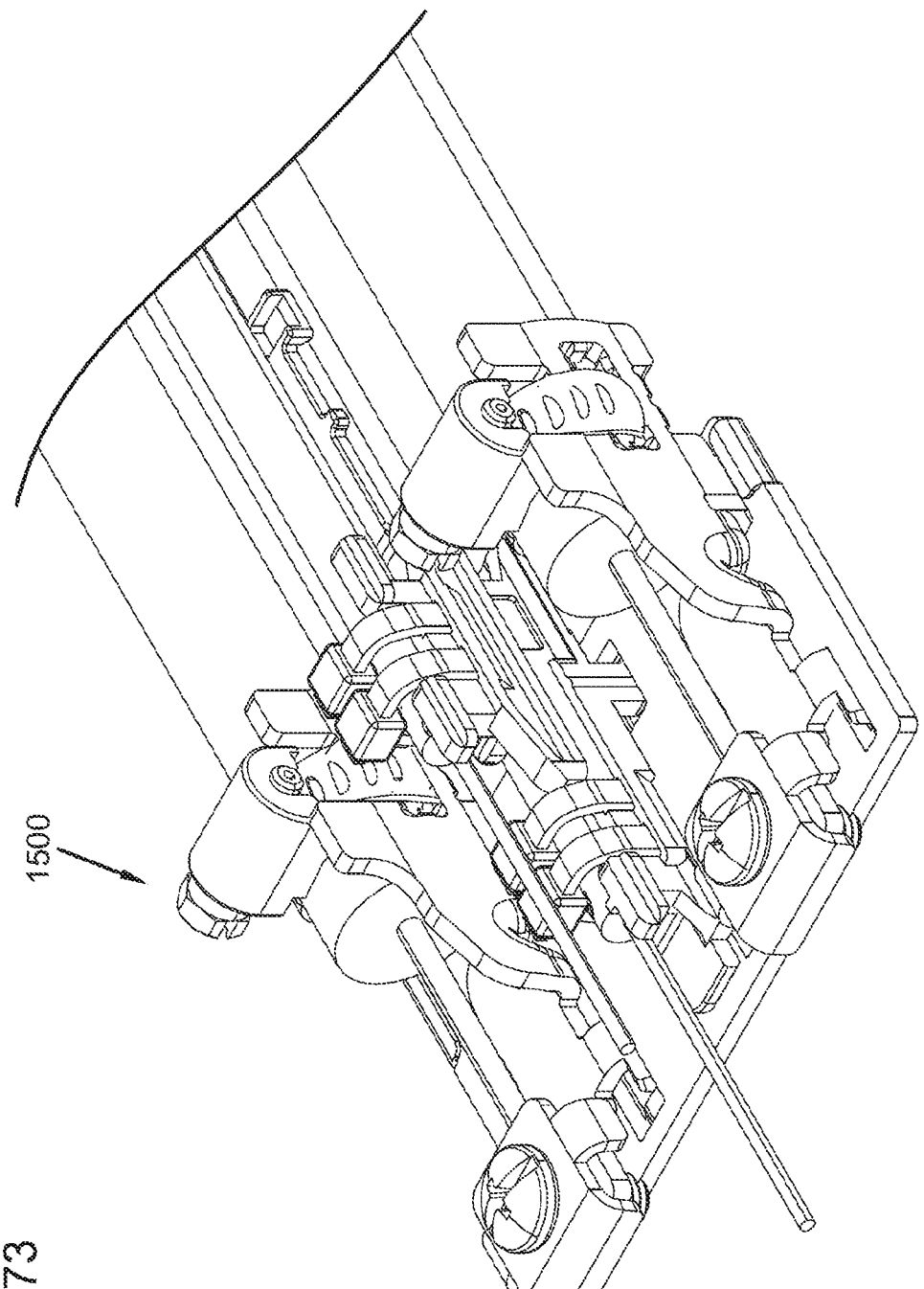
FIG. 73 is a further perspective view of the subassembly of FIG. 72.
Figure 74:
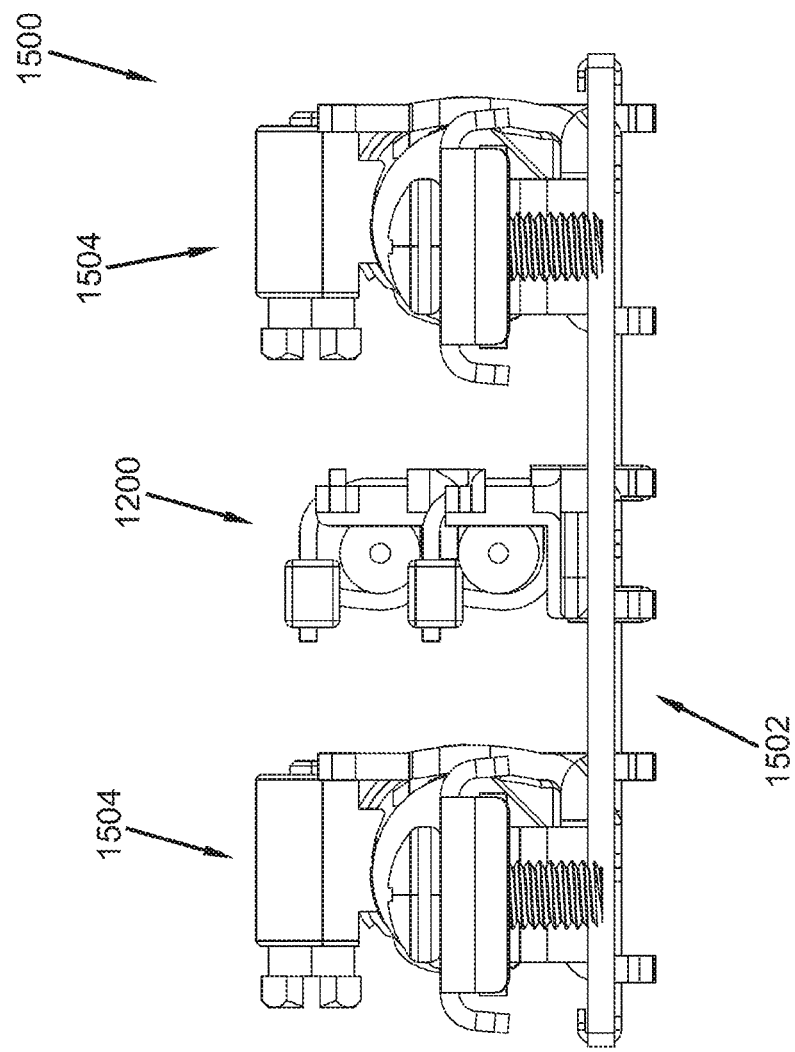
FIG. 74 is a distal end view of the subassembly of FIG. 72.
Figure 75:
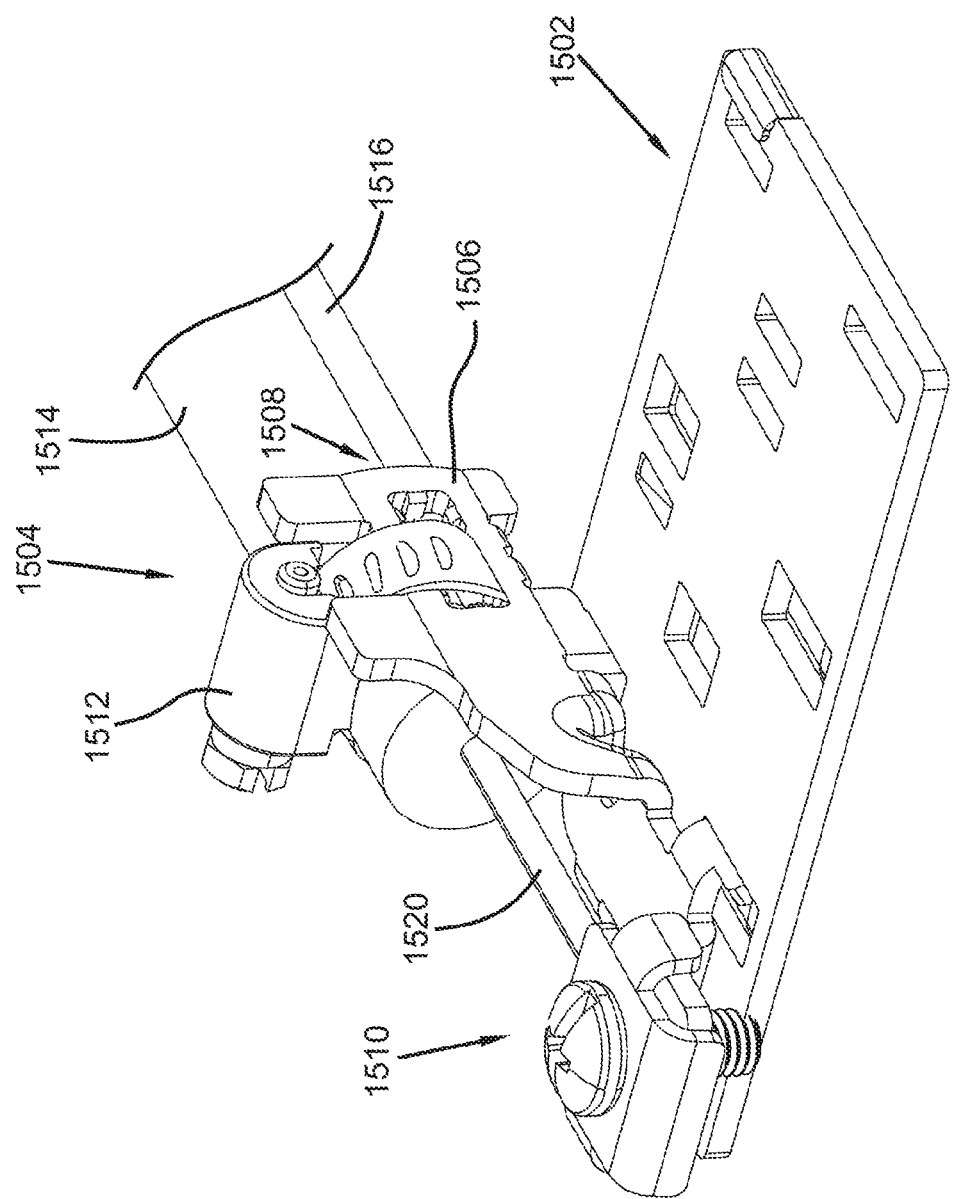
FIG. 75 is a perspective view of a portion of the subassembly of FIG. 72, including one of the cable fixation assemblies mounted to an example base plate assembly in accordance with the present disclosure.
Figure 76:
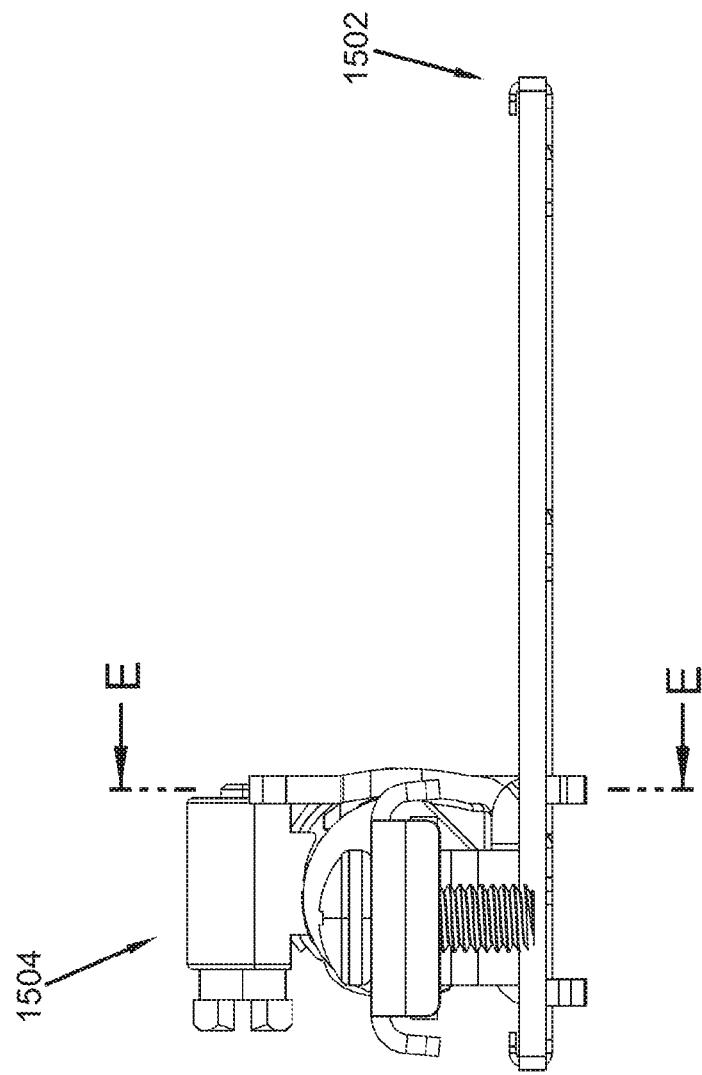
FIG. 76 is a distal end view of the portion of the subassembly of FIG. 75.

Referring now to FIGS. 72-87, the lower subassembly 1500 includes a base plate assembly 1502 to which are mounted cable fixation assemblies. In FIGS. 72-24, three cable fixation assemblies are shown mounted to the base plate assembly 1502 at three parallel mounting positions along a transverse axis of the base plate, including a cable fixation assembly 1200, as described above, and two electrically grounded cable assemblies (or grounded cables assemblies) 1504, positioned on either aside of the cable fixation assembly 1200 on the base plate assembly 1502. The mechanical principles by which the cable fixation assembly 1200 and the grounded cable fixation assembly 1504 mounts to the base plate assembly 1502 are the same, as will be described below.

Outer jackets of cables 1294 are secured at upper and lower mounting positions to the cable fixation assembly 1200. Each mounting position includes a distal stopping wall 1295 at the same axial position as the distal lip that partially defines the downwardly recessed portion 1276. The distal stopping wall 1295 stops further distal advancement of the outer jacket of the cable 1294 beyond the distal stopping wall 1295 when securing the cable 1294 to the body 1202 of the cable fixation assembly 1200. The body 1202 can be made from a material (e.g., a polymeric material) that does not readily conduct electricity. Thus, there is no grounding connection between the cables 1294 and the base plate assembly 1502 via the body 1202 of the cable fixation assembly 1200.

The grounded cable assemblies 1504 each include a main body 1506 that is mountable to the base plate assembly 1502, as described below. The main body 1506 also defines a cable jacket fixation portion 1508 and a strength rod fixation portion 1510. A clamp 1512 secures the outer jacket 1514 of the cable 1516 to the cable jacket fixation portion 1508. The body 1506 can be made from an electrically conductive material, e.g., steel or another metal. Optionally, a portion of the outer jacket 1514 can be removed in the cable jacket fixation portion, to expose a conductive shield of the cable 1516 to electrically conductively contact the body 1506. In addition, the strength rod clamp 1518 can electrically ground an electrically conductive (e.g., metallic) strength rod 1520 of the cable 1516 by establishing a grounding path from the rod 1520 to the body 1506 to the base plate assembly 1502, and from the base plate assembly 1502 to ground, e.g., via a grounding that extends outside of the closure.

Referring to FIGS. 83-87, the base plate assembly 1502 includes an upper plate member 1522 and a lower plate member 1524. The base plate assembly 1502 is defined by a longitudinal axis 1526 that is generally parallel to the axes of the cables entering the closure and extends between proximal and distal ends 1529, 1531 of the base plate assembly 1502, a transverse axis 1528 that is perpendicular to the longitudinal axis 1526 and extends between opposing sides 1530, 1532 of the base plate assembly 1502, and a vertical axis 1534 that is perpendicular to the longitudinal and transverse axes 1526, 1528 and extends between a top 1536 and bottom 1538 of the base plate assembly 1502.

The upper plate member 1522 has a top surface 1540 and a bottom surface 1542 with a plurality of slots extending therebetween. The slots each have a longitudinal dimension, a transverse dimension, and a vertical dimension. The slots are arranged to receive and lock plate engageable members of mounting portions of different cable fixation assemblies, such as the cable fixation assemblies 1200 and 1504.

A distal row 1544 of slots are locking slots that cooperate with biasing members of the lower plate member 1524 to lock cable fixation assemblies to the base plate assembly 1502.

The transverse dimension of the slots 1546 is substantially wider (e.g., by a factor of 2, a factor of 3, a factor of 4, or more), than the corresponding width of the plate engageable member of the cable fixation assembly it receives. This extra transverse width can permit the same set 1548 of slots 1546 to accommodate mounting portions of different sized cable fixation assemblies. For example, the distance between transversely separated plate engageable members of the cable fixation assembly 1504 is greater than the corresponding transverse distance between corresponding plate engageable members of the cable fixation assembly 1200, and the set 1548 of slots 1546 can accommodate either of these mounting portions. In addition, the extra transverse width of the slots 1546 can provide greater flexibility in properly aligning a cable fixation assembly and cable with the corresponding cable port of the closure, thereby facilitating utilization of the same base plate assembly 1502 in closures and/or with cables of different configurations.

Slots 1550 of smaller transverse width can be provided on the same plate member 1522. To accommodate the transversely offset plate engageable members of differently configured mounting portions of cable fixation assemblies, multiple adjacent offset slots 1552 can be provided but, e.g., only at the longitudinal position where the offset plate engageable member will engage the plate member 1522. Thus, for example, no additional slot positions are provided adjacent the slots 1550a and 1550b that receive the axially aligned (i.e., non-offset) plate engageable members of a cable fixation assembly.

The slot arrangement of the upper member 1522 can reduce the total number of slots provided in the base plate without sacrificing flexibility in mounting of number or type of cable fixation assembly thereto. In this manner, the strength and structural integrity of the base plate member 1522 can be strengthened by the presence of fewer material voids. In addition, the size and spacing of the slots can maximize utilization of transverse space when placing multiple of the base plate assemblies 1502 side by side along the transverse axis, by minimizing the gap between a cable fixation assembly mounting position on a base plate assembly and an immediately adjacent cable fixation mounting position on an adjacent base plate assembly.

One or both of the base plate members 1522 and 1524 can be made from an electrically conductive material (e.g., steel) for enhanced strength and/or to provide electrical grounding capabilities for the cables entering the closure and having electrically conductive pathways via their cable fixation assemblies.

The lower base plate member 1524 includes a body 1554. Fingers 1556 extend distally from the body 1554. At the distal ends of the fingers 1556, resilient members 1558 extend. The resilient members 1558 extend from a fixed end 1560 to a free end 1562 generally parallel to the transverse axis and perpendicular to the longitudinal axis. The resilient members 1558 are positioned to enter locking slots of the upper base plate member and engage base plate engageable portions of the mounting portions of cable fixation assemblies when installing and mounting cable fixation assemblies to the base plate assembly 1502.

Opposing brackets 1564 extend from opposite sides of the lower base plate member 1524 act as couplers configured to engage opposing sides of the upper base plate member 1522 to limit both vertical and transverse movement of one of the base plate members relative to the other. A tab 1566 extends from the lower base plate member 1524 and is configured to engage a pocket 1568 defined by the upper base plate member 1522 to limit longitudinal movement of one of the base plate members relative to the other.

In some examples, the lower base plate member 1524 is made from a metal or other electrically conductive material, e.g., steel. In some examples, the lower base plate member 1524 is made from a non-electrically conductive material, e.g., a polymeric material.

Figure 78:
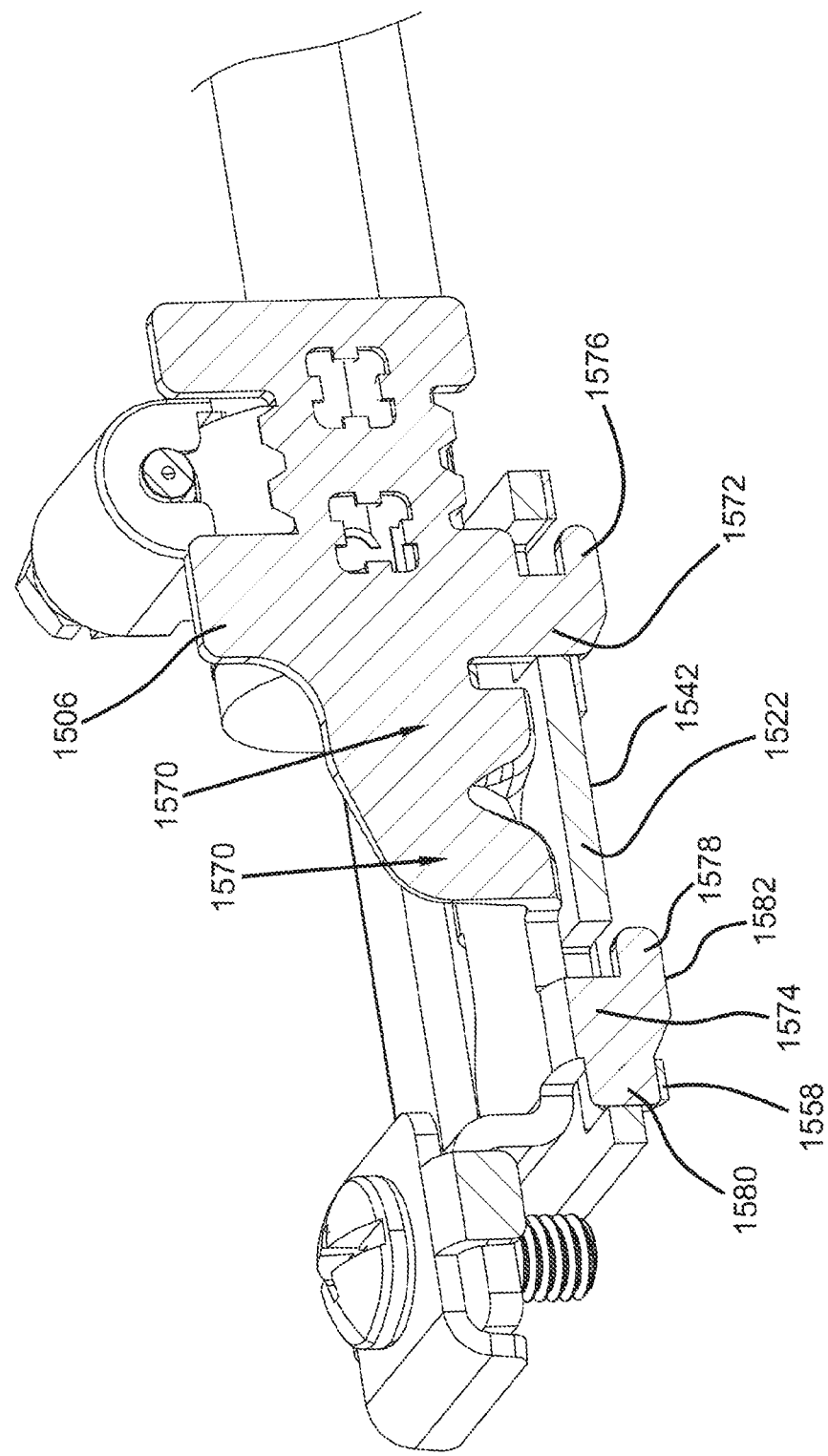
FIG. 78 is a perspective cross-sectional view of the subassembly of FIG. 75 along the line E-E in FIG. 76 modified to show the cable fixation assembly in an installation position relative to the base plate assembly.
Figure 79:
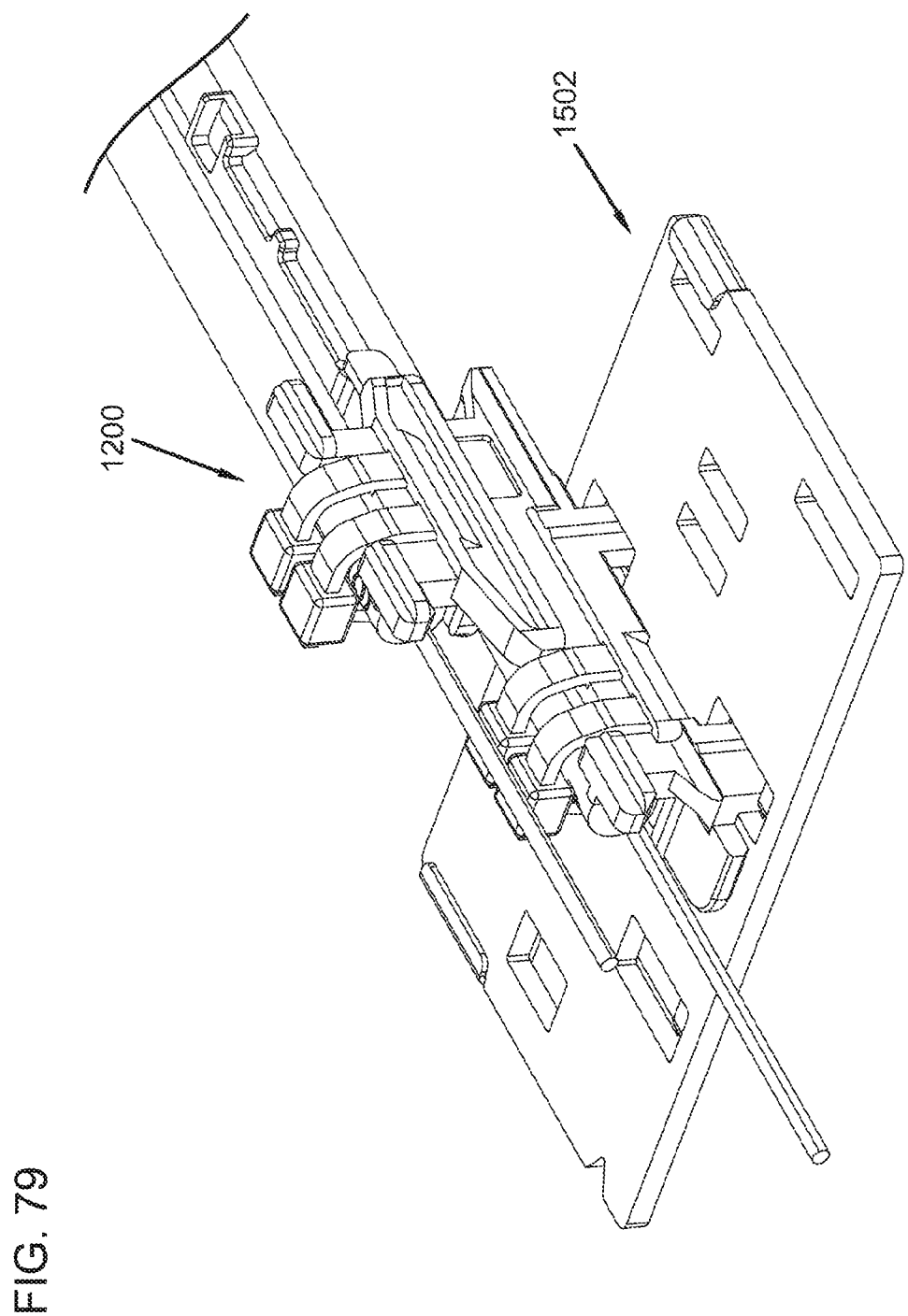
FIG. 79 is a perspective view of a further portion of the subassembly of FIG. 72, including one of the cable fixation assemblies mounted to an example base plate assembly in accordance with the present disclosure.
Figure 80:
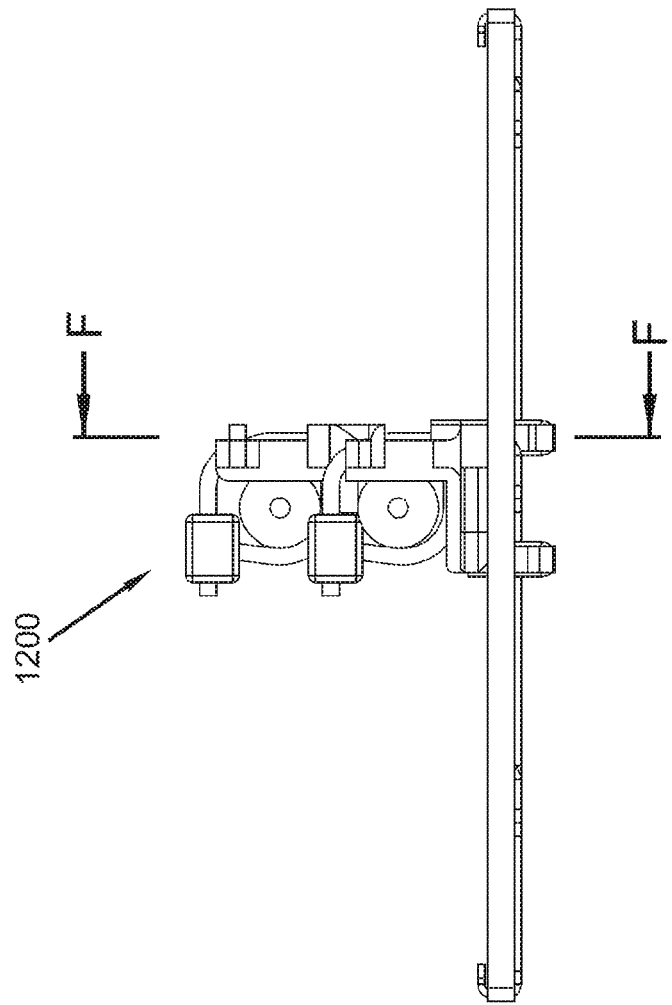
FIG. 80 is a distal end view of the portion of the subassembly of FIG. 79.
Figure 81:
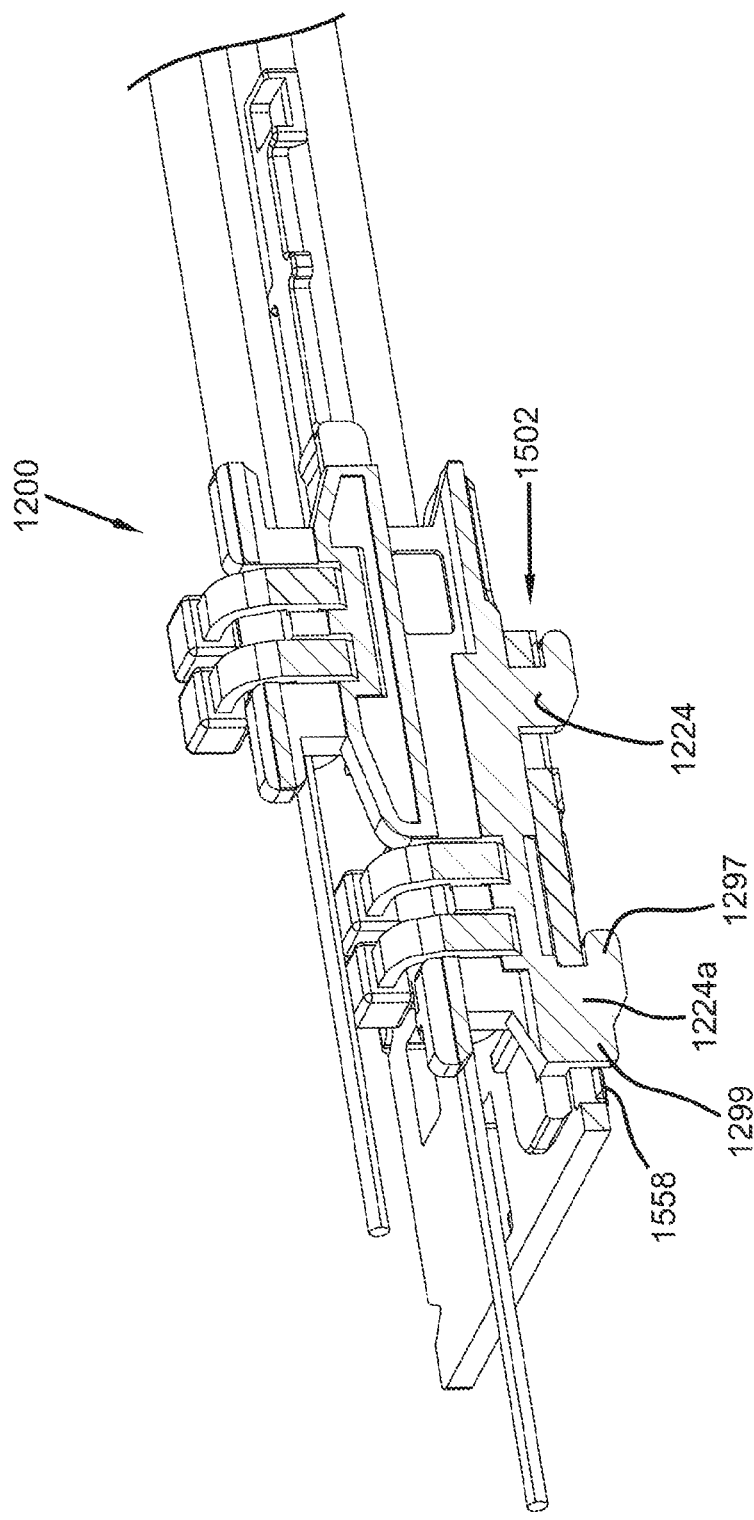
FIG. 81 is a perspective cross-sectional view of the subassembly of FIG. 79 along the line F-F in FIG. 80, with the cable fixation assembly in a fully mounted position relative to the base plate assembly.
Figure 82:
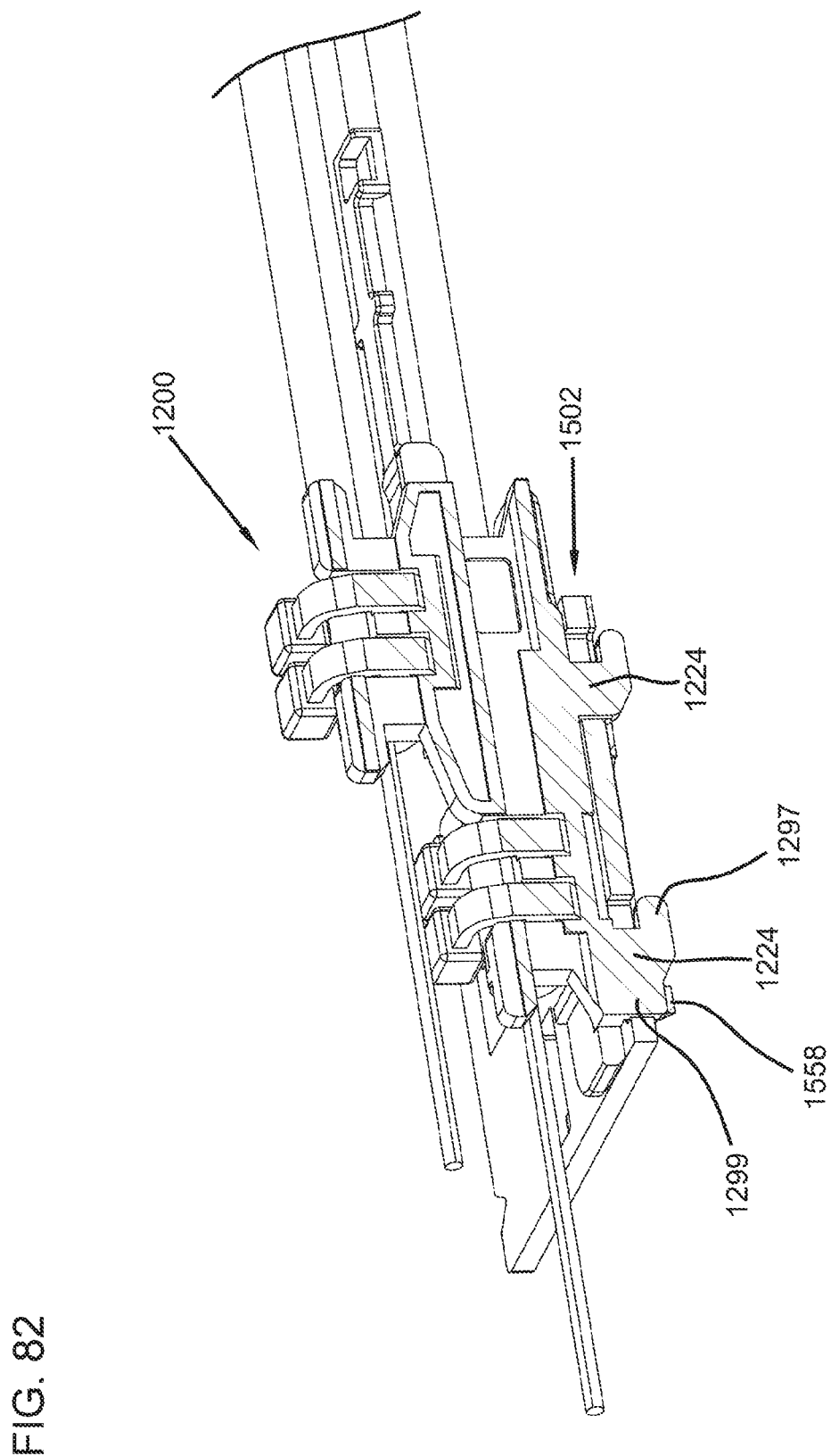
FIG. 82 is a perspective cross-sectional view of the subassembly of FIG. 79 along the line F-F in FIG. 80 modified to show the cable fixation assembly in an installation position relative to the base plate assembly.
Figure 83:
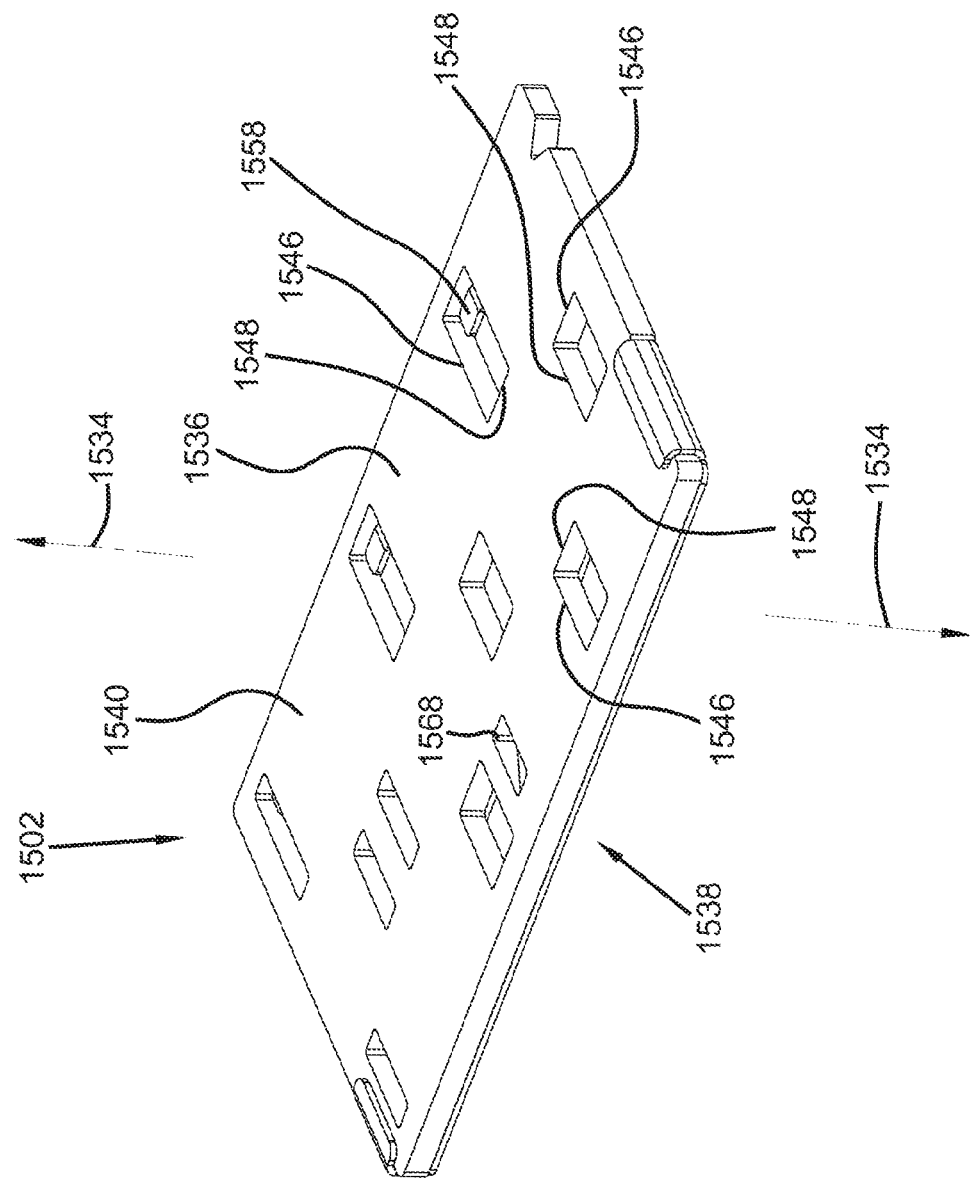
FIG. 83 is a perspective view of the base plate assembly of FIG. 75.
Figure 84:
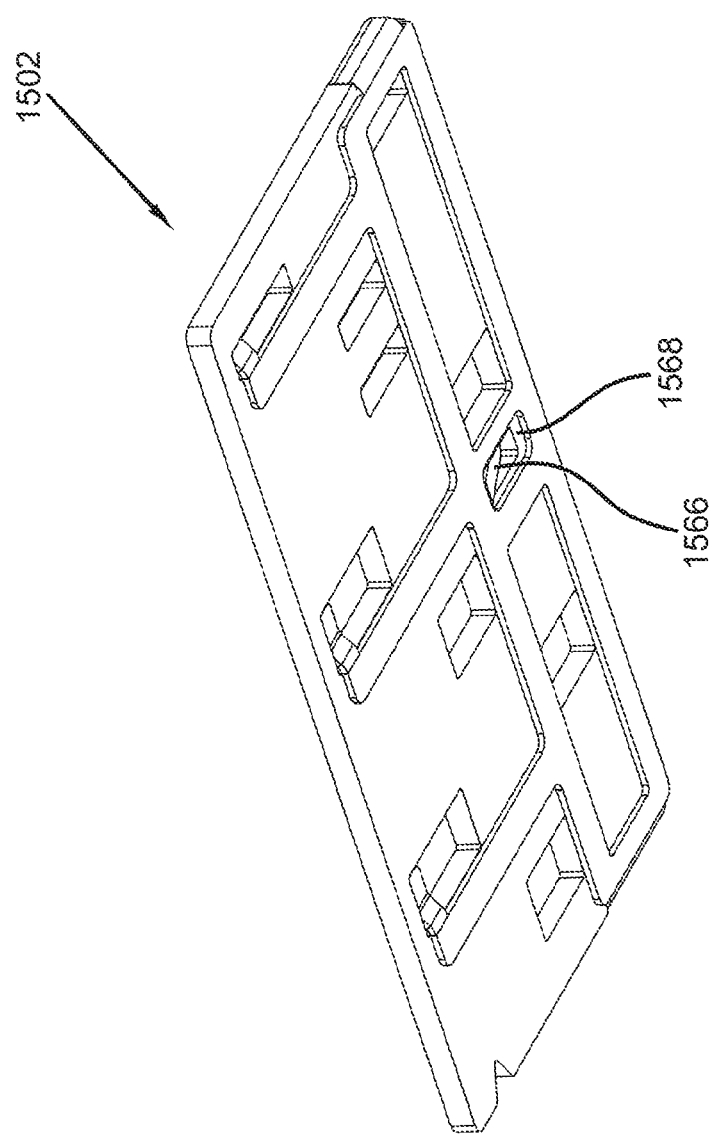
FIG. 84 is a further perspective view of the base plate assembly of FIG. 75.
Figure 85:
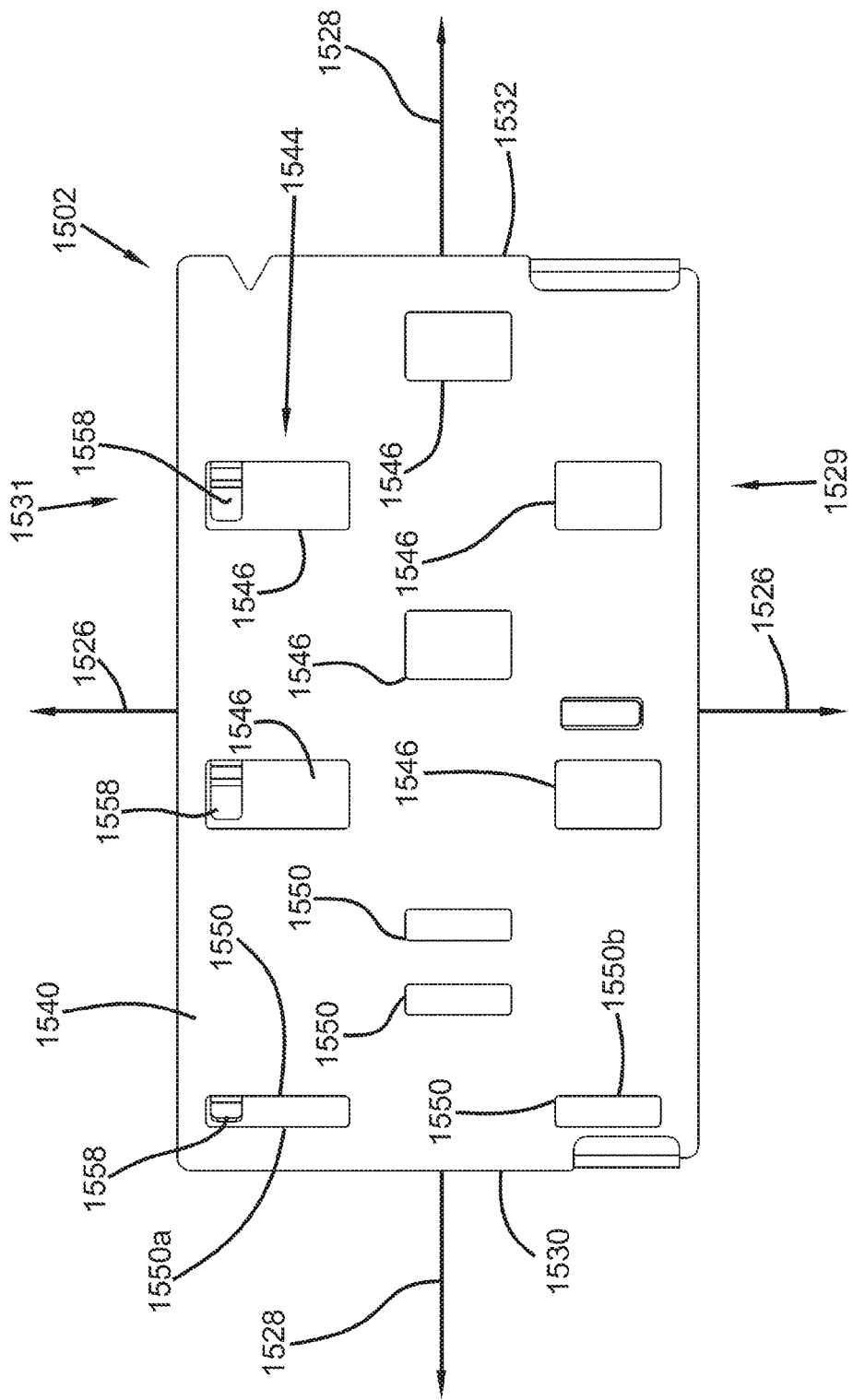
FIG. 85 is a top view of the base plate assembly of FIG. 75.
Figure 86:
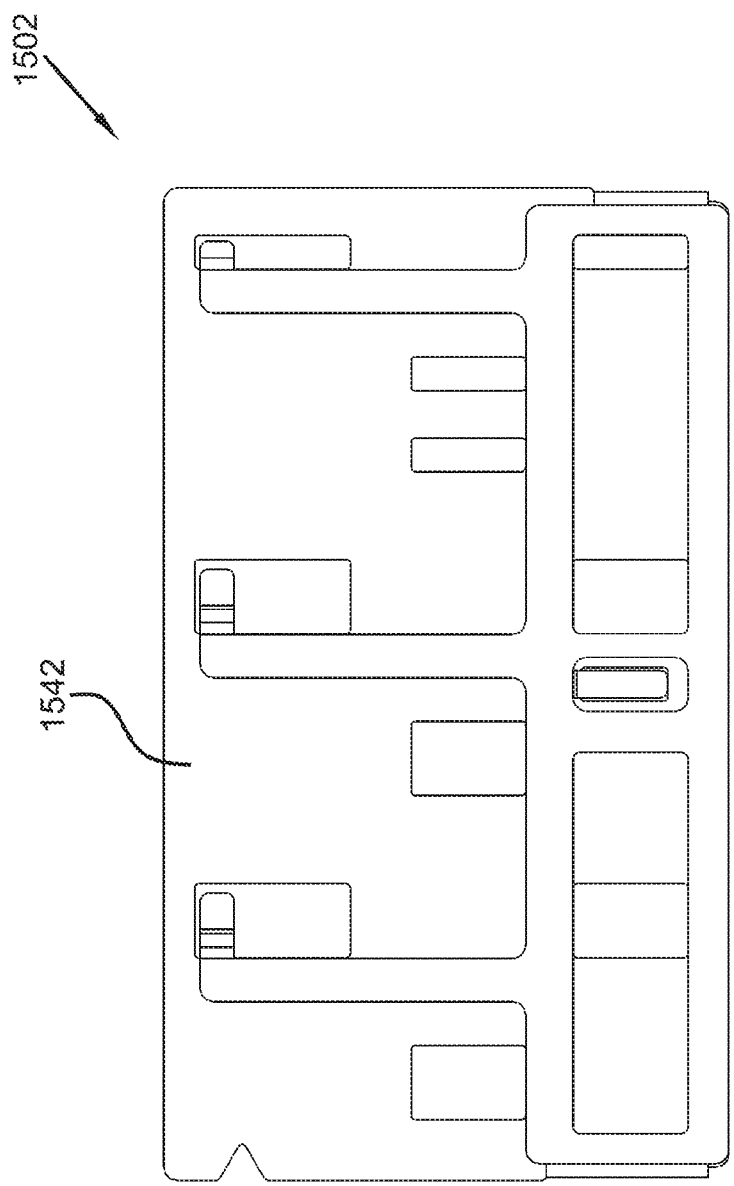
FIG. 86 is a bottom view of the base plate assembly of FIG. 75.
Figure 87:
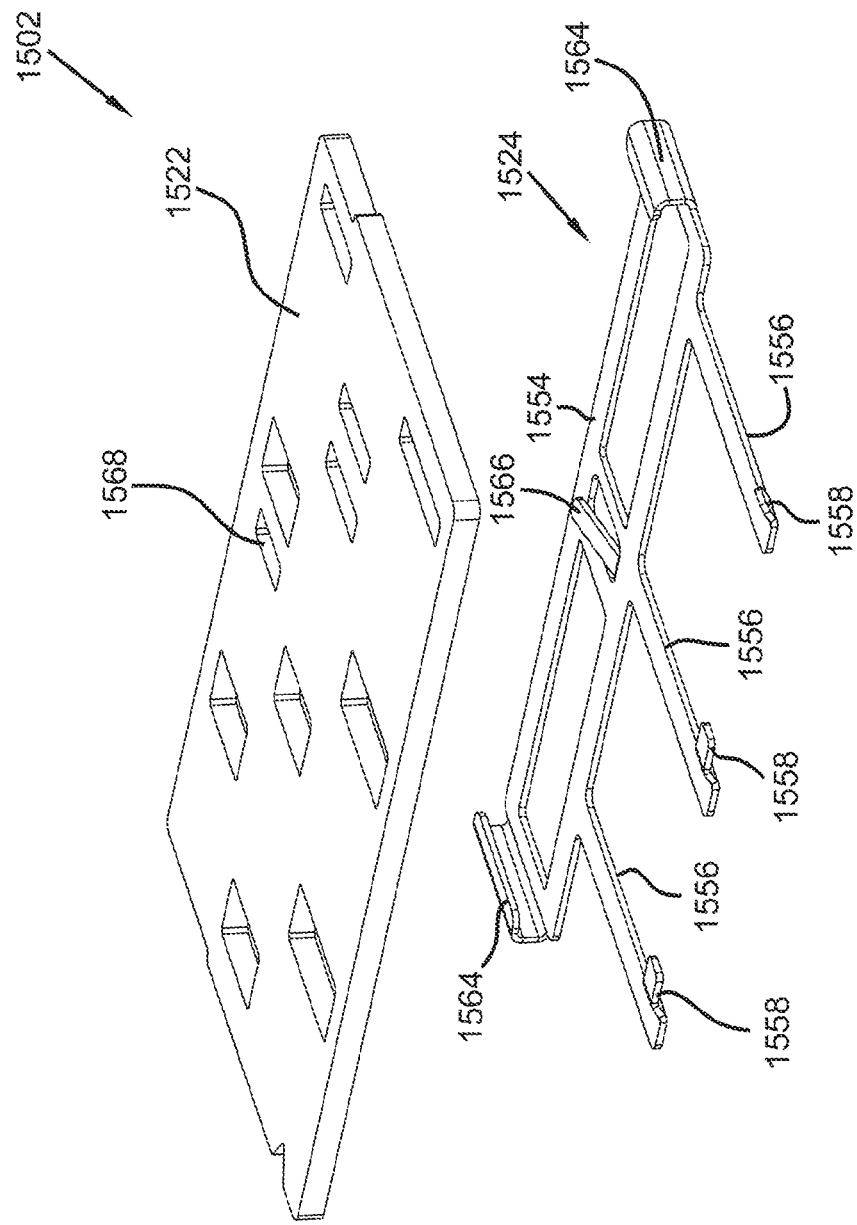
FIG. 87 is an exploded view of the base plate assembly of FIG. 75.
Figure 88:
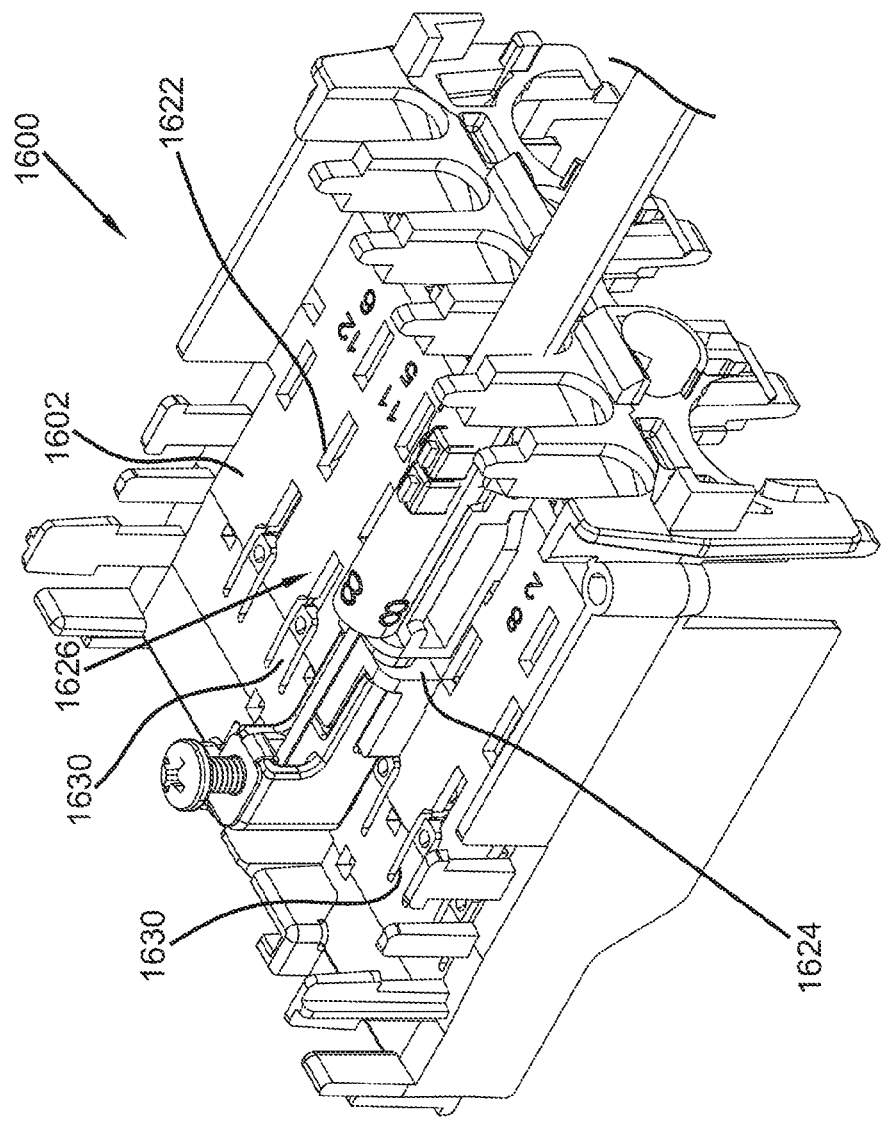
FIG. 88 is a perspective view of an upper subassembly of the closure assembly of FIG. 70.
Figure 89:
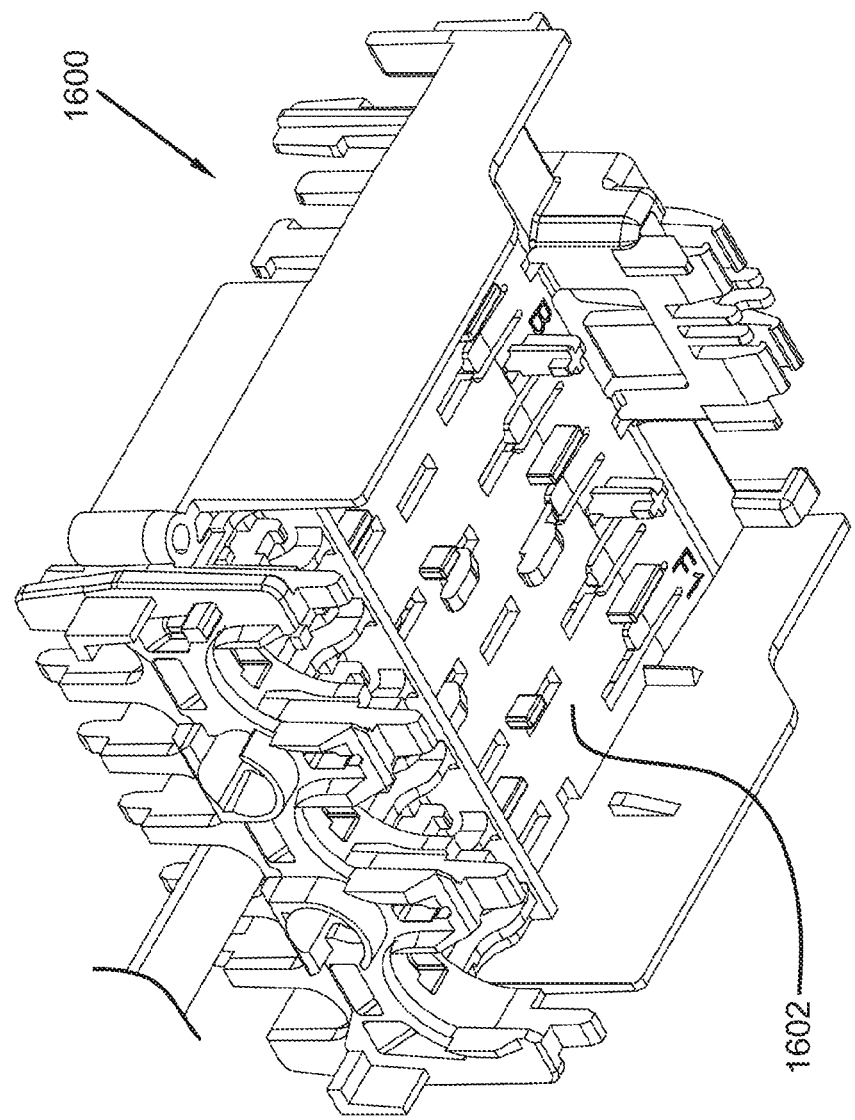
FIG. 89 is a further perspective view of the upper subassembly of the closure assembly of FIG. 70.
Figure 90:
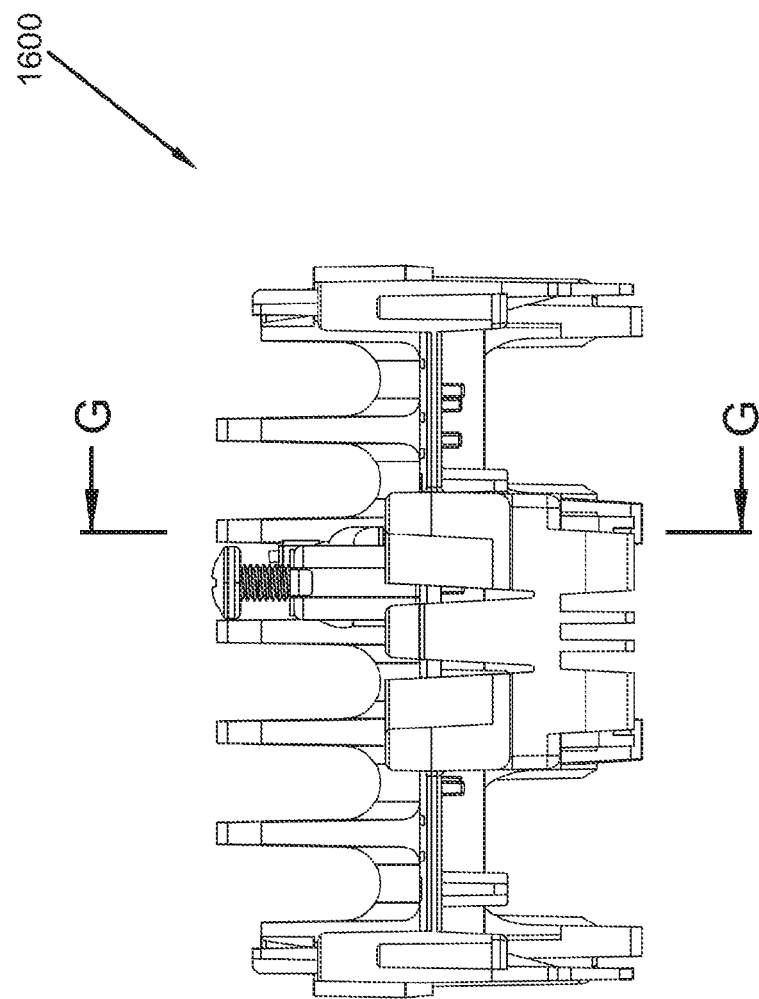
FIG. 90 is a distal end view of the upper subassembly of the closure assembly of FIG. 70.

Referring to FIG. 78, the main body 1506 of the grounded cable fixation assembly 1504 includes a mounting portion 1570 that includes plate engageable members. The plate engageable members include two longitudinally aligned legs 1572 and 1574 with feet 1576 and 1578, respectively, extending proximally therefrom, and a third leg and foot that is transversely offset therefrom. Distally positioned from the distal-most leg 1574 and foot 1578 is a heel portion 1580. The heel portion 1580 does not extend as low as the foot 1578. The heel portion 1580 is positioned to engage and push downward on the resilient member 1558 to flex the resilient member 1558 into its flexed configuration as shown in FIG. 78. As shown in FIG. 78, in the flexed configuration the feet 1576 and 1578 have downwardly cleared the bottom surface 1542 of the upper plate member 1522. In addition, because the heel portion 1580 is stepped up from the foot 1578, the resilient member 1558 is positioned above the bottom 1582 of the foot 1578, even in the flexed configuration of the resilient member 1558. Thus, the depicted arrangement allows for proximal advancement of the feet under upper plate member 1522 to lock the cable fixation assembly to the base plate assembly with reduced flex of the resilient member 1558. This can reduce the chances of breaking or damaging the resilient member due to over-flexing, and also increase the longevity of the resilient member by helping to preserve its resilience.

Figure 77:
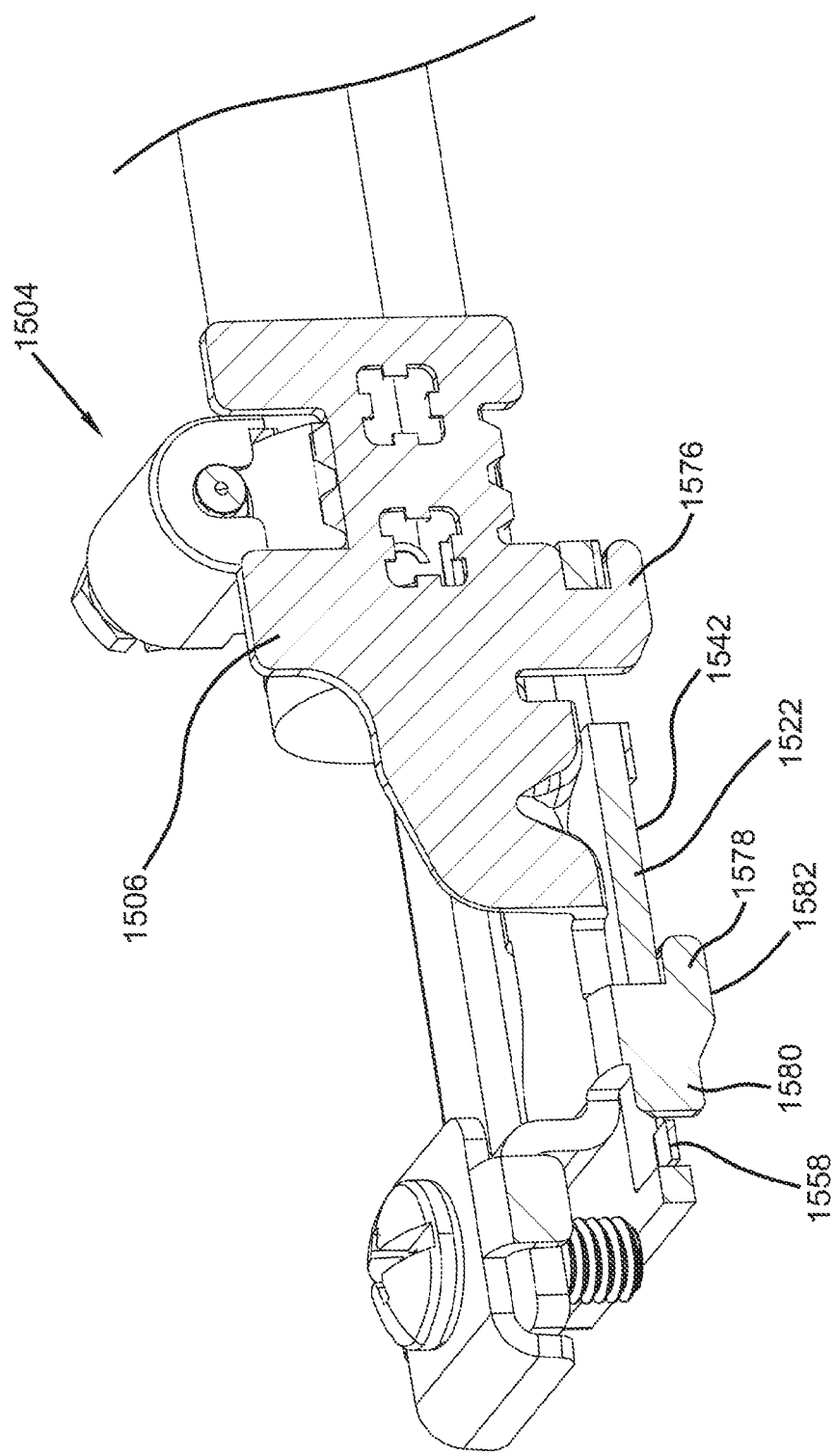
FIG. 77 is a perspective cross-sectional view of the subassembly of FIG. 75 along the line E-E in FIG. 76, with the cable fixation assembly in a fully mounted position relative to the base plate assembly.

As shown in FIG. 77, once the feet have been slid proximally forward and under the upper plate member 1522, the resilient member 1558 resiliently returns to its relaxed configuration where it is positioned to limit distal movement of the foot 1578 and thereby lock the grounded cable fixation assembly 1504 to the base plate assembly 1502.

To remove the grounded cable fixation assembly 1504 from the base plate assembly 1502, the resilient member 1558 can be flexed to its flexed configuration, e.g., with a tool, and the grounded cable fixation assembly 1504 can then be slid distally until the feet clear the proximal ends of the corresponding slots, and then the grounded cable fixation assembly 1504 can be lifted upward and removed from the base plate assembly 1502.

Referring now to FIGS. 79-82, the principles of mounting and de-mounting of the cable fixation assembly 1200 are the same as for the cable fixation assembly 1500 just described. Distal to the foot 1297 extending proximally from the leg 1224a is a heel portion 1299 configured to cooperate with the resilient member 1558 as described above to lock the assembly 1200 to the base plate assembly 1502, and unlock it therefrom. As shown the bottom surface of the heel portion 1299 that presses on the resilient member 1558 to move the resilient member from the relaxed configuration to the flexed configuration is above the bottom of the foot 1297.

Referring now to FIGS. 88-94, the upper subassembly 1600 includes a slotted base plate 1602. In this example, the base plate 1602 is molded from a polymeric material. The slotted base plate 1602 extends from a proximal end 1604 to a distal end 1606 along a longitudinal axis 1608, between a first side 1610 and second side 1612 along a transverse axis 1614, and between a top 1616 and a bottom 1618 along a vertical axis 1620. The slots 1622 of the base plate 1602 are arranged in groups or sets of three, each group including two longitudinally aligned slots and one transversely offset slot. Thus, the number of slots in adjacent longitudinal rows of slots varies. The slots receive legs and feet of the mounting portion of the body 1624 of the cable fixation assembly 1626. A transverse row 1628 of distal-most slots 1622 are locking slots.

Associated with each locking slot is a resilient member 1630 extending from a fixed end 1632 to a free end 1634 generally parallel to the longitudinal axis, with the fixed end 1632 being positioned distally of the free end 1634.

Figure 91:
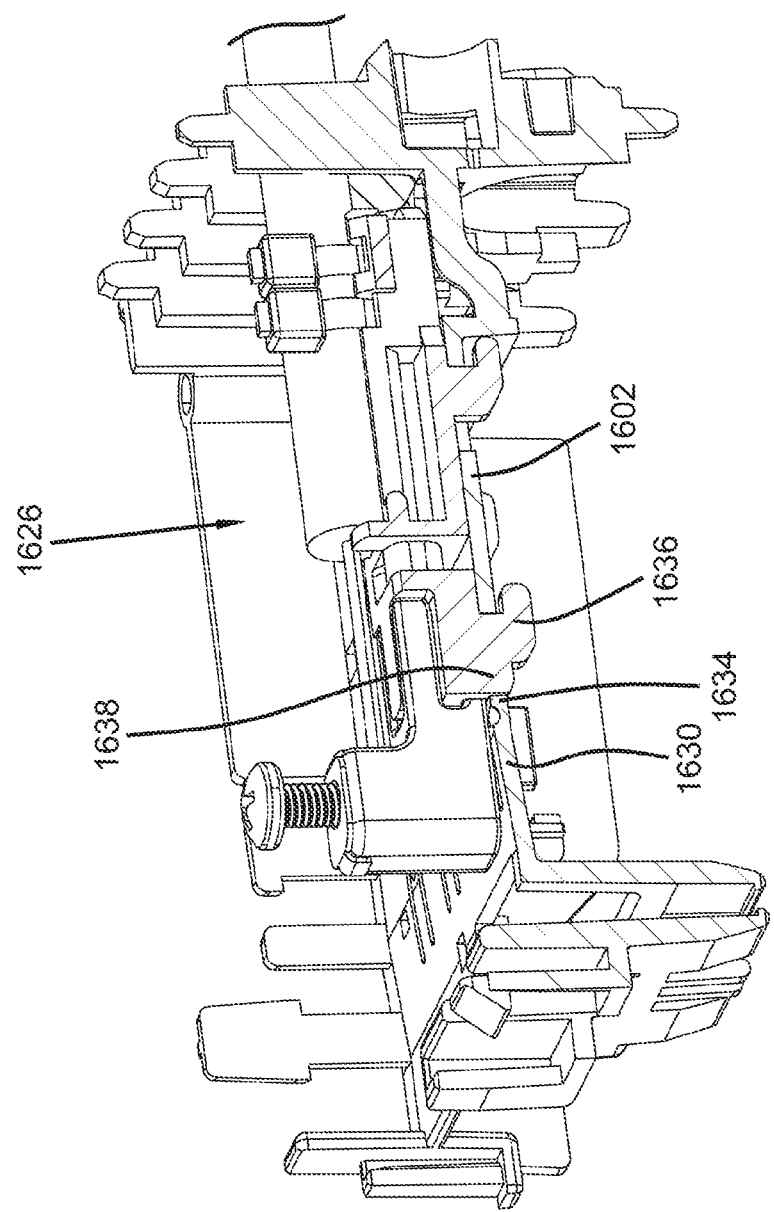
FIG. 91 is a perspective, cross-sectional view of the upper subassembly of FIG. 70 along the line G-G in FIG. 90, showing a cable fixation assembly in a fully mounted position relative to a further example base plate in accordance with the present disclosure.
Figure 92:
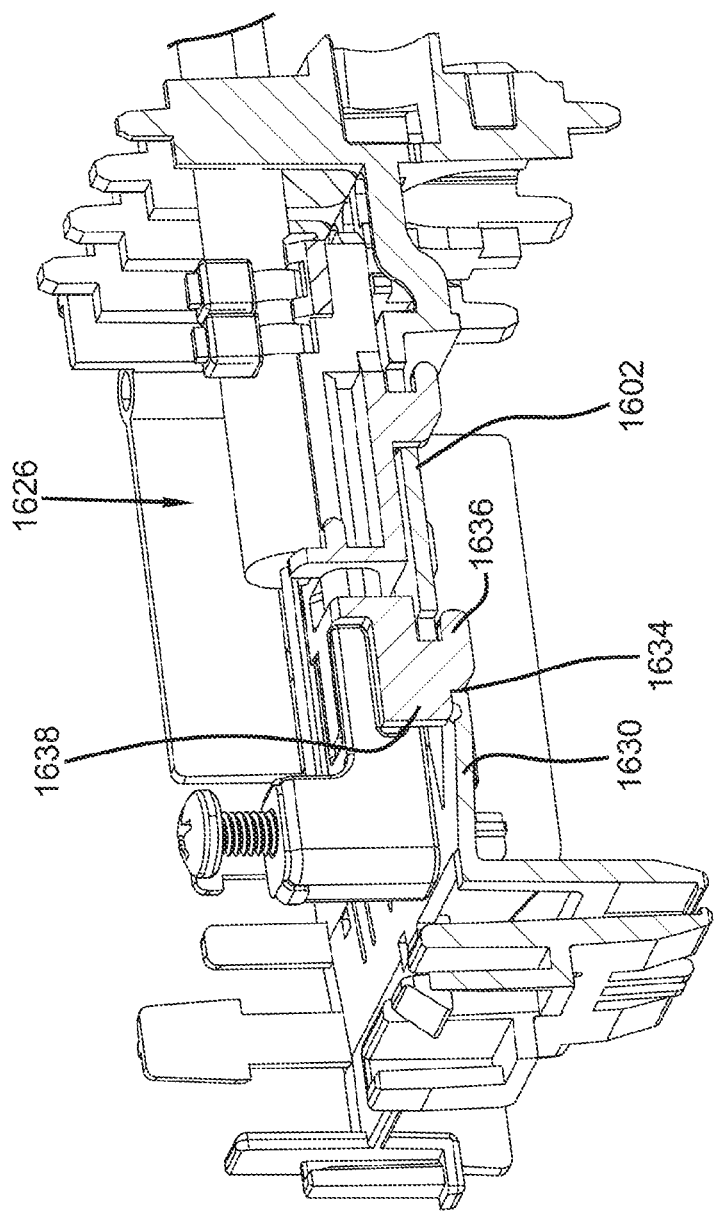
FIG. 92 is a perspective, cross-sectional view of the upper subassembly of FIG. 70 along the line G-G in FIG. 90, modified to show the cable fixation assembly in an installation position relative to the base plate.
Figure 93:
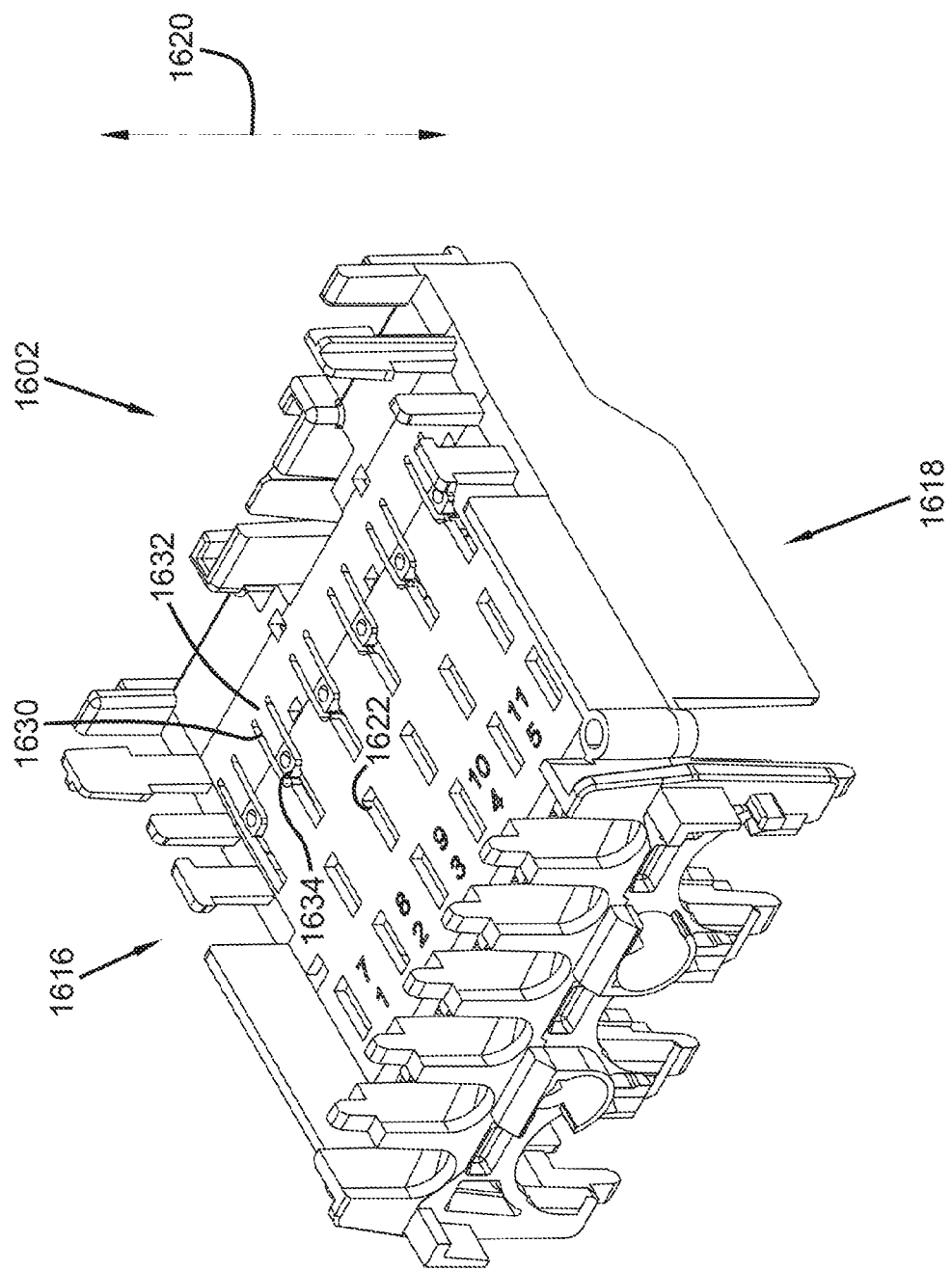
FIG. 93 is a perspective view of the base plate of the upper subassembly of FIG. 70.
Figure 94:
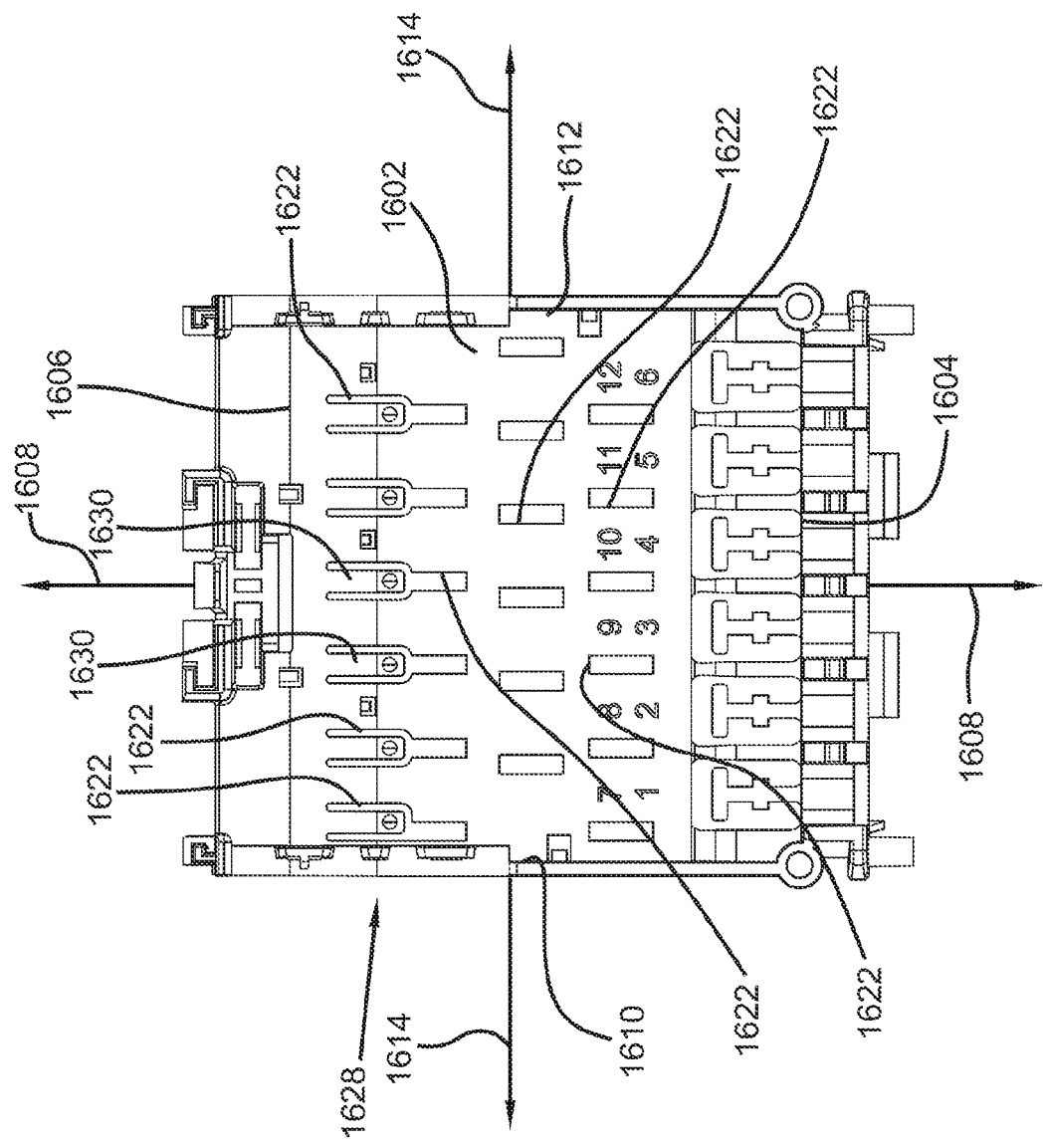
FIG. 94 is a further perspective view of the base plate of the upper subassembly of FIG. 70.
Figure 95:
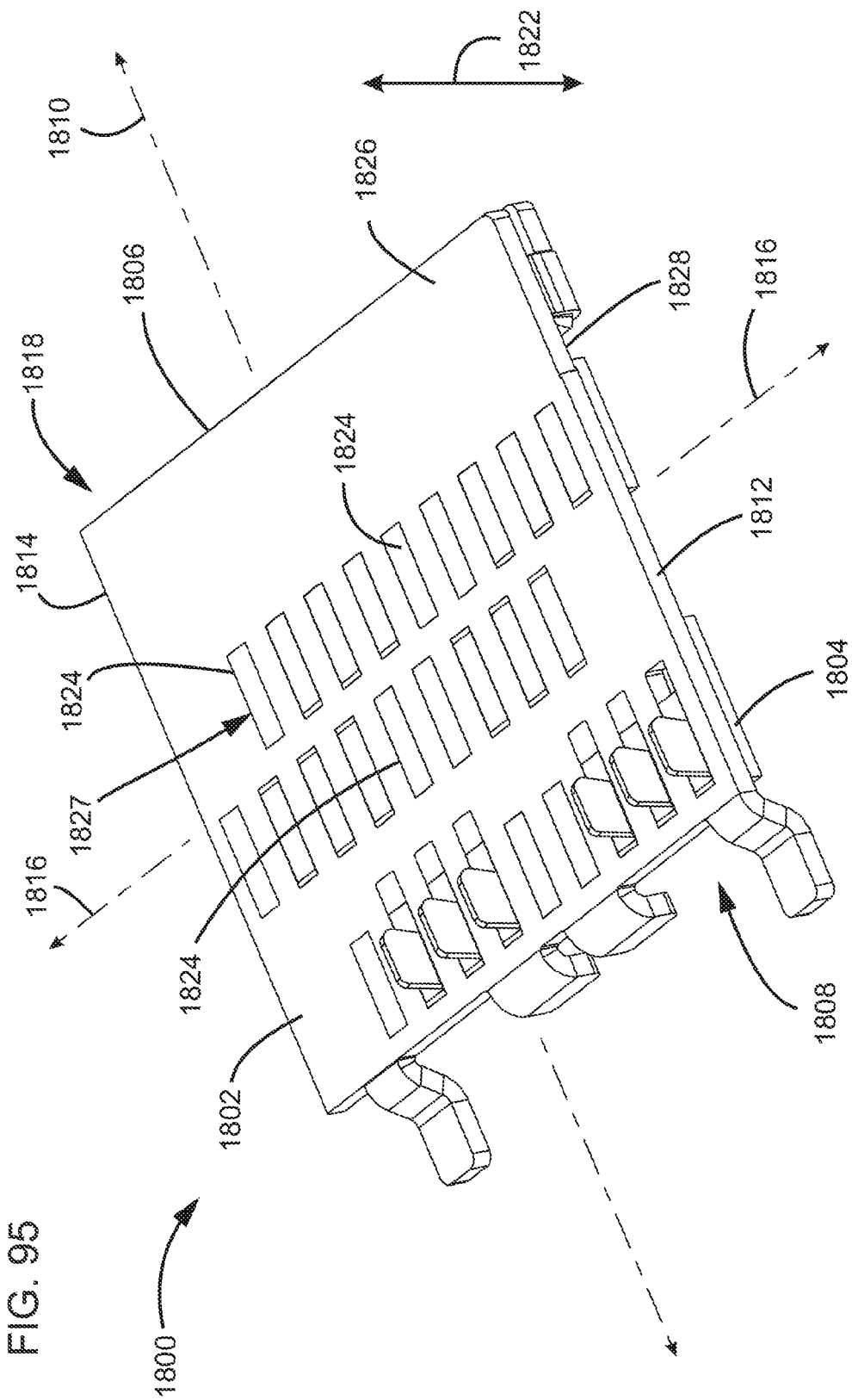
FIG. 95 is a perspective view of a further base plate assembly in accordance with the present disclosure.
Figure 96:
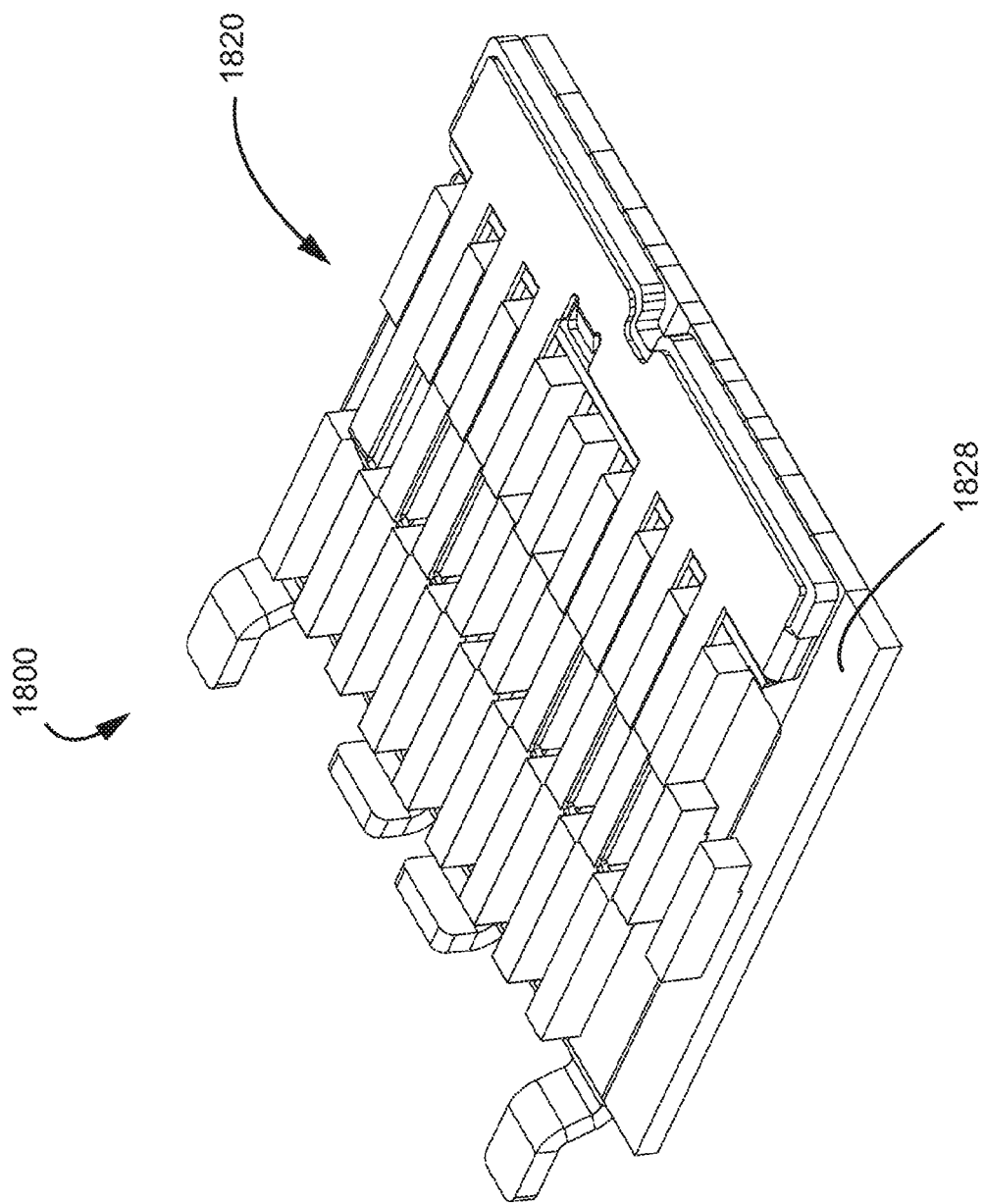
FIG. 96 is a further perspective view of the base plate assembly of FIG. 95.
Figure 97:
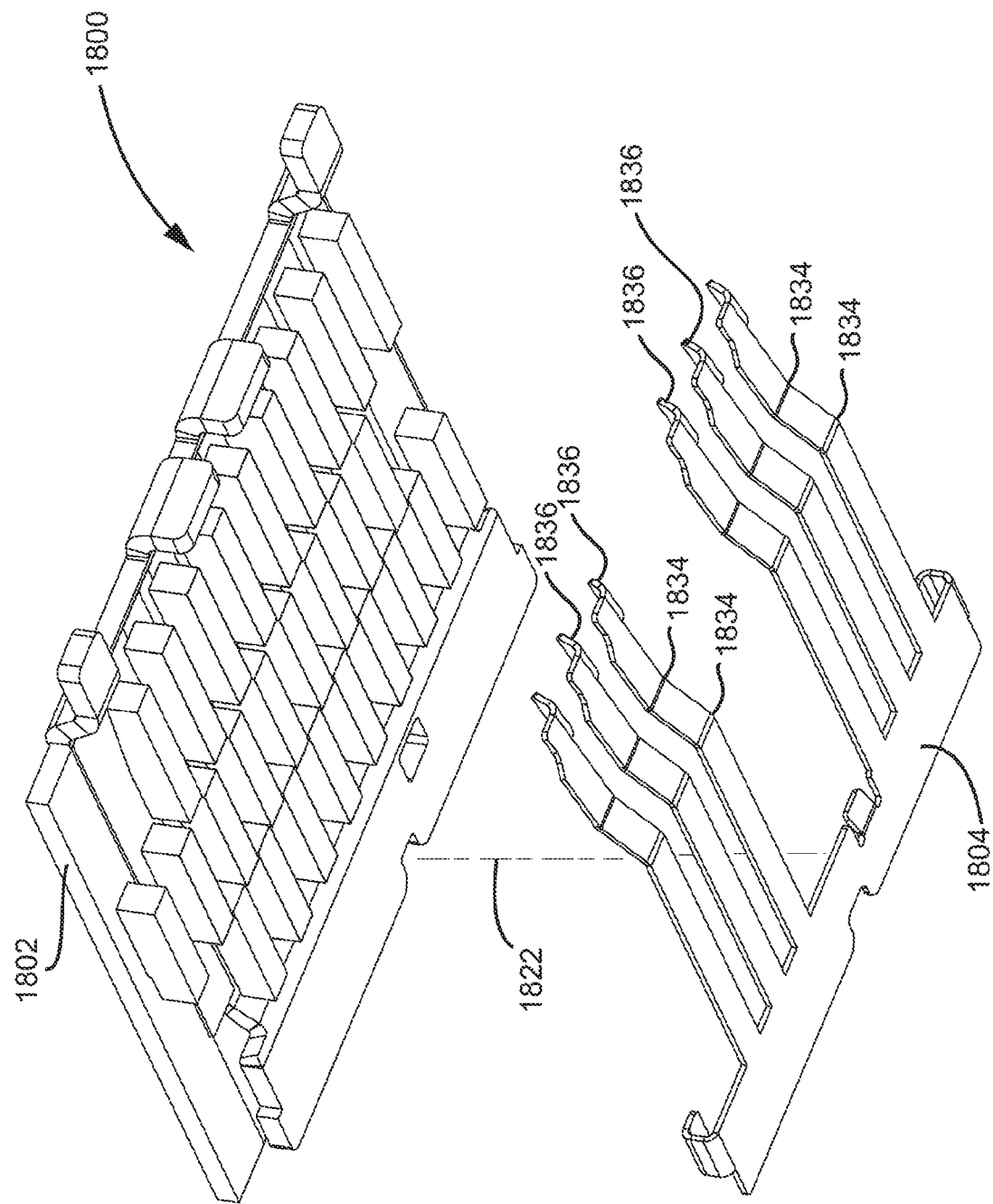
FIG. 97 is a further perspective view of the base plate assembly of FIG. 95.
Figure 98:
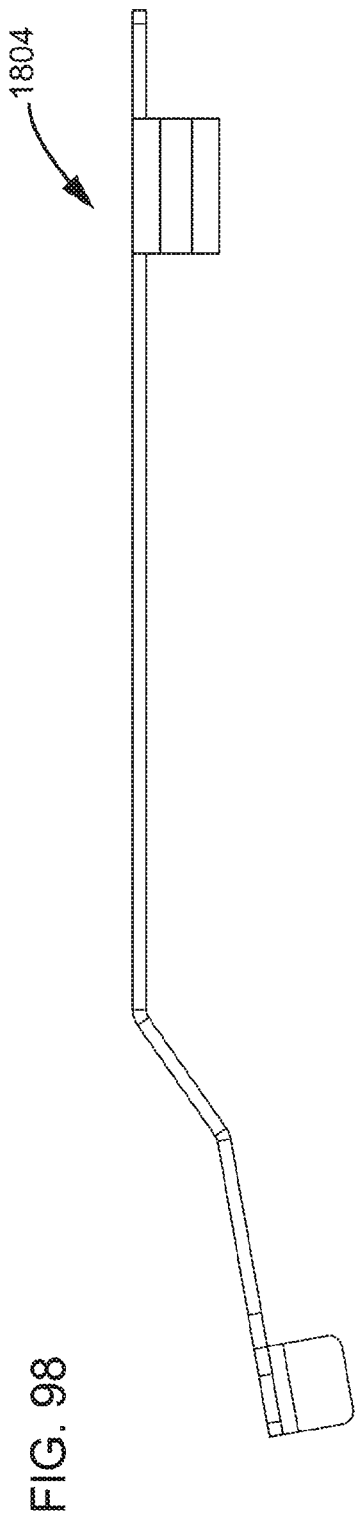
FIG. 98 is a side view of a portion of the base plate assembly of FIG. 95.
Figure 99:
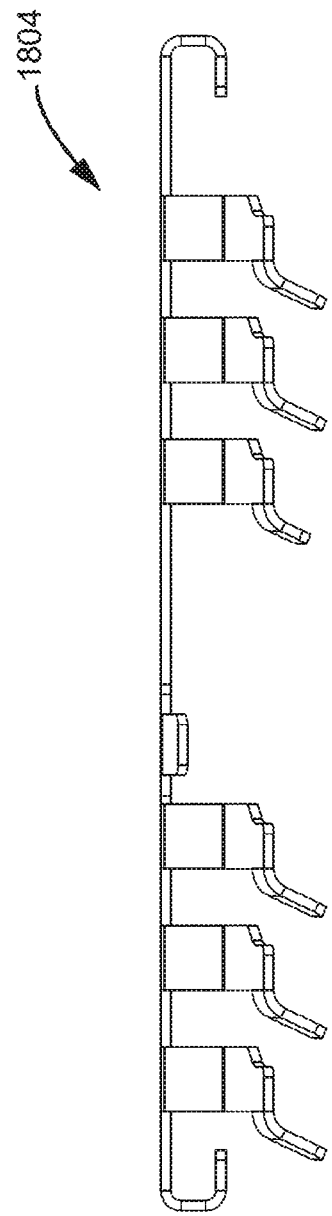
FIG. 99 is a proximal end view of the base plate assembly of FIG. 95.
Figure 100:
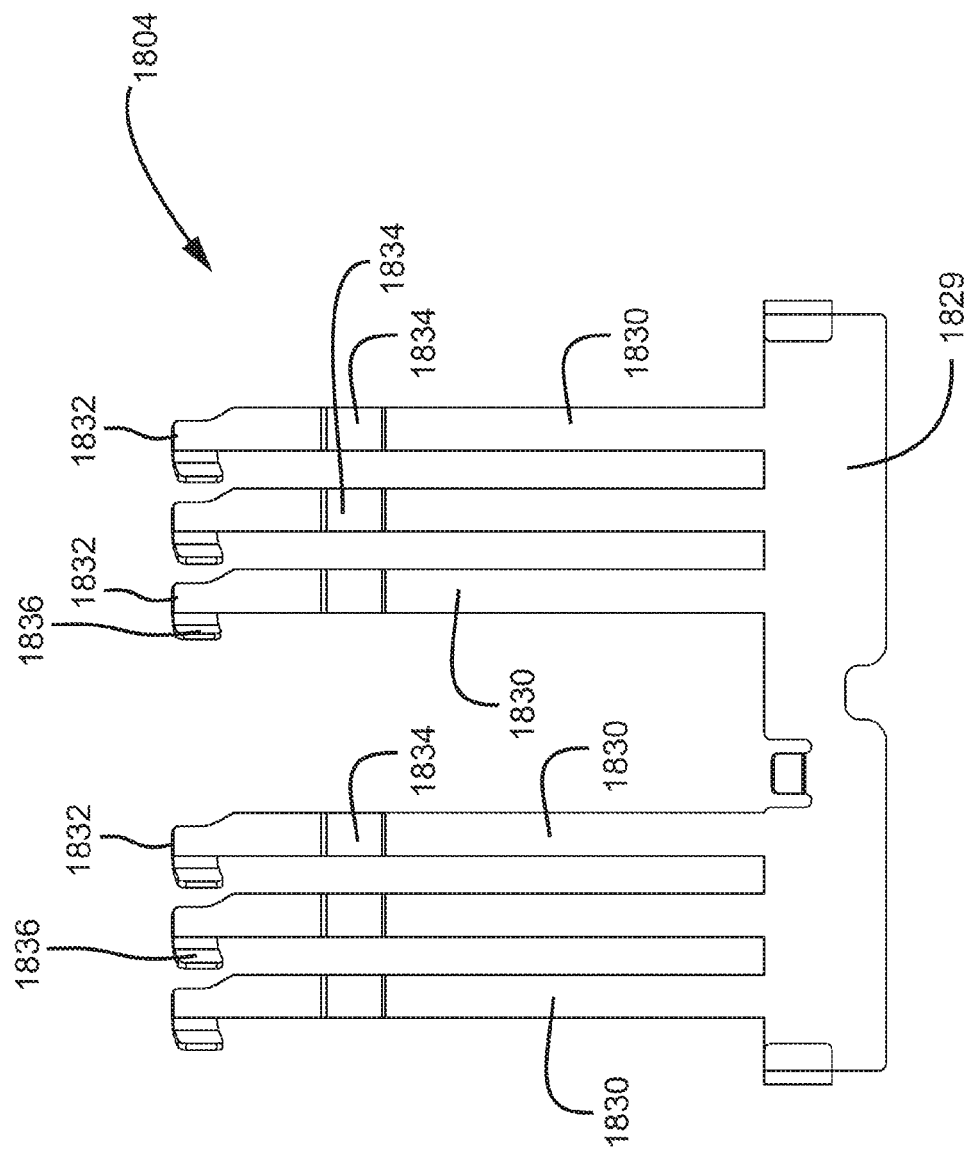
FIG. 100 is a top view of the base plate assembly of FIG. 95.

Distally of the distal-most foot 1636 of the cable fixation assembly 1626 is a heel portion 1638 that, as shown in FIG. 92, deflects the free end of 1632 of the resilient member 1630 downward when installing the cable fixation assembly 1626 on the base plate 1602, allowing the foot 1636 to slide proximally under base plate 1602 into the mounted or locked position shown in FIG. 91, in which the resilient member 1630 has returned to its relaxed configuration. The stepped-up nature of the heel portion 1638 relative to the bottom of the foot 1636 can help to preserve the resilience and function of the resilient member 1630, as described above.

Figure 101:
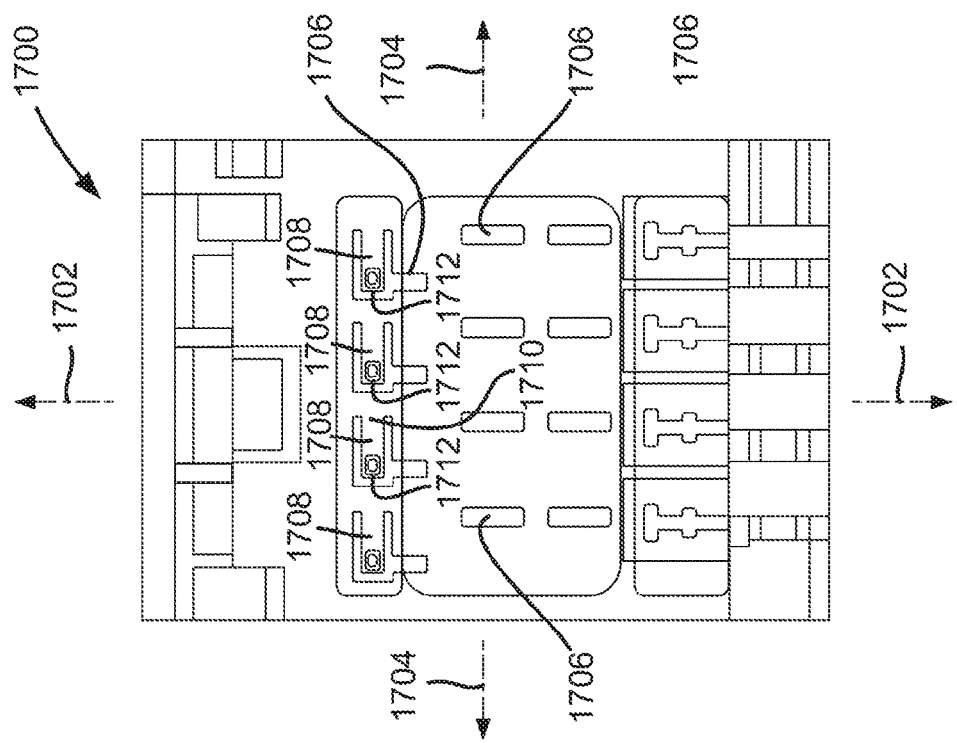
FIG. 101 is a top schematic view of a further example of a base plate in accordance with the present disclosure.
Figure 102:
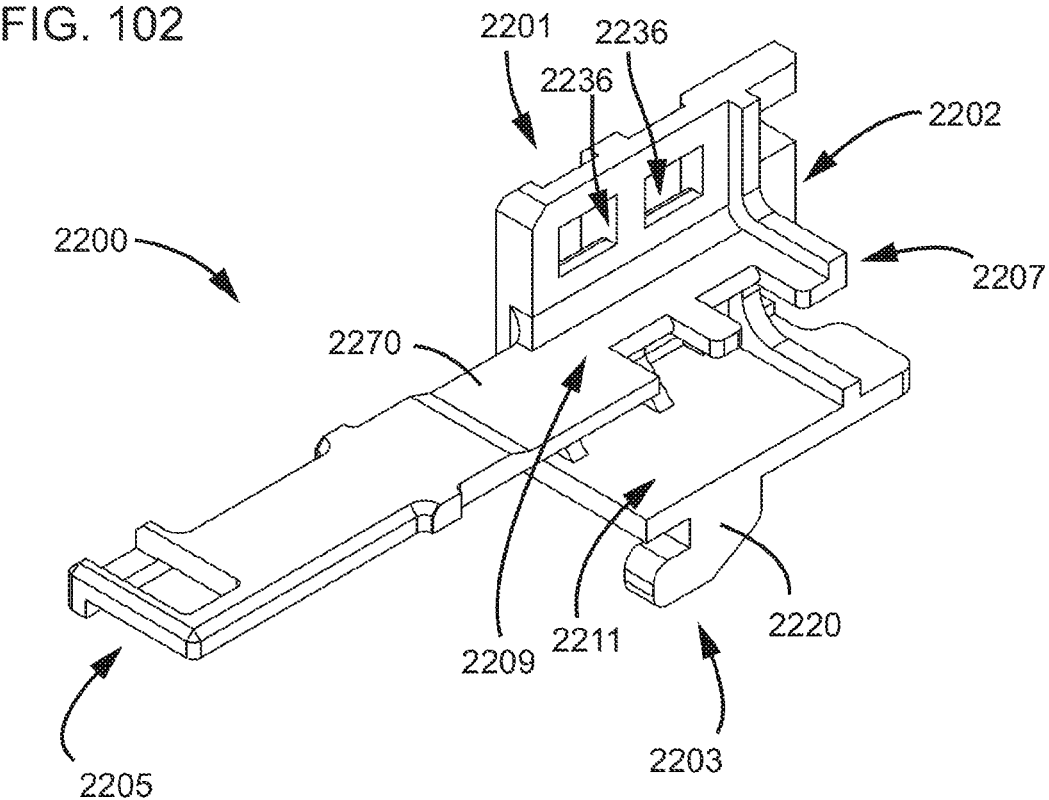
FIG. 102 is a perspective view of a further example cable fixation unit in accordance with the present disclosure.
Figure 103:
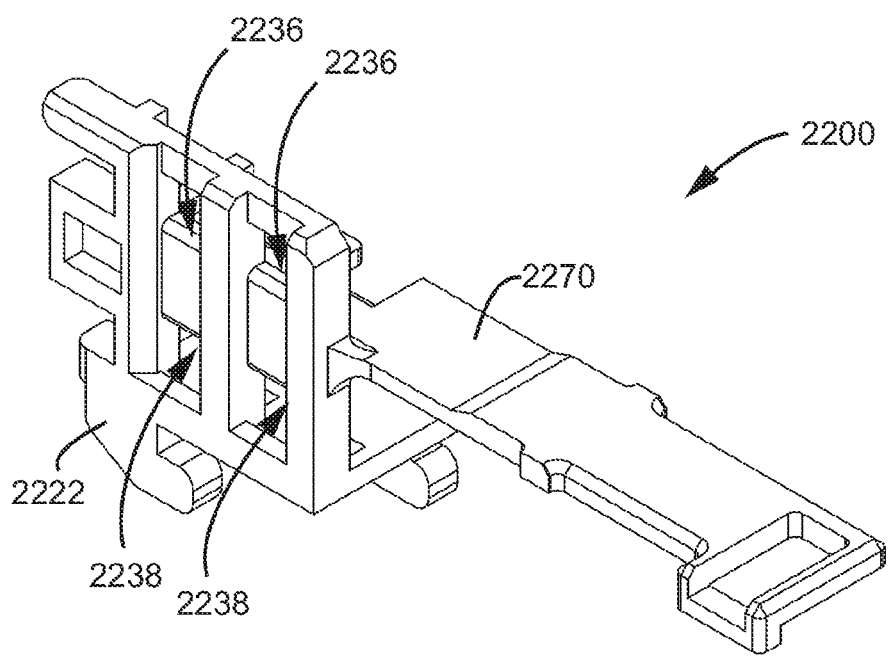
FIG. 103 is a further perspective view of the cable fixation unit of FIG. 102.
Figure 104:
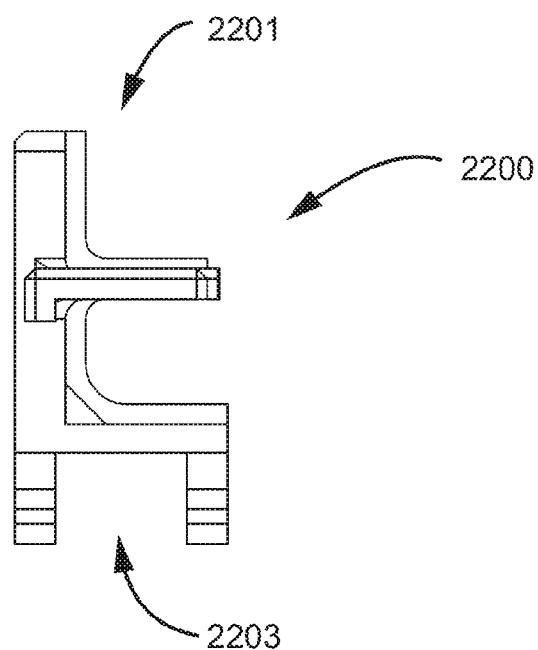
FIG. 104 is a proximal end view of the cable fixation unit of FIG. 102.
Figure 105:
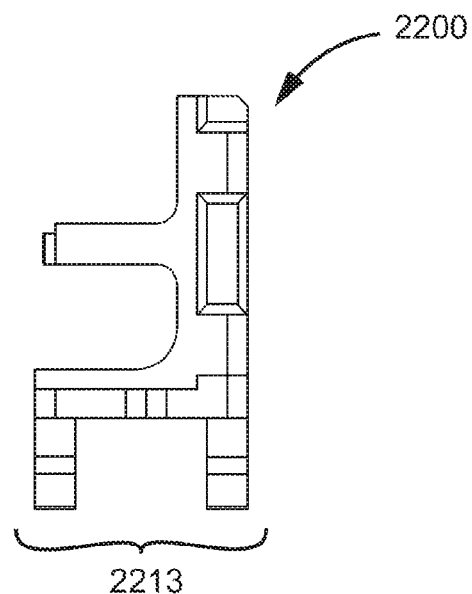
FIG. 105 is a distal end view of the cable fixation unit of FIG. 102.
Figure 106:
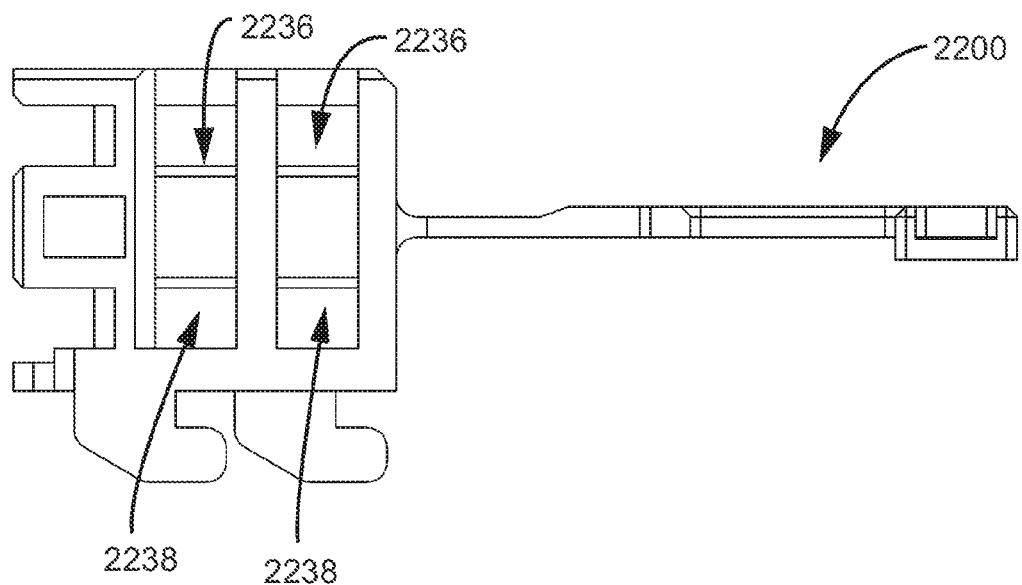
FIG. 106 is a side view of the cable fixation unit of FIG. 102.
Figure 107:
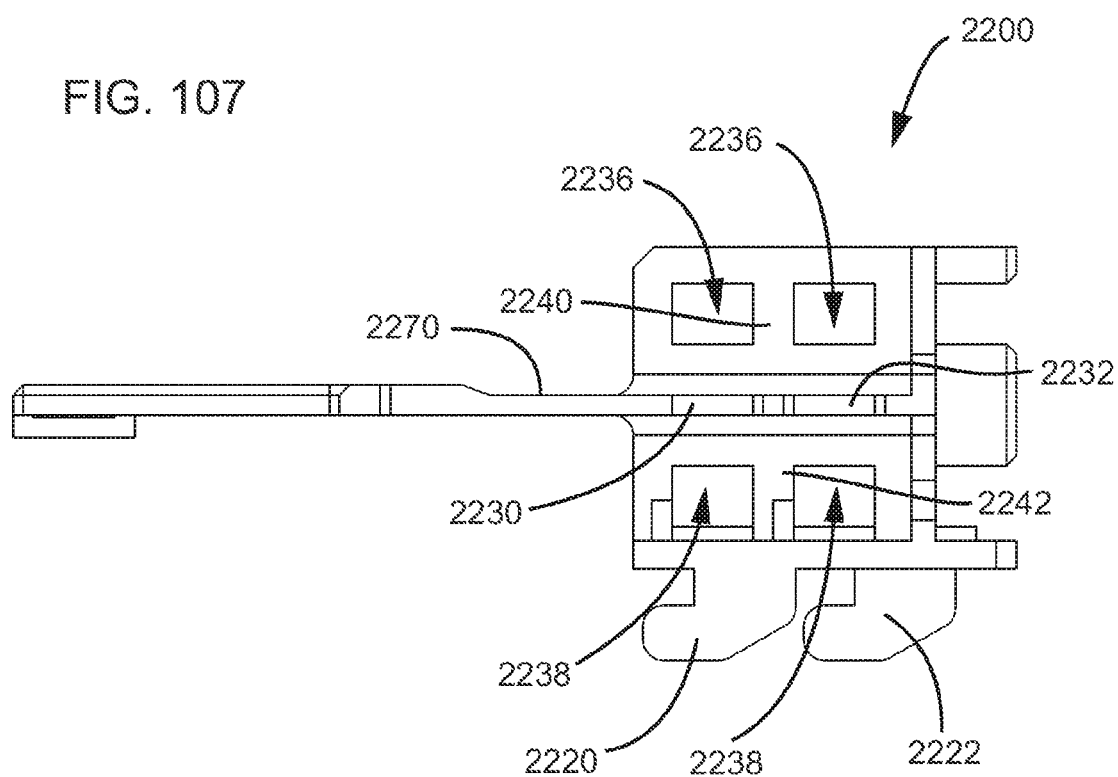
FIG. 107 is a further side view of the cable fixation nit of FIG. 102.
Figure 108:
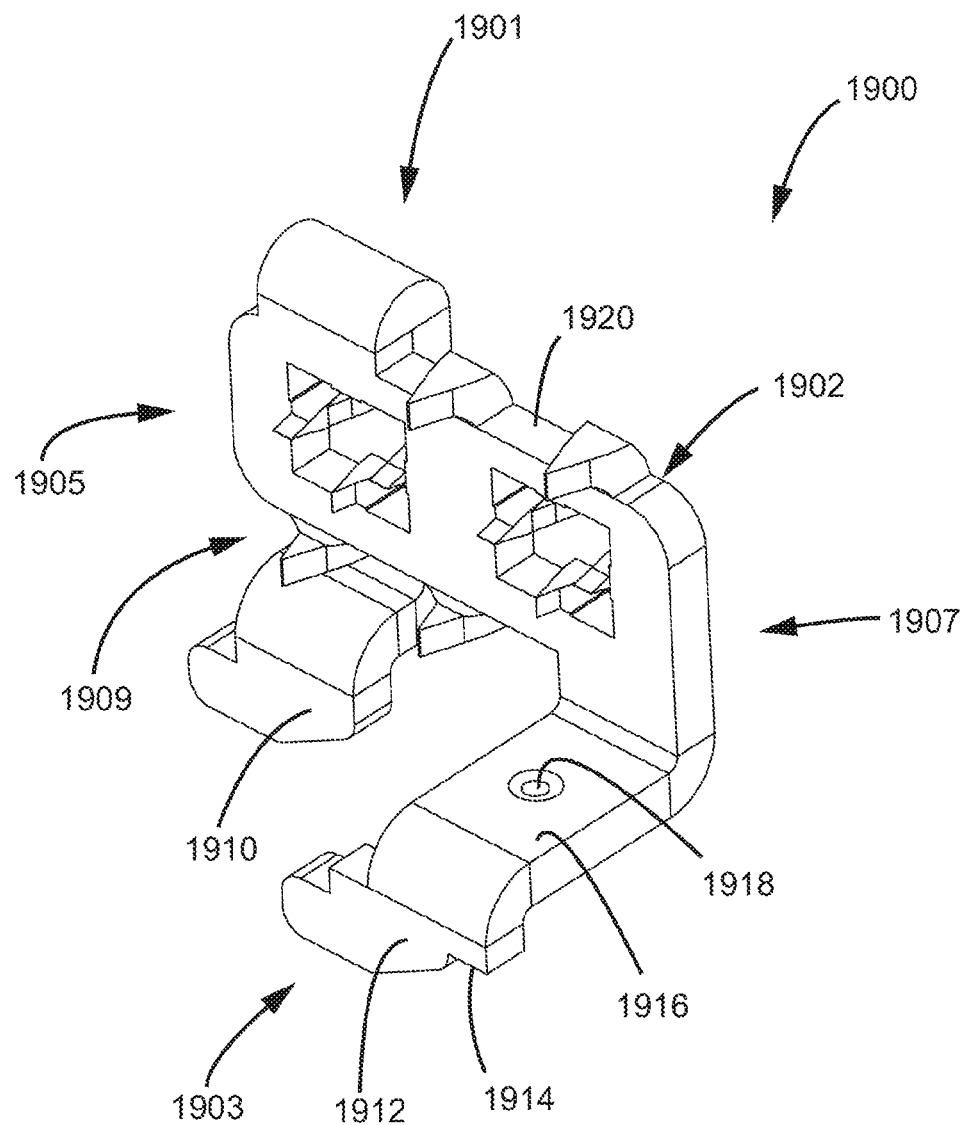
FIG. 108 is a perspective view of a further example cable fixation unit in accordance with the present disclosure.
Figure 109:
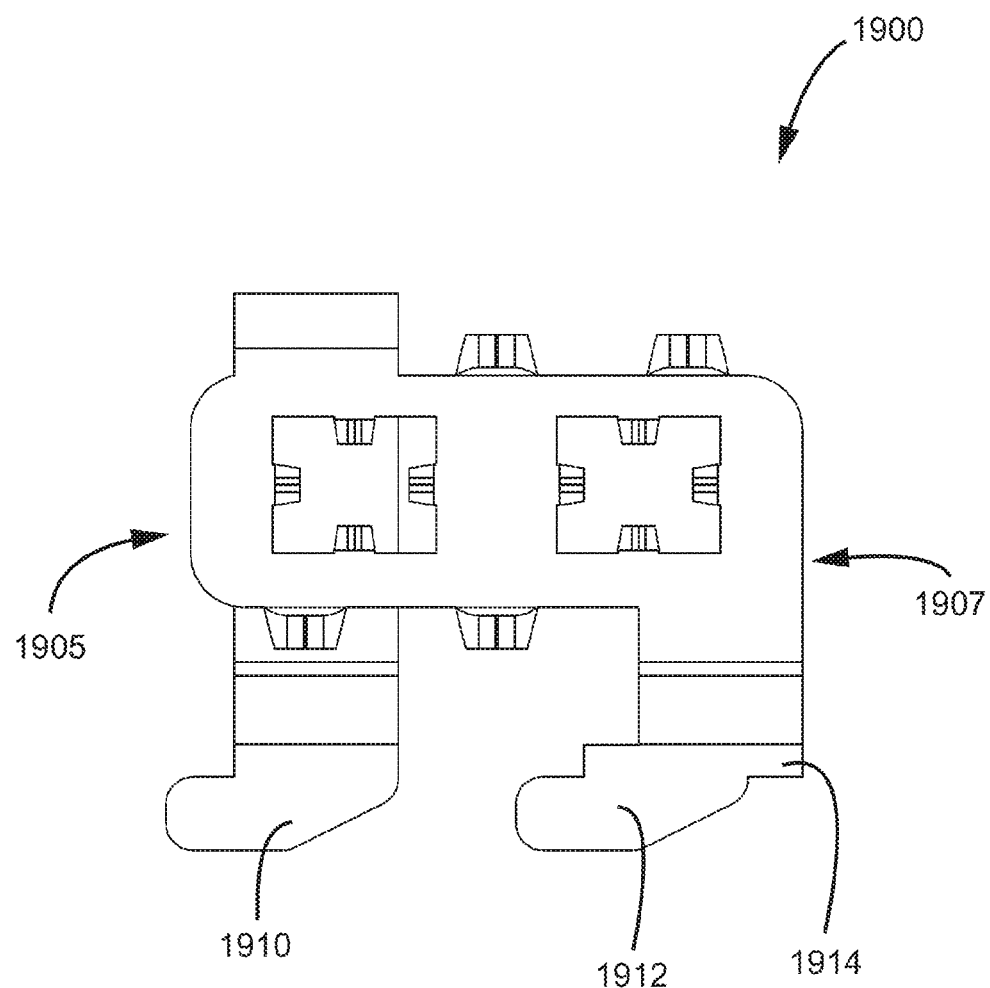
FIG. 109 is a side view of the cable fixation unit of FIG. 108.
Figure 110:
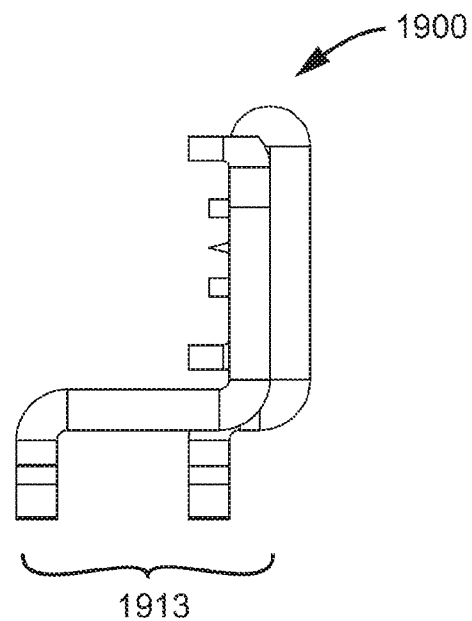
FIG. 110 is a distal end view of the cable fixation unit of FIG. 108.
Figure 111:
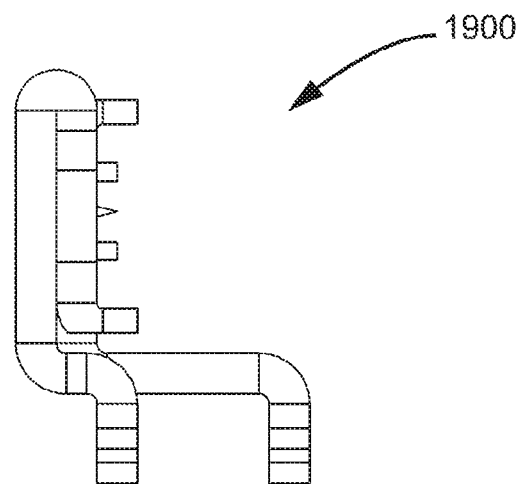
FIG. 111 is a proximal end view of the cable fixation unit of FIG. 108.

Referring now to FIG. 101, a further example embodiment of base plate 1700 is schematically shown. The base plate 1700 is made from a molded polymer. The base plate 1700 is defined by a longitudinal axis 1702 and a transverse axis 1704. The base plate 1700 includes slots 1706 and resilient members 1708 for locking cable fixation assemblies to the slots. The resilient members 1708 extend from fixed ends 1710 to free ends 1712 generally perpendicular to the longitudinal axis 1702 and parallel to the transverse axis 1704. The resilient members 1708 are configured to cooperate with heel portions of plate engageable members of mounting portions of cable fixation assemblies as described above. Due to the transverse elongation of the resilient members 1708, the locking slots have a modified shape as shown in FIG. 101.

Referring now to FIGS. 95-100, a further example base plate assembly 1800 is shown. The base plate assembly 1800 includes an upper base plate member 1802 and a lower base plate member 1804 that couples to the upper base plate member 1802. The base plate assembly 1800 extends between a proximal end 1806 and a distal end 1808 along a longitudinal axis 1810, between a side 1812 and an opposite side 1814 along a transverse axis 1816, and between a top 1818 and a bottom 1820 along a vertical axis 1822.

The upper base plate member 1802 includes a plurality of slots 1824 extending through the top surface 1826 and bottom surface 1828 of the upper base plate member 1802 and adapted to receive plate engageable members of mounting portions of cable fixation assemblies as described above. Adjacent rows of the slots 1824 in both the transverse and longitudinal orientations are staggered to, e.g., accommodate offset legs and feet of plate engageable members, maximize useful space when using multiple of the plate assemblies 1800 side by side along the transverse axis, and/or to minimize the number of slots to maximize the structural integrity of the base plate assembly 1800. The distal-most transverse row 1827 of slots 1824 are locking slots configured to cooperate with heel portions of plate engageable members of mounting portions of cable fixation assemblies as described above. In particular, the lower base plate member 1804 includes a body 1829 with a plurality of resilient members 1830 extending generally longitudinally from the body to free ends 1832 of the resilient members 1830 configured to be positioned above or within locking slots of the upper base plate member 1802. The resilient members 1830 includes elbows 1834 which can help to maintain the resilience of the resilient members 1830 over repeated flexions. Tabs 1836 positioned at the free ends 1832 can provide easily accessible engagement surfaces for the heel portions of plate engageable members of mounting portions of cable fixation assemblies to flex the resilient members 1830 as described above, when installing cable fixation assemblies on the base plate assembly 1800. In the flexed configuration (e.g., when the feet of a cable fixation assembly may be advanced proximally under the upper base plate member 1802), at least a portion of the tab 1836 of the corresponding flexed resilient member 1830 is positioned within the corresponding locking slot.

Referring now to FIGS. 108-111, the cable fixation unit 1900 is similar to other cable fixation units described herein, such as the body 1506 of the cable fixation assembly 1504 (FIG. 75) and the body 230 of the assembly 200 (FIG. 18). The following description of the cable fixation unit 1900 will generally focus on differences between the cable fixation unit 1900 and the bodies of the assemblies 1504 and 200.

The cable fixation unit 1900 includes a body 1902 and is generally configured for supporting a single cable, typically, though not necessarily, one having a rigid rod strength member. For ease of description, the fixation unit 1900 has a top 1901 and a bottom 1903 and extends longitudinally from a proximal end 1905 to a distal end 1907.

The unit 1900 is shorter longitudinally than, e.g., the bodies 1506 and 230. The shorter longitudinal length of the body 1902 can reduce manufacturing cost for the cable fixation unit and maximize fiber management space (by minimizing cable fixation space) within a telecommunications closure.

The body 1902 defines a cable jacket clamping area or portion 1909. Extending from the body is a mounting portion 1913 for mounting the unit 1900 to a base plate assembly.

Due to the unit's reduced size, only two (rather than three) transversely offset slot engageable members 1910, 1912 (including legs, feet, and a heel portion) of the mounting portion 1913 are provided to engage and lock with slots of a base plate assembly in any suitable manner as described herein. The distal slot engageable member 1912 includes a heel portion 1914 configured to engage and flex a resilient member within a slot of a base plate to allow for locking of the unit 1900 to, e.g., the base plate assembly 1800 (FIG. 95) in the manner described above.

To allow the unit 1900 to be of reduced size, the slot engageable member 1912 extends directly from, and is integral with, the strength member securing platform 1916 of the cable fixation unit 1900. The platform 1916 can include a through hole 1918 for receiving a fastener for fastening the strength member (e.g., a strength rod) of a cable secured to the unit 1900 as described above with respect to, e.g., the assembly 200. Due to the integrality of the slot engageable member 1912 and the platform 1916, the platform 1916 at least partially defines the lateral offset between the two slot engageable members 1910 and 1912.

A hose clamp or other cable clamping device can be mounted over the outer cable jacket and the body 1902, e.g., at the longitudinal position 1920.

Optionally, the unit 1900 is made from an electrically conductive material, such as steel, to provide stability to the cable fixation and/or to provide an electrical grounding path via the body 1902 of the unit 1900.

Figure 112:
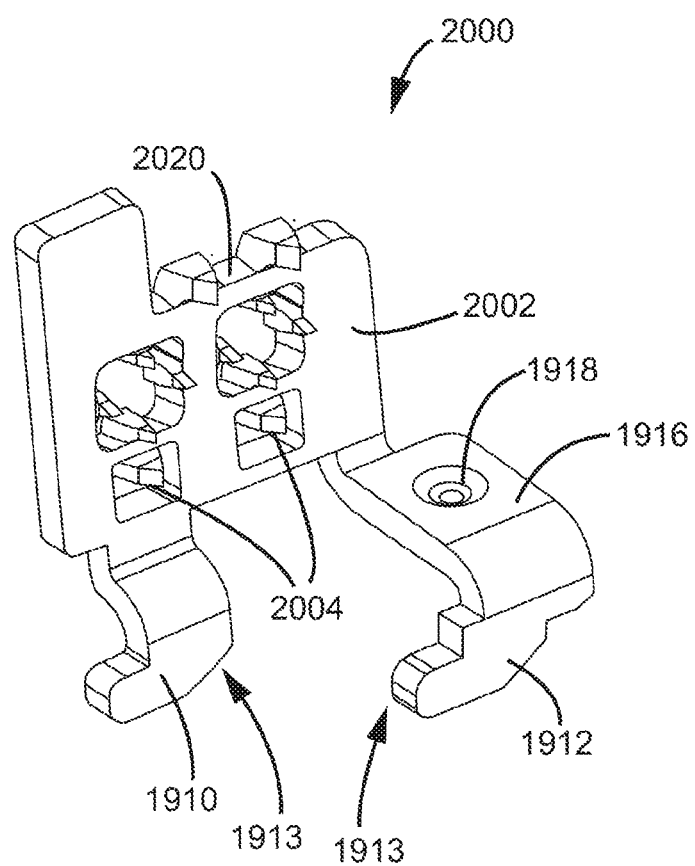
FIG. 112 is a perspective view of a further example cable fixation unit in accordance with the present disclosure.

Referring now to FIG. 112, the cable fixation unit 2000 is similar to the cable fixation unit 1900 of FIGS. 108-111, and the following description focuses on differences therebetween. The unit 2000 includes a body 2002 that is elongated along the vertical axis to provide space for through passages 2004. The passages 2004 can receive tie wraps as an alternative and/or redundant anchoring device (in additional to a hose clamp positioned about the cable at the position 2020 of the body 2002) for anchoring a cable to the unit 2000.

Figure 113:
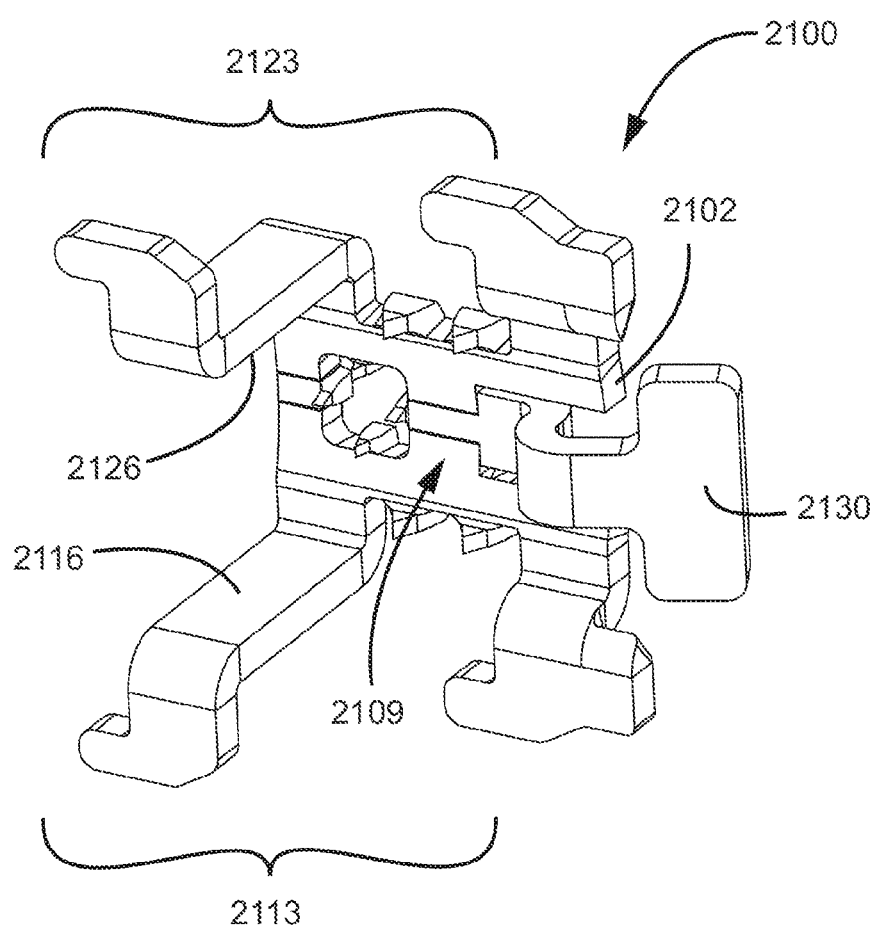
FIG. 113 is a perspective view of a further example cable fixation unit in accordance with the present disclosure.
Figure 114:
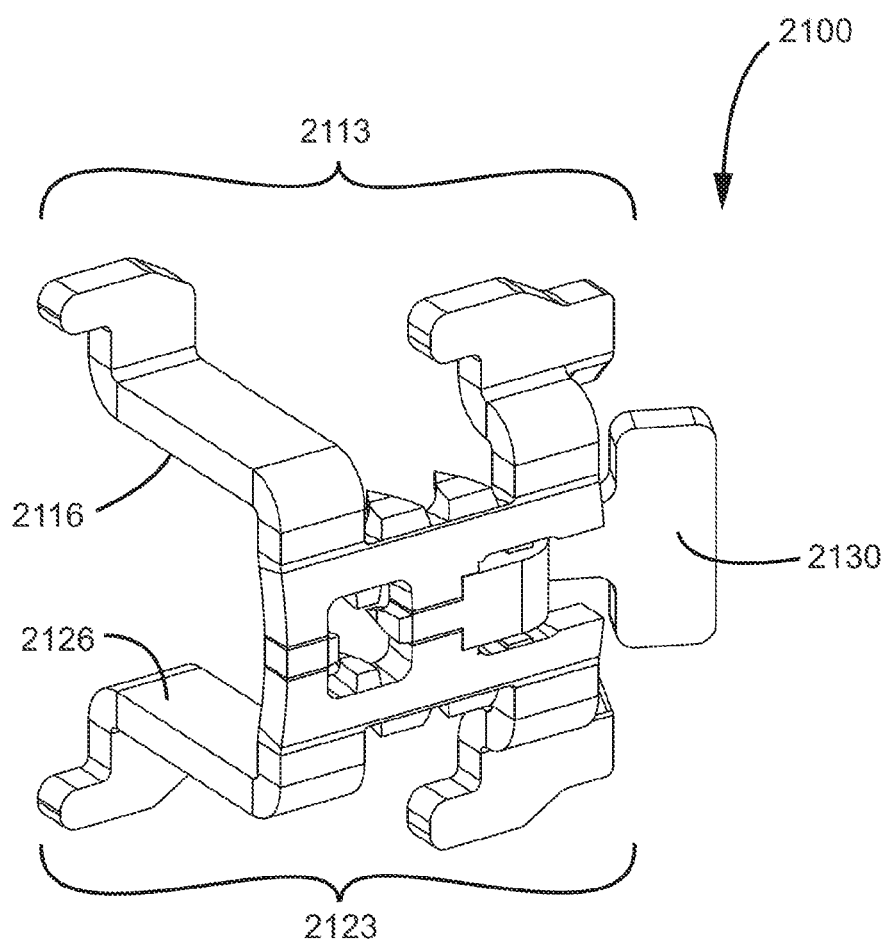
FIG. 114 is a further perspective view of the cable fixation unit of FIG. 113.
Figure 115:
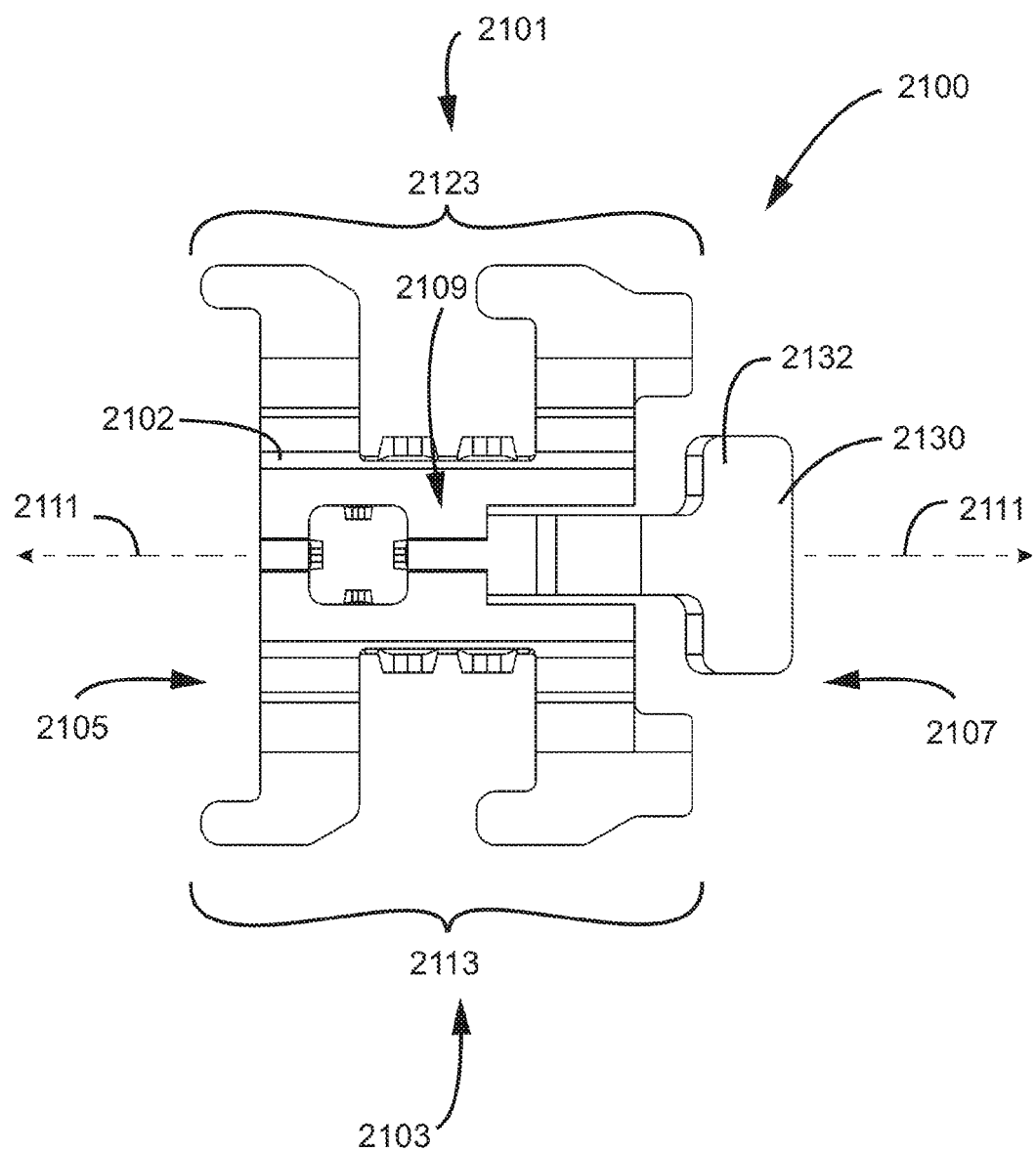
FIG. 115 is a side view of the cable fixation unit of FIG. 113.

Referring now to FIGS. 113-115, the cable fixation unit 2100 includes a body 2102 and is generally configured for supporting a single cable, typically, though not necessarily, one having a rigid rod strength member. For ease of description, the fixation unit 2100 has a top 2101 and a bottom 2103 and extends longitudinally from a proximal end 2105 to a distal end 2107. However the cable fixation unit 2100 is symmetrical about the horizontal line 2111, such that it can be mounted to a slotted base plate either bottom down or bottom up. This versatility can allow for greater flexibility in positioning and number of cable fixation assemblies that can be mounted within a closure, which can depend on the size of the cables, the positioning of the ports relative to each other, and so forth.

The unit 2100 is shorter longitudinally than, e.g., the bodies 1506 and 230. The shorter longitudinal length of the body 2102 can reduce manufacturing cost for the cable fixation unit and further maximize fiber management space (by minimizing cable fixation space) within a telecommunications closure.

The body 2102 defines a cable jacket clamping area or portion 2109 and a strength member anchor 2130 vertically centralized to be accessed for strength member fixation regardless of the mounting orientation of the unit 2100 (bottom down or bottom up). The anchor 2130 includes a T-shaped tab 2132 about which, for example, strength member yarn of a cable can be wrapped and/or tied.

Extending from the body is a first mounting portion 2113 for mounting the unit 2100 to a base plate assembly bottom down, and a second mounting portion 2123 for mounting the unit 2100 to a base plate assembly bottom up. The features (legs, feet, and heel portions) of the mounting portions 2113 and 2123 are identical to each other and consistent with the structural configuration of other mounting portions described herein. The platforms 2116, 2126 at least partially define the lateral offset between the two slot engageable members of the first and second mounting portions 2113 and 2123.

A hose clamp or other cable clamping device can be mounted over the outer cable jacket and the body 2102, e.g., at the cable jacket clamping area 2109.

EXAMPLE EMBODIMENTS

According to a $1^{st}$ example embodiment, there is provided a cable fixation assembly for fixing a portion of a telecommunications cable to a telecommunications closure, comprising: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

According to a $2^{nd}$ example embodiment, there is provided a cable fixation assembly for fixing a portion of a telecommunications cable to a telecommunications closure, comprising: a base plate configured to be secured to a housing of the closure, the base plate including first and second opposite surfaces, and a plurality of slots open at the first surface and open at the second surface, the slots extending through the base plate and between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

According to a $3^{rd}$ example embodiment, there is provided the $1^{st}$ or $2^{nd}$ example embodiment, wherein when the fixation unit and the base plate are in the mounted configuration, the slot-insertable portion abuts the distal end of the corresponding slot.

According to a $4^{th}$ example embodiment, there is provided the $2^{nd}$ example embodiment, wherein the plurality of slots are arranged in a grid including a plurality of rows of and a plurality of columns of the slots, each of the columns extending in a proximal to distal direction and defining a selectable fixation position for the fixation unit.

According to a $5^{th}$ example embodiment, there is provided any of the $1^{st}$ through $4^{th}$ example embodiments, wherein the mounting portion includes at least a third plate engageable member, and wherein the feet of at least two of the plate engageable members extend from their corresponding legs along reference lines that are not collinear.

According to a $6^{th}$ example embodiment, there is provided any of the $1^{st}$ through $5^{th}$ example embodiments, wherein the locking member is attached to the body.

According to a $7^{th}$ example embodiment, there is provided any of the $1^{st}$ through $6^{th}$ example embodiments, wherein the locking member is detached from the body, and wherein the locking member is adapted to slidably cooperate with the body.

According to an $8^{th}$ example embodiment, there is provided the $6^{th}$ example embodiment, wherein when the slot-insertable portion of the locking member is positioned in the corresponding slot, a notch-insertable portion of the locking member is positioned within a notch defined by the body.

According to a $9^{th}$ example embodiment, there is provided any of the $1^{st}$ through $8^{th}$ example embodiments, wherein the slot into which the slot-insertable portion of the locking member is configured to be urged is the same as one of the slots in which the plate engageable members are partially positioned.

According to a $10^{th}$ example embodiment, there is provided the $9^{th}$ example embodiment, wherein when the fixation unit and the base plate are in the mounted configuration a proximal end of the slot-insertable portion abuts one of the plate engageable members.

According to an 11th example embodiment, there is provided any of the 1st through 8th example embodiments, wherein the slot into which the slot-insertable portion of the locking member is configured to be urged is not the same as any of the slots in which the plate engageable members are partially positioned.

According to a 12th example embodiment, there is provided the 9th example embodiment, wherein the slot-insertable portion and the plate engageable member fill a proximal to distal length of the slot in which they are both positioned.

According to a 13th example embodiment, there is provided any of the 1st through 12th example embodiments, wherein the slot-insertable portion is a projection projecting from a free end of a cantilever member, the cantilever member being attached at a fixed end to the body.

According to a 14th example embodiment, there is provided any of the 1st through 12th example embodiments, wherein the locking member includes a flexibly resilient tail configured to press against the body and urge the slot-insertable portion into the corresponding slot.

According to a 15th example embodiment, there is provided any of the 1st through 14th example embodiments, wherein the jacket clamping portion includes one or more ties.

According to a 16th example embodiment, there is provided any of the 1st through 14th example embodiments, wherein the jacket clamping portion includes one or more hose clamps.

According to a 17th example embodiment, there is provided any of the 1st through 14th example embodiments, wherein the jacket clamping portion includes a strap adapted to form a loop portion around the jacket and two tail portions extending coextensively from the loop portion.

According to an 18th example embodiment, there is provided the 17th example embodiment, wherein the jacket clamping portion includes a slot configured to receive the tail portions, and wherein the assembly further comprises a tightening fastener configured to engage and tighten the strap about the jacket.

According to a 19th example embodiment, there is provided any of the 1st through 18th example embodiments, wherein the body of the cable fixation unit further comprises a cable strength member clamping portion.

According to a 20th example embodiment, there is provided the 19th example embodiment, wherein the cable strength member clamping portion is configured to clamp a plurality of rigid strength members of the telecommunications cable.

According to a 21st example embodiment, there is provided the 19th example embodiment, wherein the cable strength member clamping portion is configured to clamp a single rigid strength member.

According to a 22nd example embodiment, there is provided the 19th example embodiment, wherein the cable strength member clamping portion is configured to clamp strands of yarn.

According to a 23rd example embodiment, there is provided any of the 19th through 21st example embodiments, wherein the rigid strength members are electrically conductive rods, and wherein the strength member clamping portion is electrically connected to ground and thereby configured to ground the rods.

According to a 24th example embodiment, there is provided the any of the 1st through 23rd example embodiments, wherein the fixation unit is configured to ground the telecommunications cable.

According to a 25th example embodiment, there is provided the 24th example embodiment, wherein at least a portion of the body is made from a rigid, electrically conductive material.

According to a 26th example embodiment, there is provided the 25th example embodiment, wherein the material is metal.

According to a 27th example embodiment, there is provided any of the 1st through 26th example embodiments, wherein the locking member is made entirely from one or more non-electrically conductive materials According to a 28th example embodiment, there is provided any of the 1st through 27th example embodiments, wherein the slot-insertable portion of the locking member is resiliently flexible.

According to a 29th example embodiment, there is provided any of the 1st through 28th example embodiments, wherein the body of the fixation unit includes one or more teeth configured to dig into an exposed portion of a conductive shield of the telecommunications cable.

According to a 30th example embodiment, there is a provided a cable fixation assembly for fixing a portion of a telecommunications cable to a telecommunications closure, comprising: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including a mounting portion, the mounting portion being configured to mount the body to the base plate and including at least two plate engageable members, each of the plate engageable members including a leg and a foot extending from the leg; and a locking member detached from the body and configured to slidably cooperate with the body, the locking member including a slot-insertable portion, and a flexibly resilient tail; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient tail presses against the body and urges the slot-insertable portion into a corresponding slot of the base plate.

According to a 31st example embodiment, there is provided the 30th example embodiment, wherein the fixation unit is further configured to cooperate with the base plate in an unlocked configuration in which the base plate engages the slot-insertable portion and urges the flexibly resilient tail to flex.

According to a 32nd example embodiment, there is provided the 30th or 31st example embodiment, wherein the body includes a notch and the locking member includes a notch insertable portion, wherein in the locked configuration the notch insertable portion is seated in the notch, and wherein in the unlocked configuration the flexing of the resilient tail causes the notch insertable portion to unseat from the notch.

According to a 33rd example embodiment, there is provided any of the 30th through 32nd example embodiments, wherein the locking member includes a pair of arms defining a guide passage in which a portion of the body is insertable, the arms being resiliently flexible from a relaxed configuration to a flexed configuration in which the passage is widened for inserting the portion of the body therein, the locking member further including shoulders projecting from the arms, the shoulders adapted to engage the body when the fixation unit and the base plate are in the locked configuration and the arms are in the relaxed configuration.

According to a 34th example embodiment, there is provided a cable fixation assembly for fixing a portion of a telecommunications cable to a telecommunications closure, comprising: a fixation unit configured to be mounted to a base plate having first and second opposite surfaces and a plurality of slots open at the first surface and open at the second surface, the slots extending through the base plate and between proximal and distal ends of the slots defined by the base plate, the fixation unit comprising: a body, the body including a mounting portion, the mounting portion being configured to mount the body to the base plate and including at least two plate engageable members, each of the plate engageable members including a leg and a foot extending from the leg; and a locking member including a flexibly resilient cantilever member attached at a fixed end thereof to the body, the flexibly resilient cantilever member further including a free end having a projection; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient cantilever member is positioned such that the projection is inserted into a corresponding slot of the base plate.

According to a 35th example embodiment, there is provided the 34th example embodiment, wherein the fixation unit is configured to cooperate with the base plate in an unlocked configuration in which the flexibly resilient cantilever member is flexed away from the base plate such that that projection is not positioned within the corresponding slot of the base plate.

According to a 36th example embodiment, there is provided any of the 1st through 35th example embodiments, wherein the mounting portion includes at least three of the plate engageable members, at least one of the feet of the plate engageable members not being aligned in a proximal to distal direction with another of the feet.

According to a 37th example embodiment, there is provided a telecommunications closure for managing one or more telecommunications cables, comprising: first and second housing pieces that are mateable and de-mateable to provide a re-enterable closure volume, the housing pieces defining a plurality of cable ports through which the one or more telecommunications cables enter the closure volume; a base plate secured to one of the housing pieces in a position such that the base plate is positioned within the closure volume when the houses pieces are mated, the base plate including first and second opposite surfaces, and a plurality of slots open at the first surface and open at the second surface, the slots extending through the base plate and between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

According to a 38th example embodiment, there is provided a method of fixing a telecommunications cable to a telecommunications closure comprising: providing a base plate secured to a housing of the closure, the base plate including first and second opposite surfaces, and a plurality of slots open at the first surface and open at the second surface, the slots extending through the base plate and between proximal and distal ends of the slots defined by the base plate; providing a cable fixation unit including a body, the body including a mounting portion having at least two plate engageable members, each of the plate engageable members including a leg and a foot extending from the leg, the cable fixation unit further including a locking member detached from the body and including a slot-insertable portion and a flexibly resilient tail; inserting the plate engageable members in a first mounting direction through two of the slots such that the flexibly resilient tail flexes against the body; subsequent to the inserting, sliding the fixation unit proximally in a second mounting direction perpendicular to the first mounting direction such that the foot of each of the plate engageable members proximally extends beyond proximal ends of the corresponding slots and such that the flexibly resilient tail urges the slot-insertable portion into one of the slots; and clamping the telecommunications cable to the cable fixation unit.

According to a 39th example embodiment, there is provided the 38th example embodiment, further comprising unlocking the cable fixation unit from the base plate by, after at least the sliding: pulling the locking member such that the slot-insertable portion exits the corresponding slot and such that the flexibly resilient tail flexes against the body; sliding the fixation unit distally such that the feet clear the proximal ends of the corresponding slots; and removing the plate engageable members from the corresponding slots.

According to a 40th example embodiment, there is provided a method of fixing a telecommunications cable to a telecommunications closure comprising: providing a base plate secured to a housing of the closure, the base plate including first and second opposite surfaces, and a plurality of slots open at the first surface and open at the second surface, the slots extending through the base plate and between proximal and distal ends of the slots defined by the base plate; providing a cable fixation unit including a body, the body including a mounting portion having at least two plate engageable members, each of the plate engageable members including a leg and a foot extending from the leg, the cable fixation unit further including a cantilever member having fixed end fixed to the body and a free end opposite the fixed end, the free end including a projection; inserting the plate engageable members in a first mounting direction through two of the slots such that the cantilever member is urged in a direction away from the base plate; subsequent to the inserting, sliding the fixation unit proximally in a second mounting direction perpendicular to the first mounting direction such that the foot of each of the plate engageable members proximally extends beyond proximal ends of the corresponding slots and such that the cantilever member resiliently unflexes causing the projection to enter one of the slots; and clamping the telecommunications cable to the cable fixation unit.

According to a 41$^{st}$ example embodiment, there is provided the 40$^{th}$ example embodiment, further comprising unlocking the cable fixation unit from the base plate by, after at least the sliding: flexing the cantilever arm such that the projection exits the corresponding slot; while performing the flexing, sliding the fixation unit distally such that the feet clear the proximal ends of the corresponding slots; and while performing the flexing, removing the plate engageable members from the corresponding slots.

According to a 42$^{nd}$ example embodiment, there is provided a cable fixation assembly for fixing a portion of a telecommunications cable, comprising: a base plate including a plurality of slots extending along an elongate dimension of the slots between proximal and distal ends of the slots defined by the base plate; and a fixation unit, comprising: a body, the body including: a jacket clamping portion, the jacket clamping portion being adapted to clamp a jacket of the telecommunications cable; and a mounting portion, the mounting portion being configured to mount the body to the base plate and including at least two plate engageable members, each of the plate engageable members including a leg and a foot extending from the leg; and a locking member; wherein the fixation unit is configured to cooperate with the base plate in a mounted configuration such that each of the plate engageable members is partially positioned within one of the slots and the foot of each of the plate engageable members proximally extends beyond the proximal end of the corresponding slot; and wherein the locking member is configured such that a slot-insertable portion of the locking member is urged into one of the slots when the fixation unit and the base plate are in the mounted configuration and a distance between a distal end of the slot-insertable portion and a distal end of its corresponding slot is smaller than a distance required for one of the feet to move distally to clear the corresponding proximal end of its corresponding slot.

According to a 43$^{rd}$ example embodiment, there is a provided a cable fixation assembly for fixing a portion of a telecommunications cable, comprising: a base plate including a plurality of slots extending along an elongate dimension of the slots between proximal and distal ends of the slots defined by the base plate; and a fixation unit comprising: a body, the body including a mounting portion, the mounting portion being configured to mount the body to the base plate and including at least two plate engageable members, each of the plate engageable members including a leg and a foot extending from the leg; and a locking member including a flexibly resilient cantilever member attached at a fixed end thereof to the body, the flexibly resilient cantilever member further including a free end having a projection; wherein the fixation unit is configured to cooperate with the base plate in a locked configuration in which: i) each of the plate engageable members is partially positioned within one of the slots and the foot of each of the plate engageable members proximally extends beyond the proximal end of the corresponding slot; and ii) the flexibly resilient cantilever member is positioned such that the projection is inserted into a corresponding slot of the base plate.

According to a 44$^{th}$ example embodiment, there is provided a cable fixation assembly, comprising: a base plate defining a first plurality of slots; an adapter including a first body, a plurality of first slot engageable members extending from the first body, the first body defining a second plurality of slots; and a cable fixation unit including a second body and a second plurality of slot engageable members extending from the second body, wherein the base plate, the adapter, and the cable fixation unit are configured to cooperate such that the first slot engageable members of the adapter are lockingly received in the first slots, and such that the second slot engageable members of the cable fixation unit are lockingly received in the second slots.

According to a 45$^{th}$ example embodiment, there is provided the 44$^{th}$ example embodiment, wherein the cable fixation unit includes a cable jacket clamping portion.

According to a 46$^{th}$ example embodiment, there is provided the 44$^{th}$ or 45$^{th}$ example embodiment, wherein the cable fixation unit includes a strength member anchor.

According to a 47$^{th}$ example embodiment, there is provided any of the 43$^{rd}$ through 46$^{th}$ example embodiments, wherein the cable fixation unit includes a seal member support, and wherein the body of the cable fixation unit defines a first cable jacket fixation portion on a first side of the seal member support for fixing a first cable, and a second cable jacket fixation portion on an opposite second side of the seal member support for fixing a second cable.

According to a 48$^{th}$ example embodiment, there is provided the 47$^{th}$ example embodiment, further comprising a seal member supported by the seal member support.

According to a 49$^{th}$ example embodiment, there is provided the 47$^{th}$ or 48$^{th}$ example embodiment, wherein the seal member support defines a fully enclosed opening and/or includes one or more teeth.

According to a 50$^{th}$ example embodiment, there is provided a method of fixing a cable comprising: a) providing: a base plate defining a first plurality of slots; an adapter including a first body, a plurality of first slot engageable members extending from the first body, the first body defining a second plurality of slots; and a cable fixation unit including a second body and a second plurality of slot engageable members extending from the second body; b) inserting the first slot engageable members in the first slots; c) sliding the first slot engageable members relative to the first slots such that the adapter locks to the base plate; d) inserting the second slot engageable members in the second slots; and e) sliding the second slot engageable members relative to the second slots such that the cable fixation unit locks to the adapter.

According to a 51$^{st}$ example embodiment, there is provided the 50$^{th}$ example embodiment, wherein the steps b) and c) are performed before the steps d) and e).

According to a 52$^{nd}$ example embodiment, there is provided the 50$^{th}$ example embodiment, wherein the steps d) and e) are performed before the steps b) and c).

According to a 53$^{rd}$ example embodiment, there is provided any of the 50$^{th}$ through 52$^{nd}$ example embodiments, further comprising: f) disengaging a locking member of the adapter from one of the first slots; and g) removing the adapter from the base plate.

According to a 54$^{th}$ example embodiment, there is provided any of the 50$^{th}$ through 52$^{nd}$ example embodiments, further comprising: f) disengaging a locking member of the cable fixation unit from one of the second slots; and g) removing the cable fixation unit from the adapter.

According to a 55$^{th}$ example embodiment, there is provided the 44$^{th}$ example embodiment, wherein the adapter includes a flexibly resilient lock release arm extending from the first body and operatively connected to a slot engageable locking member.

According to a 56$^{th}$ example embodiment, there is provided the 14$^{th}$ example embodiment, wherein the locking member includes a sidewall that is configured to completely surround a portion of the body of the cable fixation unit, the sidewall including a pair of complementary catches that resiliently engage each other to mount the locking member to the body of the cable fixation unit.

According to a 57$^{th}$ example embodiment, there is provided the 14$^{th}$ or the 56$^{th}$ example embodiment, comprising a pair of the slot-engagable portion, the slot-engagable portions being spaced apart from each other and positioned to be inserted in different slots of the base plate.

According to a 58$^{th}$ example embodiment, there is provided a cable fixation unit adapted to be mounted to a slotted base plate assembly, comprising: a body including a cable support platform, a first pair of openings positioned above the cable support platform and a second pair of openings positioned below the cable support platform; a mounting portion extending from the body, the mounting portion being configured to mount to the base plate assembly, wherein the body defines a first cable jacket clamping portion above the cable support platform and for clamping a first cable jacket of a first cable, and a second cable jacket clamping portion below the cable support platform for clamping a second cable jacket of a second cable; and wherein the pairs of openings are aligned one atop the other relative to a longitudinal axis of the cable fixation assembly such that the first and second cable jackets can be secured to the body by a single pair of tie wraps fed through both of the pairs of openings.

According to a 59$^{th}$ example embodiment, there is provided 58$^{th}$ example embodiment, wherein the cable support platform includes at least one notch configured to receive portions of the tie wraps fed though the pairs of openings.

According to a 60$^{th}$ example embodiment, there is provided a method, comprising: feeding a pair of tie wraps around outer jackets of two cables positioned above and below, respectively, the cable support platform of the cable fixation unit and through the pairs of the openings of the cable fixation unit; and securing the two cables to the body with the tie wraps.

According to a 61$^{st}$ example embodiment, there is provided a cable fixation unit adapted to be mounted to a slotted base plate assembly, comprising: a body defining a jacket clamping portion, a mounting portion, and a strength member anchoring platform, the mounting portion being configured to mount the body to the base plate assembly and including no more than two plate engageable members transversely offset from each other relative to a longitudinal axis of the cable fixation unit, each of the plate engageable members including a leg and a foot extending from the leg, wherein one of the two plate engageable members is integral with and extends directly from the strength member anchoring platform.

According to a 62$^{nd}$ example embodiment, there is provided the 61$^{st}$ example embodiment, wherein the jacket clamping portion defines a hose clamp anchoring position and includes a pair of through holes for receiving tie wraps to clamp a cable jacket to the body.

According to a 63$^{rd}$ example embodiment, there is provided the 61$^{st}$ or the 62$^{nd}$ example embodiment, wherein the body comprises an electrically conductive material.

According to a 64$^{th}$ example embodiment, there is a provided a method, comprising: using a single tie wrap to clamp outer jackets of two cables to a body of a cable fixation unit.

According to a 65$^{th}$ example embodiment, there is provided a cable fixation assembly according to any of the preceding example embodiments that includes a mounting portion of a cable fixation unit, wherein the mounting portion is a first mounting portion; wherein the body includes a second mounting portion vertically opposite the first mounting portion; and wherein the first and second mounting portions are configured such that the body can be mounted to a slotted base plate assembly in both a bottom down position and a bottom up position, the bottom up position being inverted about a horizontal plane relative to the bottom down position.

According to a 66$^{th}$ example embodiment, there is provided the 65$^{th}$ example embodiment, wherein the first and second mounting portions are of identical construction.

According to a 67$^{th}$ example embodiment, there is provided a method, comprising: a) mounting a cable fixation unit according to any of the 61$^{st}$ through 66$^{th}$ example embodiments to a slotted base plate using one of the first and second mounting portions; b) clamping a cable to the body; c) subsequent to b) and a), unclamping and removing the cable from the body; d) subsequent to c), inverting the body and mounting the body to the slotted base plate using the other of the first and second mounting portions; and, optionally; e) subsequent to d), clamping a cable to the body.

According to a 68$^{th}$ example embodiment, there is provided a method of fixing a telecommunications cable, comprising: providing a cable fixation assembly, the cable fixation assembly including: a body defining a jacket clamping portion and a mounting portion, the mounting portion including at least two plate engageable members, each of the plate engageable members including a leg and a foot extending from the leg, and one of the plate engageable members including a heel portion; providing a base plate assembly, the base plate assembly including: a first base plate extending along a longitudinal axis between a proximal end and a distal end of the first base plate and extending along a transverse axis perpendicular to the longitudinal axis between first and second opposite sides, and extending vertically between a top and bottom parallel to a vertical axis that is perpendicular to the longitudinal and transverse axes, the first base plate including an upper surface and a lower surface and defining a plurality of slots, each of the slots being defined by a longitudinal dimension parallel to the longitudinal axis, a transverse dimension parallel to the transverse axis, and a vertical dimension parallel to the vertical axis, the plurality of slots defining a plurality of side by side mounting positions for mounting cable fixation assemblies arranged side by side along the transverse axis, a slot of each of the mounting positions being a locking slot, the base plate assembly further including a resilient member positioned at least partially within each of the locking slots, each of the resilient members extending between a fixed end and an opposite free end, each of the resilient members having a relaxed configuration and a flexed configuration; pressing downward on a first of the resilient members with the heel portion to move the first resilient member from the relaxed configuration to the flexed configuration, such that the free end of the first resilient member remains above a bottom of a corresponding foot, and such that the corresponding foot is below the bottom surface of the first base plate; and sliding, subsequent to the pressing downward, the cable fixation assembly proximally such that the feet extend proximally beyond proximal ends of the corresponding slots, and such that the first resilient member returns to the relaxed configuration and limits distal movement of the corresponding plate engageable member relative to the first plate.

According to a 69$^{th}$ example embodiment, there is provided the 68$^{th}$ example embodiment, further comprising transversely shifting the cable fixation assemblies within some of the slots to align the cable fixation assembly with a cable port of a telecommunications closure.

According to a 70$^{th}$ example embodiment, there is provided the 68$^{th}$ or 69$^{th}$ example embodiment, further comprising coupling the first base plate to a second base plate, the second base plate including the resilient members.

From the foregoing detailed description, it will be evident that modifications and variations can be made in the devices of the disclosure without departing from the spirit or scope of the invention.

What is claimed is:

1. A cable fixation unit adapted to be mounted to a slotted baseplate, comprising:
    a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis,
    wherein, for each of the plate engageable members, the foot extends from the leg in the same direction relative to the longitudinal axis; and
    wherein the cable fixation unit is adapted to be mounted to the slotted baseplate by inserting the first plate engageable member and the second plate engageable member into slots of the slotted baseplate and then sliding the cable fixation unit along the longitudinal axis relative to the slotted baseplate while the first plate engagement member and the second plate engageable member are in the slots.

2. A cable fixation unit adapted to be mounted to a slotted baseplate, comprising:
    a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis,
    wherein the first plate engageable member and the second plate engageable member are transversely offset from each other on opposite sides of the longitudinal axis; and
    wherein the first plate engageable member includes a heel portion, the heel portion being configured to engage and move a resilient member of the slotted baseplate from a relaxed configuration to a flexed configuration, the heel portion being vertically distanced from a bottom of the foot of the first plate engageable member such that a free end of the resilient member is positioned above a bottom of the foot of the first plate engageable member when the resilient member is flexed by the heel portion.

3. A cable fixation unit adapted to be mounted to a slotted baseplate, comprising:
    a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis,
    wherein the first plate engageable member and the second plate engageable member are transversely offset from each other on opposite sides of the longitudinal axis; and
    wherein the mounting portion includes a third of the plate engageable members including a leg and a foot extending from the leg of the third plate engageable member parallel to the longitudinal axis, the second plate-engageable member being a nearest of the plate engageable members to the third plate engageable member along the longitudinal axis, wherein the second plate engageable member and the third plate-engageable member are transversely offset from each other on opposite sides of the longitudinal axis of the cable fixation unit.

4. The cable fixation unit of claim 3, wherein the foot of the first plate engageable and the foot of the third plate engageable member are aligned parallel to the longitudinal axis.

5. A cable fixation unit adapted to be mounted to a slotted baseplate, comprising:
    a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis; and
    a seal member support extending from the body and configured to support a seal member,
    wherein the body defines a first cable jacket clamping portion on a first side of the seal member support for clamping a first cable jacket of a first cable, and a second cable jacket clamping portion on an opposite second side of the seal member support for clamping a second cable jacket of a second cable.

6. A cable fixation unit adapted to be mounted to a slotted baseplate, comprising:
    a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis; and wherein the body includes a top, a bottom and an upper cable support platform, the body being adapted to secure a first cable and a second cable in parallel such that the first cable is above the upper cable support platform and the second cable is below the upper cable support platform, the body defining at least one tie passage above the upper cable support platform and at least one tie passage below the upper cable support platform, each of the tie passages extending between a first opening and a second opening, the first opening and the second opening being positioned at different heights on the body, each of the tie passages further including a guide surface that resists cable tie advancement from the first opening to the second opening less than from the second opening to the first opening.

7. A cable fixation unit adapted to be mounted to a slotted baseplate, comprising:

a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis; and the slotted baseplate, the slotted baseplate extending along another longitudinal axis between a proximal end and a distal end of the slotted baseplate and extending along a transverse axis perpendicular to the another longitudinal axis between first and second opposite sides, and extending vertically between a top and a bottom parallel to a vertical axis that is perpendicular to the another longitudinal axis and the transverse axis, the slotted baseplate including an upper surface and a lower surface and defining a plurality of slots, each of the slots defining a longitudinal dimension parallel to the another longitudinal axis, a transverse dimension parallel to the transverse axis, and a vertical dimension parallel to the vertical axis, the plurality of slots defining a plurality of side by side mounting positions for mounting cable fixation assemblies arranged side by side along the transverse axis;

wherein a slot of each of the mounting positions is a locking slot, providing a plurality of locking slots;

wherein resilient members are positioned at least partially within the plurality of locking slots, each of the resilient members extending between a fixed end and an opposite free end, each of the resilient members including a relaxed configuration and a flexed configuration;

wherein in the relaxed configuration the free end of one of the resilient members is positioned to block the first plate engageable member from contacting a distal end of a corresponding one of the plurality of locking slots when the cable fixation unit is mounted to the slotted baseplate;

wherein in the flexed configuration, the free end of the one of the resilient members is positioned to permit the foot of the first plate engageable member to slide proximally below the bottom surface of the slotted baseplate when the cable fixation unit is being installed on the slotted baseplate; and wherein in the flexed configuration, the free end of the one of the resilient members is positioned above a bottom of the foot of the first plate engageable member.

8. The cable fixation unit of claim 7, wherein each of the resilient members extends from the fixed end to the free end generally parallel to the another longitudinal axis.

9. The cable fixation unit of claim 1, wherein the body further defines at least one tie passage.

10. A cable fixation unit adapted to be mounted to a slotted baseplate, comprising:

a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis, wherein the body further defines at least one tie passage; and wherein the at least one tie passage extends between a first opening and a second opening, the first and second openings being positioned at different heights on the body relative to a top of the body and a bottom of the body, each of the at least one tie passage further including a guide surface that resists cable tie advancement from the first opening to the second opening less than from the second opening to the first opening.

11. The cable fixation unit of claim 6, wherein the upper cable support platform includes a downwardly recessed portion defined by opposing lips at proximal and distal ends of the downwardly recessed portion.

12. A cable fixation unit adapted to be mounted to a slotted baseplate, comprising:

a body defining a jacket clamping portion and a mounting portion, the mounting portion being configured to mount the body to the slotted baseplate and including plate engageable members, each of the plate engageable members including a leg and a foot extending from the leg parallel to a longitudinal axis of the cable fixation unit, the plate engageable members including a first plate engageable member and a second plate engageable member, the second plate engageable member being a nearest of the plate engageable members to the first plate engageable member along the longitudinal axis, wherein the first plate engageable member and the second plate engageable member are transversely offset from each other on opposite sides of the longitudinal axis, wherein the body includes pairs of oppositely facing hooks for anchoring yarn strength members of cables.

13. The cable fixation unit of claim 5, further comprising a sealing member mounted to the seal member support.

14. The cable fixation unit of claim 7, wherein the slotted baseplate includes an upper baseplate member that includes the slots and a lower baseplate member that includes the resilient members.

15. The cable fixation unit of claim 14, wherein the upper baseplate member comprises polymeric material and the lower baseplate member comprises metal.

16. The cable fixation unit of claim 1, comprising exactly two of the plate engageable members.

17. The cable fixation unit of claim 1, comprising exactly three of the plate engageable members.

18. The cable fixation unit of claim 1, wherein the body includes two mounting portions configured such that the body can be mounted to the slotted baseplate in both a bottom down position and a bottom up position, with the bottom up position being inverted about a horizontal plane relative to the bottom down position.

19. The cable fixation unit of claim 1, further comprising a first slotted baseplate and a second slotted baseplate to which the body can mount, and further comprising a frame, the first slotted baseplate and the second slotted baseplate being mounted side by side to the frame, wherein one of the first slotted baseplate and the second slotted baseplate is electrically conductive and the other of the first slotted baseplate and the second slotted baseplate is not electrically conductive.

20. The cable fixation unit of claim 1, further comprising a first baseplate and a second baseplate to which the body can mount, the first baseplate having first and second opposite surfaces and a plurality of slots open at the first surface and open at the second surface, the plurality of slots extending through the first baseplate and between proximal and distal ends of the slots defined by the first baseplate, and wherein each of the first baseplate and the second baseplate includes a column of partial slots with open sides positioned to align with each other when the first baseplate and the second baseplate are assembled such that the two columns of partial slots form a single column of complete slots.

21. The cable fixation unit of claim 1, further comprising a locking member configured such that a slot-insertable portion of the locking member can be urged into a slot of the slotted baseplate when the cable fixation unit is mounted to the slotted baseplate and the locking member engages the body.

* * * * *

UNITED STATES PATENT AND TRADEMARK OFFICE
CERTIFICATE OF CORRECTION

| | |
|---|---|
| PATENT NO. | : 12,210,204 B2 |
| APPLICATION NO. | : 17/425263 |
| DATED | : January 28, 2025 |
| INVENTOR(S) | : Johan Geens et al. |

Page 1 of 1

It is certified that error appears in the above-identified patent and that said Letters Patent is hereby corrected as shown below:

In the Claims

Column 45, Line 41, Claim 1: "engagement member" should read --engageable member--

Column 46, Lines 25-26, Claim 3: "second plate-engageable member" should read --second plate engageable member--

Column 46, Lines 29-30, Claim 3: "third plate-engageable member" should read --third plate engageable member--

Signed and Sealed this
Twenty-ninth Day of April, 2025

Coke Morgan Stewart
*Acting Director of the United States Patent and Trademark Office*